(12) United States Patent
Nigo

(10) Patent No.: US 11,101,763 B2
(45) Date of Patent: Aug. 24, 2021

(54) AIR CONDITIONER AND METHOD FOR CONTROLLING AIR CONDITIONER

(71) Applicant: Mitsubishi Electric Corporation, Tokyo (JP)

(72) Inventor: Masahiro Nigo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 175 days.

(21) Appl. No.: 16/329,572

(22) PCT Filed: Oct. 31, 2016

(86) PCT No.: PCT/JP2016/082197
§ 371 (c)(1),
(2) Date: Feb. 28, 2019

(87) PCT Pub. No.: WO2018/078835
PCT Pub. Date: May 3, 2018

(65) Prior Publication Data
US 2019/0245471 A1    Aug. 8, 2019

(51) Int. Cl.
*H02K 3/18* (2006.01)
*H02K 1/27* (2006.01)
*H02P 25/18* (2006.01)
*H02P 1/32* (2006.01)
*F25B 49/02* (2006.01)
(Continued)

(52) U.S. Cl.
CPC ............. *H02P 25/18* (2013.01); *H02K 1/276* (2013.01); *H02K 3/18* (2013.01); *H02P 1/32* (2013.01); *H02P 25/184* (2013.01); *F25B 13/00* (2013.01); *F25B 49/025* (2013.01);
(Continued)

(58) Field of Classification Search
CPC ............. H02K 3/12; H02K 1/17; H02K 7/088
USPC .......... 310/68 A, 68 B, 68 D, 71, 75 R, 114; 62/236; 318/504
See application file for complete search history.

(56) References Cited

U.S. PATENT DOCUMENTS

2002/0070716 A1    6/2002  Gupta et al.
2015/0168033 A1*   6/2015  Yamakawa ............. F25B 13/00
                                                       62/324.6
(Continued)

FOREIGN PATENT DOCUMENTS

JP    H03-265489 A    11/1991
JP    2002-252999 A    9/2002
(Continued)

OTHER PUBLICATIONS

Machine Translation JP2008228513 (Year: 2008).*
(Continued)

*Primary Examiner* — Jose A Gonzalez Quinones
(74) *Attorney, Agent, or Firm* — Posz Law Group, PLC

(57) ABSTRACT

An air conditioner includes a signal receiving unit to receive an operation instruction signal, a compressor including a motor including coils, an inverter connected to the coils, a connection switching unit to switch a connection state of the coils between a first connection state and a second connection state, and a controller to control the inverter and the connection switching unit. When the signal receiving unit receives an operation stop signal, the connection switching unit switches the connection state of the coils from the first connection state to the second connection state.

15 Claims, 30 Drawing Sheets

(51) Int. Cl.
 *H02P 27/06* (2006.01)
 *F25B 13/00* (2006.01)

(52) U.S. Cl.
 CPC . *F25B 2600/021* (2013.01); *F25B 2700/2104* (2013.01); *H02P 27/06* (2013.01)

(56) References Cited

U.S. PATENT DOCUMENTS

| | | | |
|---|---|---|---|
| 2016/0172993 A1* | 6/2016 | Yuasa | ........... H02P 29/68 318/504 |
| 2019/0245471 A1 | 8/2019 | Nigo | |

FOREIGN PATENT DOCUMENTS

| | | | |
|---|---|---|---|
| JP | 2008-190828 A | | 8/2008 |
| JP | 2008190828 A | * | 8/2008 |
| JP | 2008228513 A | * | 9/2008 |
| JP | 2009-216324 A | | 9/2009 |
| JP | 4619826 B2 | | 1/2011 |
| JP | 5585556 B2 | | 9/2014 |
| JP | 2016-085005 A | | 5/2016 |
| JP | 2016-086587 A | | 5/2016 |
| JP | 2018-057114 A | | 4/2018 |
| WO | 2016/015147 A1 | | 2/2016 |
| WO | 2018/078835 A1 | | 5/2018 |
| WO | 2018/078838 A1 | | 5/2018 |
| WO | 2018/078840 A1 | | 5/2018 |
| WO | 2018/078845 A1 | | 5/2018 |

OTHER PUBLICATIONS

Machine Translation JP2008190828 (Year: 2008).*
U.S. Appl. No. 16/328,911, filed Feb. 27, 2019, Nigo.
U.S. Appl. No. 16/332,387, filed Mar. 12, 2019, Nigo.
U.S. Appl. No. 16/335,899, filed Mar. 22, 2019, Nigo.
Office Action dated Sep. 29, 2020 in connection with counterpart Korean Patent Application No. 10-2019-7007101 (and machine English translation).
International Search Report of the International Searching Authority dated Jan. 24, 2017 for the corresponding international application No. PCT/JP2016/082197 (and English translation).
Extended European Search Report dated Oct. 2, 2019 issued in corresponding EP patent application No. 16920077.1.
Office Action dated May 4, 2020 issued in corresponding IN patent application No. 201947014015 (and English mmslabor).
Office Action dated Oct. 15, 2019 issued in corresponding JP patent application No. 2018-547062 (and English translation).
Office Action dated Jan. 31, 2020 issued in corresponding AU patent application No. 2016428277.
Office Action dated Nov. 17, 2020 in connection with counterpart JP Application No. 2020-008521(and machine English translation).
Office Action dated Dec. 11, 2020 in connection with counterpart EP application No. 16 920 077.1.

* cited by examiner

AIR CONDITIONER AND METHOD FOR CONTROLLING AIR CONDITIONER

CROSS REFERENCE TO RELATED APPLICATION

This application is a U.S. national stage application of International Patent Application No. PCT/JP2016/082197 filed on Oct. 31, 2016, the disclosure of which is incorporated herein by reference.

TECHNICAL FIELD

The present invention relates to an air conditioner including a motor.

BACKGROUND ART

In a motor for use in an air conditioner and the like, a connection state of coils of the motor is switched between a Y connection (star connection) and a delta connection (also referred to as a Δ connection) in order to enhance operation efficiency during low-speed rotation and during high-speed rotation (see, for example, Patent Reference 1).

Specifically, control is performed in such a manner that a rotation speed of the motor is compared to a threshold, and switching from the Y connection to the delta connection is performed when a state in which the rotation speed is higher than or lower than a threshold continues for a certain time period (see, for example, Patent Reference 2).

PATENT REFERENCE

Patent Reference 1: Japanese Patent Application Publication No. 2009-216324
Patent Reference 2: Japanese Patent Publication No. 4619826

However, in a case where trouble occur in a relay circuit and the like for a connection while a motor stops, there exists a problem that it is difficult to respond an air-conditioning load rapidly when the motor is started again.

SUMMARY

The present invention is made to solve the problem described above, and an object of the present invention is to allow a motor to start properly in consideration of the air-conditioning load.

An air conditioner according to the present invention includes a signal receiver to receive an operation instruction signal, a compressor including a motor including coils, an inverter connected to the coils, a connection switching device to switch a connection state of the coils between a first connection state and a second connection state, and a controller to control the inverter and the connection switching device. When the signal receiver receives an operation stop signal, the connection switching device switches the connection state of the coils from the first connection state to the second connection state.

According to the present invention, since the motor starts in a state where the connection state of the coils is properly, the motor can start properly in consideration of the air-conditioning load.

DETAILED DESCRIPTION

First Embodiment (Configuration of Motor)

Figure 1:
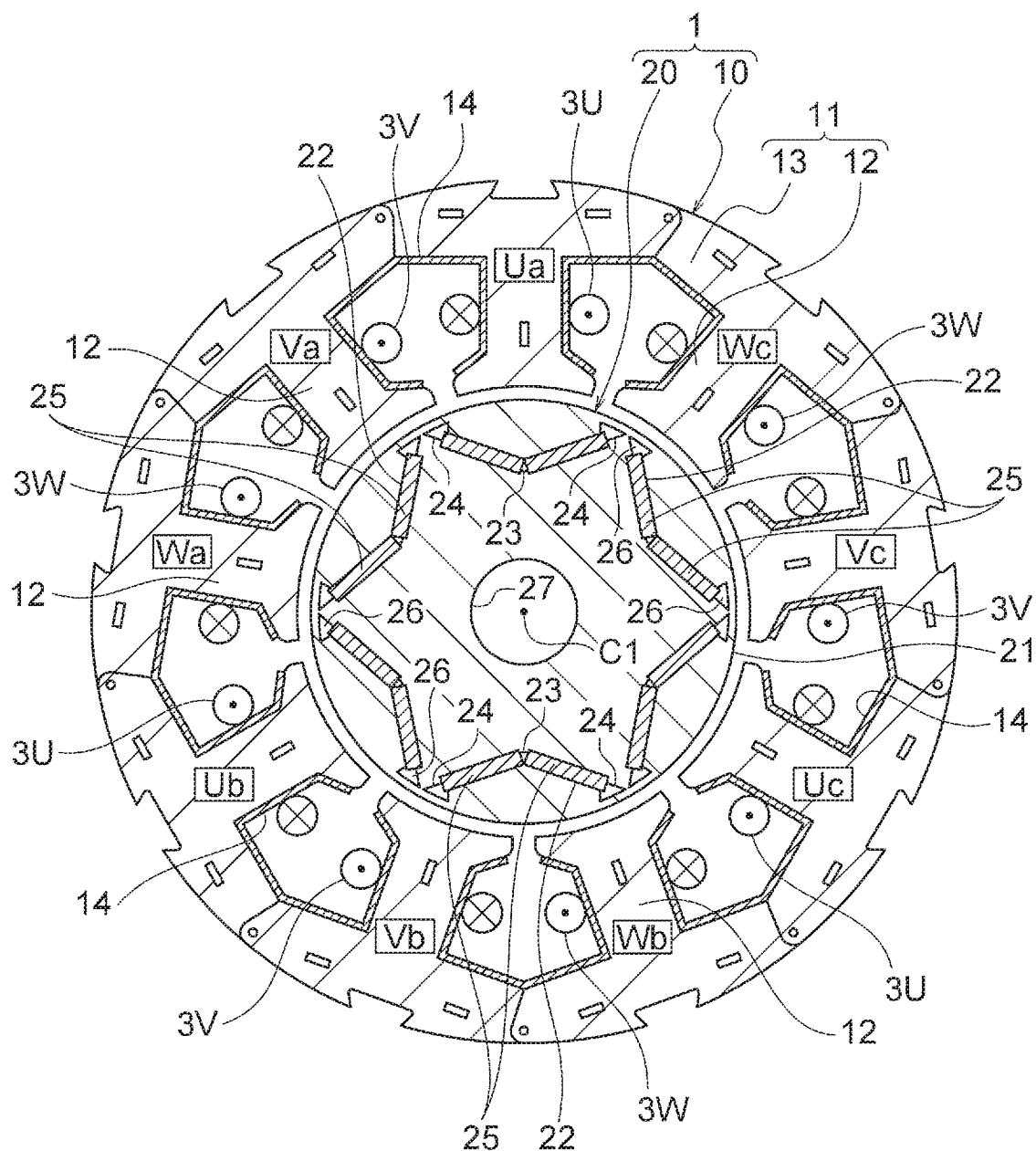
FIG. 1 is a cross-sectional view illustrating a configuration of a motor according to a first embodiment.

A first embodiment of the present invention will be described. FIG. 1 is a cross-sectional view illustrating a configuration of a motor 1 according to the first embodiment of the present invention. The motor 1 is a permanent magnet embedded type motor, and is used for a rotary compressor, for example. The motor 1 includes a stator 10 and a rotor 20 rotatably provided inside the stator 10. An air gap of, for example, 0.3 mm to 1 mm is formed between the stator 10 and the rotor 20. FIG. 1 is a cross-sectional view taken along a plane perpendicular to a rotation axis of the rotor 20.

Hereinafter, an axial direction (direction of the rotation axis) of the rotor 20 will be simply referred to as an "axial direction". A direction along an outer periphery (circumference) of each of the stator 10 and the rotor 20 will be simply referred to as a "circumferential direction". A radial direction of each of the stator 10 and the rotor 20 will be simply referred to as a "radial direction".

The stator 10 includes a stator core 11 and coils 3 wound around the stator core 11. The stator core 11 is made by stacking a plurality of electromagnetic steel sheets each having a thickness of 0.1 mm to 0.7 mm (0.35 mm in this example) in the direction of the rotation axis and fastening the sheets by crimping.

The stator core 11 includes a ring-shaped yoke 13 and a plurality of (nine in this example) tooth portions 12 extending inward in the radial direction from the yoke 13. A slot is formed between adjacent ones of the tooth portions 12. Each of the tooth portions 12 has a tooth end part at an end on an inner side in the radial direction, and the tooth end part has a wide width (dimension in the circumferential direction of the stator core 11).

The coil 3 as a stator winding is wound around each of the tooth portions 12 via an insulator 14. The coil 3 is obtained by, for example, winding a magnet wire having a wire diameter (diameter) of 0.8 mm around each of the tooth portions 12 by concentrated winding in 110 turns. The number of turns and the wire diameter of each coil 3 are determined based on characteristics (rotation speed, torque or the like) required for the motor 1, a supply voltage, or a cross-sectional area of the slot.

The coils 3 are constituted by three-phase windings of a U-phase, a V-phase, and a W-phase (hereinafter referred to as coils 3U, 3V, and 3W). Both terminals of the coil 3 in each phase are open. That is, the coils 3 have six terminals in total. A connection state of the coils 3 is switchable between a Y connection and a delta connection, which will be described later. The insulator 14 is made of, for example, a film of polyethylene terephthalate (PET), and has a thickness of 0.1 mm to 0.2 mm.

The stator core 11 has a configuration in which a plurality of (nine in this example) blocks are coupled to each other via thin portions. The magnet wire is wound around each of the tooth portions 12 in a state where the stator core 11 is extended in a band shape, and then the stator core 11 is bent into a ring shape and both ends of the stator core 11 are welded.

A configuration in which the insulator 14 is made of a thin film and the stator core 11 has a divided structure in order to facilitate winding as above is effective for increasing the number of turns of the coil 3 in the slot. In this regard, the stator core 11 is not limited to the above described configuration in which the plurality of blocks (split cores) are coupled to each other.

The rotor 20 includes a rotor core 21 and a permanent magnet 25 attached to the rotor core 21. The rotor core 21 is made by stacking a plurality of electromagnetic steel sheets each having a thickness of 0.1 mm to 0.7 mm (0.35 mm in this example) in the direction of the rotation axis and fastening the sheets by crimping.

The rotor core 21 has a cylindrical shape, and a shaft hole 27 (center hole) is formed at a center in the radial direction. A shaft serving as a rotation shaft of the rotor 20 (for example, a shaft 90 of a rotary compressor 8) is fixed to the shaft hole 27 by shrinkage fitting, press fitting, or the like.

A plurality of (six in this example) magnet insertion holes 22 in which the permanent magnets 25 are inserted are formed along an outer peripheral surface of the rotor core 21. The magnet insertion holes 22 are openings, and one magnet insertion hole 22 corresponds to one magnetic pole. Since the six magnet insertion holes 22 are provided in this example, the rotor 20 has six poles in total.

The magnet insertion hole 22 has a V shape such that a center portion in the circumferential direction projects inward in the radial direction in this example. In this regard, the magnet insertion hole 22 is not limited to the V shape, but may have a straight shape, for example.

Two permanent magnets 25 are disposed in each magnet insertion hole 22. That is, two permanent magnets 25 are disposed for one magnetic pole. In this example, since the rotor 20 has six poles as described above, twelve permanent magnets 25 are disposed in total.

The permanent magnet 25 is a flat-plate member elongated in the axial direction of the rotor core 21, has a width in the circumferential direction of the rotor core 21, and has a thickness in the radial direction of the rotor core 21. The permanent magnet 25 is constituted by, for example, a rare earth magnet containing neodymium (Nd), iron (Fe), and boron (B) as main components.

The permanent magnets 25 are magnetized in the thickness direction. Two permanent magnets 25 disposed in one magnet insertion hole 22 are magnetized in such a manner that the same magnetic poles face the same side in the radial direction.

Flux barriers 26 are formed at both ends of the magnet insertion hole 22 in the circumferential direction. The flux barriers 26 are openings formed continuously with the magnet insertion hole 22. The flux barriers 26 are provided for reducing leakage magnetic flux between adjacent magnetic poles (i.e., magnetic flux flowing through inter-pole parts).

In the rotor core 21, a first magnet retention portion 23 that is a projection is formed at a center of each magnet insertion hole 22 in the circumferential direction. Further, in the rotor core 21, second magnet retention portions 24 that are projections are formed at both ends of the magnet insertion hole 22 in the circumferential direction. The first magnet retention portion 23 and the second magnet retention portions 24 are provided for positioning and retaining the permanent magnets 25 in each magnet insertion hole 22.

As described above, the number of slots of the stator 10 (i.e., the number of tooth portions 12) is nine, and the number of poles of the rotor 20 is six. That is, in the motor 1, a ratio of the number of poles of the rotor 20 to the number of slots of the stator 10 is 2:3.

In the motor 1, the connection state of the coils 3 is switched between a Y connection and a delta connection. In the case where the delta connection is used, a cyclic current may flow and may cause degradation of performance of the motor 1. The cyclic current is caused by a third harmonic wave generated in an induced voltage in the winding of each phase. It is known that in the case of concentrated winding where the ratio of the number of poles to the number of slots is 2:3, no third harmonic wave is generated in an induced voltage on the assumption that there is no influence of magnetic saturation or the like, and therefore no performance degradation is caused by the cyclic current.

(Configuration of Rotary Compressor)

Figure 2:
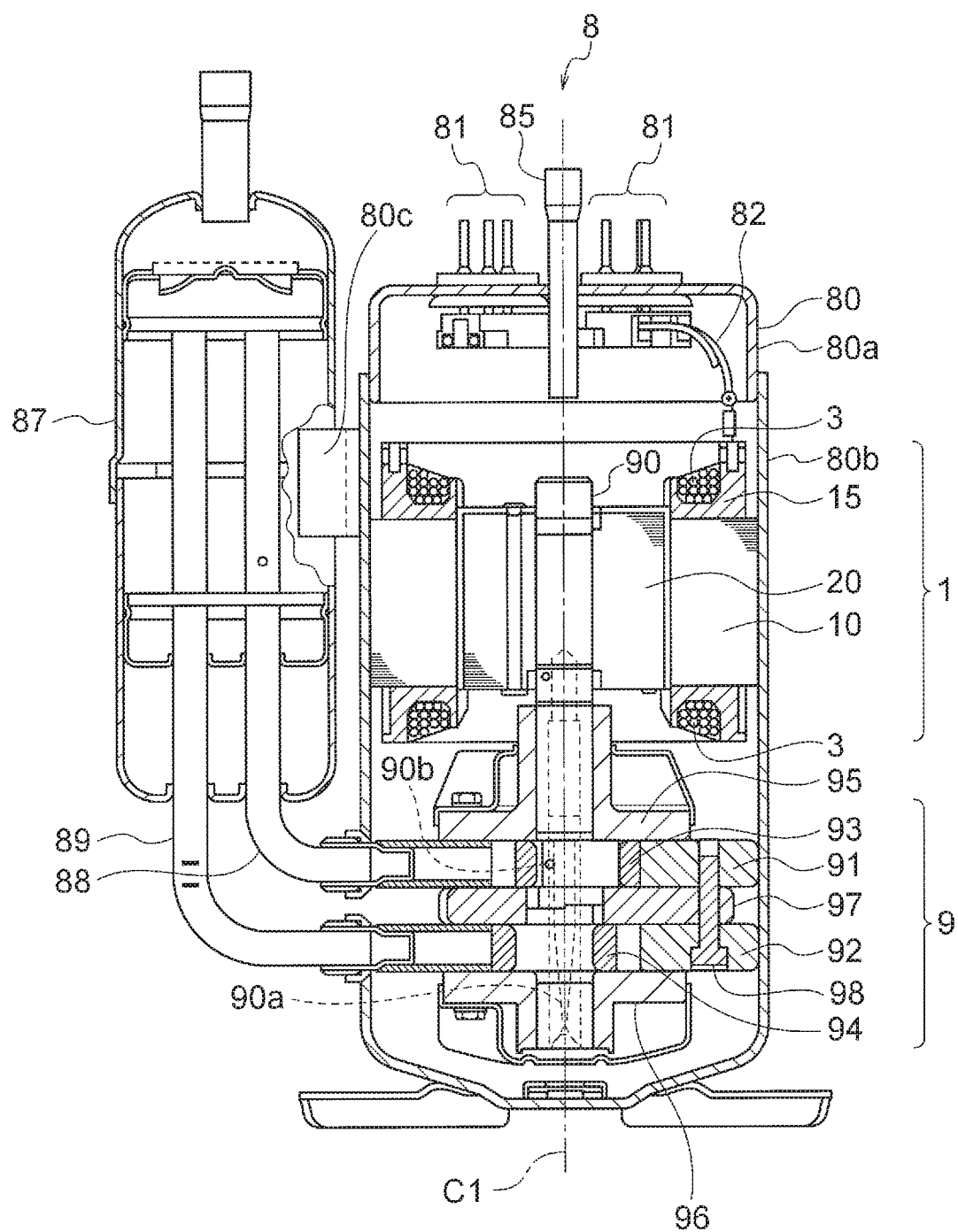
FIG. 2 is a cross-sectional view illustrating a configuration of a rotary compressor according to the first embodiment.

Next, the rotary compressor 8 using the motor 1 will be described. FIG. 2 is a cross-sectional view illustrating a configuration of the rotary compressor 8. The rotary compressor 8 includes a shell 80, a compression mechanism 9 disposed in the shell 80, and the motor 1 for driving the compression mechanism 9. The rotary compressor 8 further includes a shaft 90 (crank shaft) coupling the motor 1 and the compression mechanism 9 to each other so that a driving force can be transferred. The shaft 90 is fitted in the shaft hole 27 (FIG. 1) of the rotor 20 of the motor 1.

The shell 80 is a closed container made of, for example, a steel sheet, and covers the motor 1 and the compression mechanism 9. The shell 80 includes an upper shell 80a and a lower shell 80b. The upper shell 80a is provided with glass terminals 81 serving as a terminal portion for supplying electric power from outside of the rotary compressor 8 to the motor 1, and a discharge pipe 85 for discharging a refrigerant compressed in the rotary compressor 8 to outside. Here, six lead wires in total corresponding to two portions for each of the U-phase, the V-phase, and the W-phase of the coils 3 of the motor 1 (FIG. 1) are drawn out from the glass terminals 81. The lower shell 80b houses the motor 1 and the compression mechanism 9.

The compression mechanism 9 has an annular first cylinder 91 and an annular second cylinder 92 along the shaft 90. The first cylinder 91 and the second cylinder 92 are fixed to an inner peripheral portion of the shell 80 (the lower shell 80b). An annular first piston 93 is disposed on an inner peripheral side of the first cylinder 91, and an annular second piston 94 is disposed on an inner peripheral side of the second cylinder 92. The first piston 93 and the second piston 94 are rotary pistons that rotate together with the shaft 90.

A partition plate 97 is provided between the first cylinder 91 and the second cylinder 92. The partition plate 97 is a disk-shaped member having a through hole at a center thereof. Vanes (not shown) are provided in cylinder chambers of the first cylinder 91 and the second cylinder 92 to divide each of the cylinder chambers into a suction side and a compression side. The first cylinder 91, the second cylinder 92, and the partition plate 97 are integrally fixed using bolts 98.

An upper frame 95 is disposed above the first cylinder 91 so as to close an upper side of the cylinder chamber of the first cylinder 91. A lower frame 96 is disposed below the second cylinder 92 so as to close a lower side of the cylinder chamber of the second cylinder 92. The upper frame 95 and the lower frame 96 rotatably support the shaft 90.

Refrigerating machine oil (not shown) for lubricating sliding portions of the compression mechanism 9 is stored at a bottom portion of the lower shell 80b of the shell 80. The refrigerating machine oil flows upward through a hole 90a formed in the axial direction in the shaft 90 and is supplied to the sliding portions from oil supply holes 90b formed at a plurality of positions of the shaft 90.

The stator 10 of the motor 1 is attached to an inner side of the shell 80 by shrinkage fitting. Electric power is supplied to the coils 3 of the stator 10 from the glass terminals 81 attached to the upper shell 80a. The shaft 90 is fixed to the shaft hole 27 (FIG. 1) of the rotor 20.

An accumulator 87 for storing refrigerant gas is attached to the shell 80. The accumulator 87 is held by, for example, a holding portion 80c provided on an outer side the lower shell 80b. A pair of suction pipes 88 and 89 are attached to the shell 80, and refrigerant gas is supplied from the accumulator 87 to the cylinders 91 and 92 through the suction pipes 88 and 89.

As the refrigerant, R410A, R407C, or R22, for example, may be used. It is preferable to use low global warming potential (GWP) refrigerant from the viewpoint of prevention of global warming. As the low GWP refrigerant, for example, the following refrigerants can be used.

(1) First, a halogenated hydrocarbon having a double bond of carbon in its composition, such as hydro-fluoro-orefin (HFO)-1234yf (CF3CF=CH2) can be used. The GWP of HFO-1234yf is 4.

(2) Further, a hydrocarbon having a double bond of carbon in its composition, such as R1270 (propylene), may be used. The GWP of R1270 is 3, which is lower than that of HFO-1234yf, but flammability of R1270 is higher than that of HFO-1234yf.

(3) Further, a mixture containing at least one of a halogenated hydrocarbon having a double bond of carbon in its composition or a hydrocarbon having a double bond of carbon in its composition, such as a mixture of HFO-1234yf and R32, may be used. Since the above described HFO-1234yf is a low-pressure refrigerant and tends to cause an increase in pressure loss, its use may cause degradation of performance of a refrigeration cycle (especially an evaporator). Thus, it is practically preferable to use a mixture with R32 or R41 which is a higher pressure refrigerant than HFO-1234yf.

A basic operation of the rotary compressor 8 is as follows. Refrigerant gas supplied from the accumulator 87 is supplied to the cylinder chambers of the first cylinder 91 and the second cylinder 92 through the suction pipes 88 and 89. When the motor 1 is driven and the rotor 20 rotates, the shaft 90 rotates together with the rotor 20. Then, the first piston 93 and the second piston 94 fitted to the shaft 90 rotate eccentrically in the cylinder chambers and compress the refrigerant in the cylinder chambers. The compressed refrigerant flows upward in the shell 80 through holes (not shown) provided in the rotor 20 of the motor 1 and is discharged to outside through the discharge pipe 85.

(Configuration of Air Conditioner)

Figure 3:
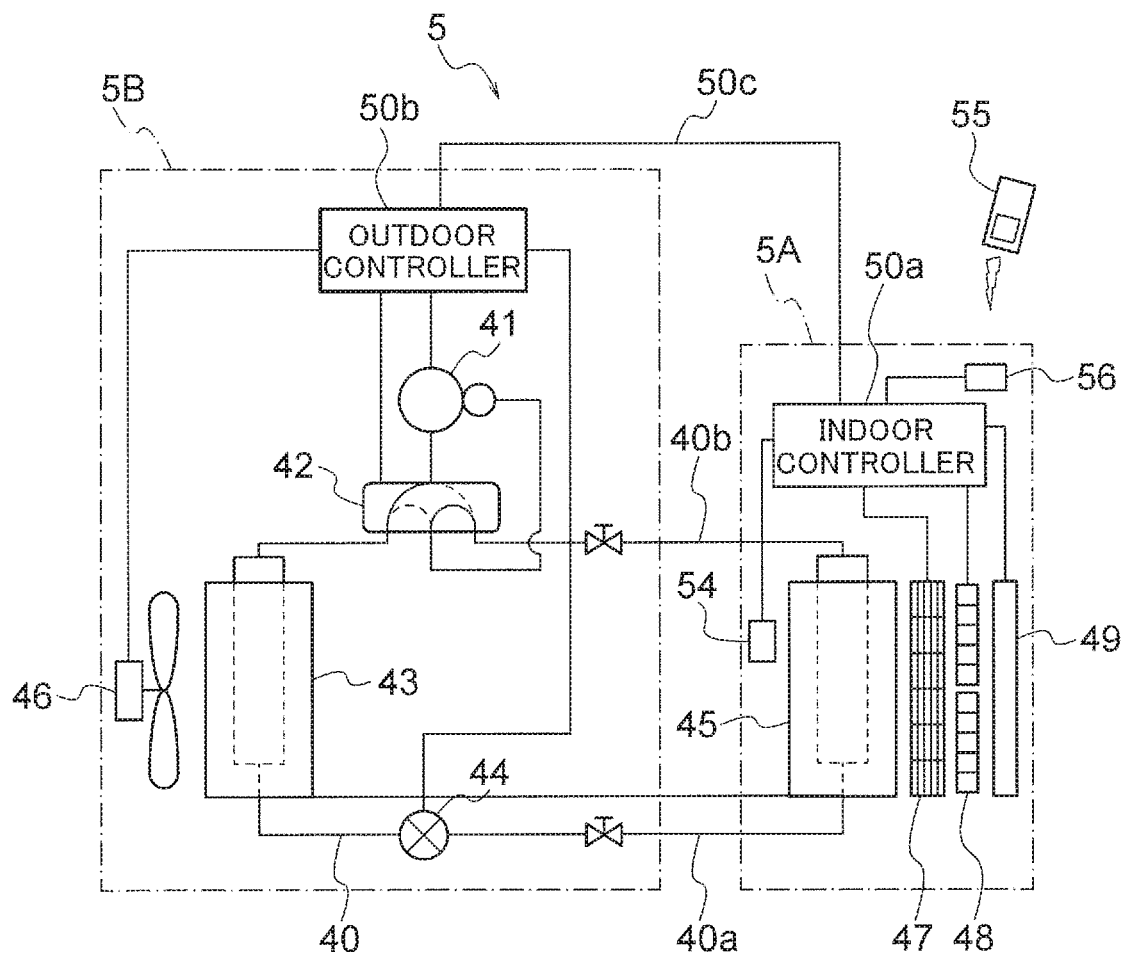
FIG. 3 is a block diagram illustrating a configuration of an air conditioner according to the first embodiment.

Next, the air conditioner 5 including the driving device according to the first embodiment will be described. FIG. 3 is a block diagram illustrating a configuration of the air conditioner 5. The air conditioner 5 includes an indoor unit 5A placed in a room (air conditioning target space) and an outdoor unit 5B placed outdoors. The indoor unit 5A and the outdoor unit 5B are connected by connecting pipes 40a and 40b through which the refrigerant flows. Liquid refrigerant passing through a condenser flows through the connection pipe 40a. Gas refrigerant passing through an evaporator flows through the connection pipe 40b.

The outdoor unit 5B includes a compressor 41 that compresses and discharges the refrigerant, a four-way valve (refrigerant channel switching valve) 42 that switches a flow direction of the refrigerant, an outdoor heat exchanger 43 that exchanges heat between outside air and the refrigerant, and an expansion valve (pressure reducing device) 44 that depressurizes high-pressure refrigerant to a low pressure. The compressor 41 is constituted by the rotary compressor 8 described above (FIG. 2). The indoor unit 5A includes an indoor heat exchanger 45 that performs heat exchange between indoor air and the refrigerant.

The compressor 41, the four-way valve 42, the outdoor heat exchanger 43, the expansion valve 44, and the indoor heat exchanger 45 are connected by a pipe 40 including the above described connection pipes 40a and 40b to constitute a refrigerant circuit. These components constitute a compression type refrigeration cycle (compression type heat pump cycle) in which the refrigerant is circulated by the compressor 41.

In order to control an operation of the air conditioner 5, an indoor controller 50a is disposed in the indoor unit 5A, and an outdoor controller 50b is disposed in the outdoor unit 5B. Each of the indoor controller 50a and the outdoor controller 50b has a control board on which various circuits for controlling the air conditioner 5 are formed. The indoor controller 50a and the outdoor controller 50b are connected to each other by a communication cable 50c. The communication cable 50c is bundled together with the connecting pipes 40a and 40b described above.

In the outdoor unit 5B, an outdoor fan 46 that is a fan is disposed so as to face the outdoor heat exchanger 43. The outdoor fan 46 generates an air flow passing through the outdoor heat exchanger 43 by rotation. The outdoor fan 46 is constituted by, for example, a propeller fan.

The four-way valve 42 is controlled by the outdoor controller 50b and switches the direction of flow of the refrigerant. When the four-way valve 42 is in the position indicated by the solid line in FIG. 3, gas refrigerant discharged from the compressor 41 is sent to the outdoor heat exchanger 43 (condenser). When the four-way valve 42 is in the position indicated by the broken line in FIG. 3, gas refrigerant flowing from the outdoor heat exchanger 43 (evaporator) is sent to the compressor 41. The expansion valve 44 is controlled by the outdoor controller 50b, and changes its opening degree to reduce the pressure of high-pressure refrigerant to a low pressure.

In the indoor unit 5A, an indoor fan 47 that is a fan is disposed so as to face the indoor heat exchanger 45. The indoor fan 47 rotates to generate an air flow passing through the indoor heat exchanger 45. The indoor fan 47 is constituted by, for example, a crossflow fan.

In the indoor unit 5A, a room temperature sensor 54 as a temperature sensor is provided. The room temperature sensor 54 measures a room temperature Ta which is an air temperature in the room (air conditioning target space), and sends the measured temperature information (information signal) to the indoor controller 50a. The room temperature sensor 54 may be constituted by a temperature sensor used in a general air conditioner. Alternatively, a radiant temperature sensor detecting a surface temperature of, for example, a wall or a floor in the room may be used.

In the indoor unit 5A, a signal receiving unit 56 that receives an instruction signal (operation instruction signal) transmitted from a remote controller 55 (remote operation device) operated by a user is also provided. The remote controller 55 is used by a user to give an instruction of an operation input (start and stop of operation) or operation content (set temperature, wind speed, or the like) to the air conditioner 5.

The compressor 41 is configured to change an operating rotation speed in a range from 20 rps to 130 rps during a normal operation. As the rotation speed of the compressor 41 increases, the circulation amount of the refrigerant in the refrigerant circuit increases. The rotation speed of the compressor 41 is controlled by the controller 50 (more specifically, the outdoor controller 50b) in accordance with a temperature difference ΔT between the current room temperature Ta obtained by the room temperature sensor 54 and a set temperature Ts set by the user with the remote controller 55. As the temperature difference ΔT increases, the compressor 41 rotates at a higher rotation speed, and the circulation amount of the refrigerant is increased.

Rotation of the indoor fan 47 is controlled by the indoor controller 50a. The rotation speed of the indoor fan 47 can be switched to a plurality of stages. In this example, the rotation speed can be switched to, for example, three stages of strong wind, middle wind, and soft wind. When the wind speed setting is set to an automatic mode with the remote controller 55, the rotation speed of the indoor fan 47 is switched in accordance with the temperature difference ΔT between the measured room temperature Ta and the set temperature Ts.

Rotation of the outdoor fan 46 is controlled by the outdoor controller 50b. The rotation speed of the outdoor fan 46 can be switched to a plurality of stages. In this example, the rotation speed of the outdoor fan 46 is switched in accordance with the temperature difference ΔT between the measured room temperature Ta and the set temperature Ts.

The indoor unit 5A further includes a lateral wind direction plate 48 and a vertical wind direction plate 49. The lateral wind direction plate 48 and the vertical wind direction plate 49 change a blowing direction when conditioned air subjected to heat exchange in the indoor heat exchanger 45 is blown into the room by the indoor fan 47. The lateral wind direction plate 48 changes the blowing direction laterally, and the vertical wind direction plate 49 changes the blowing direction vertically. An angle of each of the lateral wind direction plate 48 and the vertical wind direction plate 49, that is, a wind direction of the blown air is controlled by the indoor controller 50a based on the setting of the remote controller 55.

A basic operation of the air conditioner 5 is as follows. In a cooling operation, the four-way valve 42 is switched to a position indicated by the solid line, and high-temperature and high-pressure gas refrigerant discharged from the compressor 41 flows into the outdoor heat exchanger 43. In this case, the outdoor heat exchanger 43 operates as a condenser. When air passes through the outdoor heat exchanger 43 by rotation of the outdoor fan 46, heat of condensation of the refrigerant is taken by the air due to heat exchange. The refrigerant is condensed into high-pressure and low-temperature liquid refrigerant, and is adiabatically expanded by the expansion valve 44 to become low-pressure and low-temperature two-phase refrigerant.

The refrigerant passing through the expansion valve 44 flows into the indoor heat exchanger 45 of the indoor unit 5A. The indoor heat exchanger 45 operates as an evaporator. When air passes through the indoor heat exchanger 45 by rotation of the indoor fan 47, heat of vaporization of the air is taken by the refrigerant due to heat exchange, and the cooled air is supplied to the room. The refrigerant evaporates to become low-temperature and low-pressure gas refrigerant, and is compressed again into high-temperature and high-pressure refrigerant by the compressor 41.

In a heating operation, the four-way valve 42 is switched to a position indicated by the dotted line, and high-temperature and high-pressure gas refrigerant discharged from the compressor 41 flows into the indoor heat exchanger 45. In this case, the indoor heat exchanger 45 operates as a condenser. When air passes through the indoor heat exchanger 45 by rotation of the indoor fan 47, heat of condensation is taken from the refrigerant due to heat exchange, and the heated air is supplied to the room. The refrigerant is condensed into high-pressure and low-temperature liquid refrigerant, and is adiabatically expanded by the expansion valve 44 to become low-pressure and low-temperature two-phase refrigerant.

The refrigerant passing through the expansion valve 44 flows into the outdoor heat exchanger 43 of the outdoor unit 5B. The outdoor heat exchanger 43 operates as an evaporator. When air passes through the outdoor heat exchanger 43 by rotation of the outdoor fan 46, heat of vaporization of the air is taken by the refrigerant due to heat exchange. The refrigerant evaporates to become low-temperature and low-pressure gas refrigerant, and is compressed again into high-temperature and high-pressure refrigerant by the compressor 41.

Figure 4:
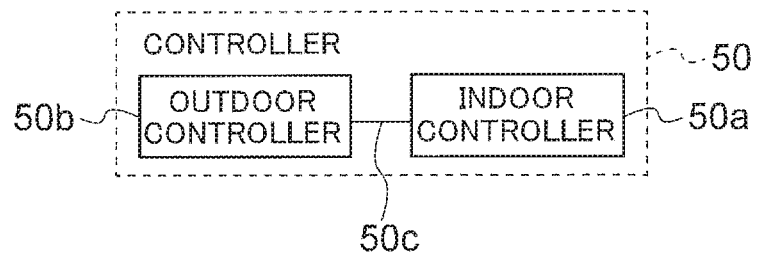
FIG. 4 is a conceptual diagram illustrating a basic configuration of a control system of the air conditioner according to the first embodiment.

FIG. 4 is a conceptual diagram showing a basic configuration of a control system of the air conditioner 5. The indoor controller 50a and the outdoor controller 50b described above exchange information with each other through the communication cable 50c to control the air conditioner 5. In this example, the indoor controller 50a and the outdoor controller 50b are collectively referred to as a controller 50.

Figure 5A:
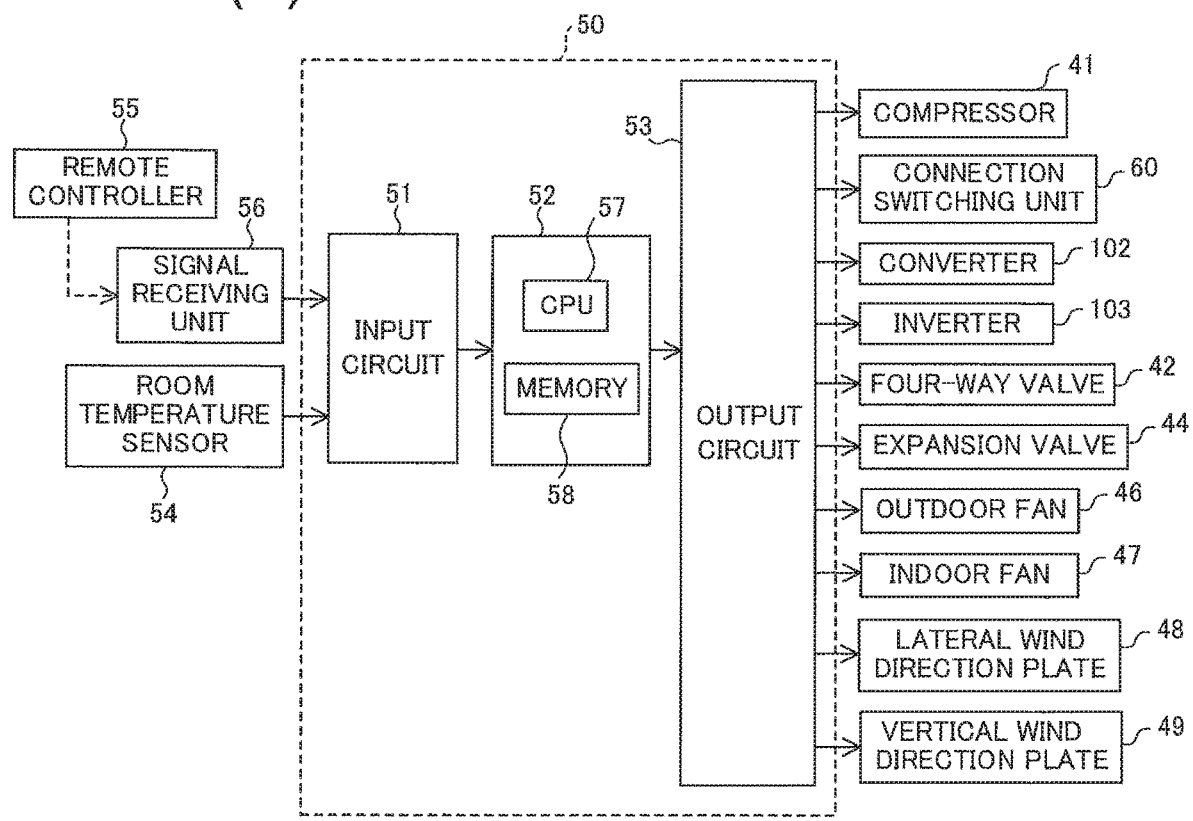
FIG. 5(A) is a block diagram illustrating the control system of the air conditioner according to the first embodiment.

FIG. 5(A) is a block diagram showing a control system of the air conditioner 5. The controller 50 is constituted by, for example, a microcomputer. The controller 50 incorporates an input circuit 51, an arithmetic circuit 52, and an output circuit 53.

The input circuit 51 receives an instruction signal received by the signal receiving unit 56 from the remote controller 55. The instruction signal includes, for example, signals for setting an operation input, an operation mode, a set temperature, an airflow amount, or a wind direction. The input circuit 51 also receives temperature information indicating a room temperature detected by the room temperature sensor 54. The input circuit 51 outputs the received information to the arithmetic circuit 52.

The arithmetic circuit 52 includes a central processing unit (CPU) 57 and a memory 58. The CPU 57 performs calculation processing and determination processing. The memory 58 stores various set values and programs for use in controlling the air conditioner 5. The arithmetic circuit 52 performs calculation and determination based on the information received from the input circuit 51, and outputs the result to the output circuit 53.

Based on the information input from the arithmetic circuit 52, the output circuit 53 outputs control signals to the compressor 41, a connection switching unit 60 (described later), a converter 102, an inverter 103, the compressor 41, the four-way valve 42, the expansion valve 44, the outdoor fan 46, the indoor fan 47, the lateral wind direction plate 48, and the vertical wind direction plate 49.

As described above, since the indoor controller 50a and the outdoor controller 50b (FIG. 4) exchange information with each other through the communication cable 50c and control the various devices of the indoor unit 5A and the outdoor unit 5B. Thus, in this example, the indoor controller 50a and the outdoor controller 50b are collectively referred to as the controller 50. Practically, each of the indoor controller 50a and the outdoor controller 50b is constituted by a microcomputer. It is also possible that a controller is provided in only one of the indoor unit 5A and the outdoor unit 5B and controls various devices of the indoor unit 5A and the outdoor unit 5B.

Figure 5B:
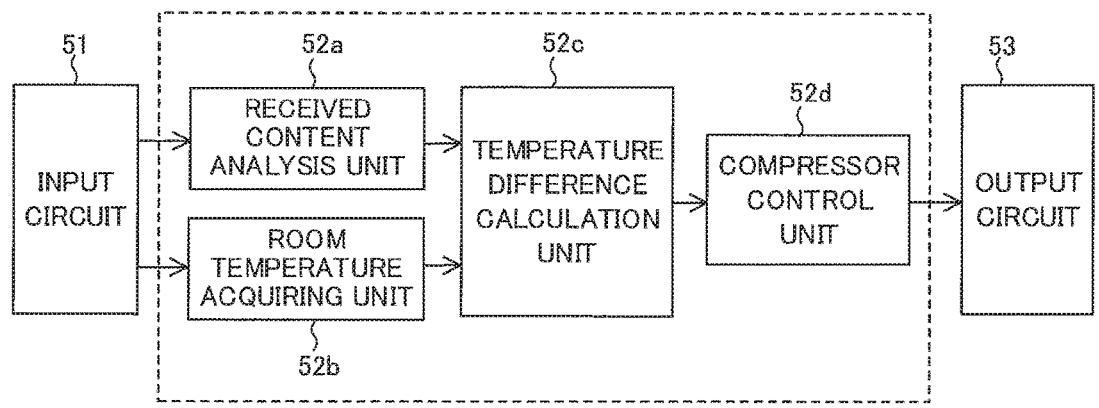
FIG. 5(B) is a block diagram illustrating a section that controls the motor of the compressor based on a room temperature.

FIG. 5(B) is a block diagram showing a section of the controller 50 for controlling the motor 1 of the compressor 41 based on the room temperature Ta. The arithmetic circuit 52 of the controller 50 includes a received content analysis unit 52a, a room temperature acquiring unit 52b, a temperature difference calculation unit 52c, and a compressor control unit 52d. These components are included in, for example, the CPU 57 of the arithmetic circuit 52.

The received content analysis unit 52a analyzes an instruction signal input from the remote controller 55 via the signal reception unit 56 and the input circuit 51. Based on the analysis result, the received content analysis unit 52a outputs, for example, the operation mode and the set temperature Ts to the temperature difference calculation unit 52c. The room temperature acquiring unit 52b acquires the room temperature Ta input from the room temperature sensor 54 via the input circuit 51, and outputs the acquired room temperature Ta to the temperature difference calculation unit 52c.

The temperature difference calculation unit 52c calculates a temperature difference ΔT between the room temperature Ta input from the room temperature acquiring unit 52b and the set temperature Ts input from the received content analysis unit 52a. When the operation mode input from the received content analysis unit 52a is the heating operation, a temperature difference ΔT=Ts−Ta is calculated. When the operation mode is the cooling operation, a temperature difference ΔT=Ta−Ts is calculated. The temperature difference calculation unit 52c outputs the calculated temperature difference ΔT to the compressor control unit 52d.

Based on the temperature difference ΔT input from the temperature difference calculation unit 52c, the compressor control unit 52d controls the driving device 100 to thereby control the rotation speed of the motor 1 (i.e., the rotation speed of the compressor 41).

(Configuration of Driving Device)

Figure 6:
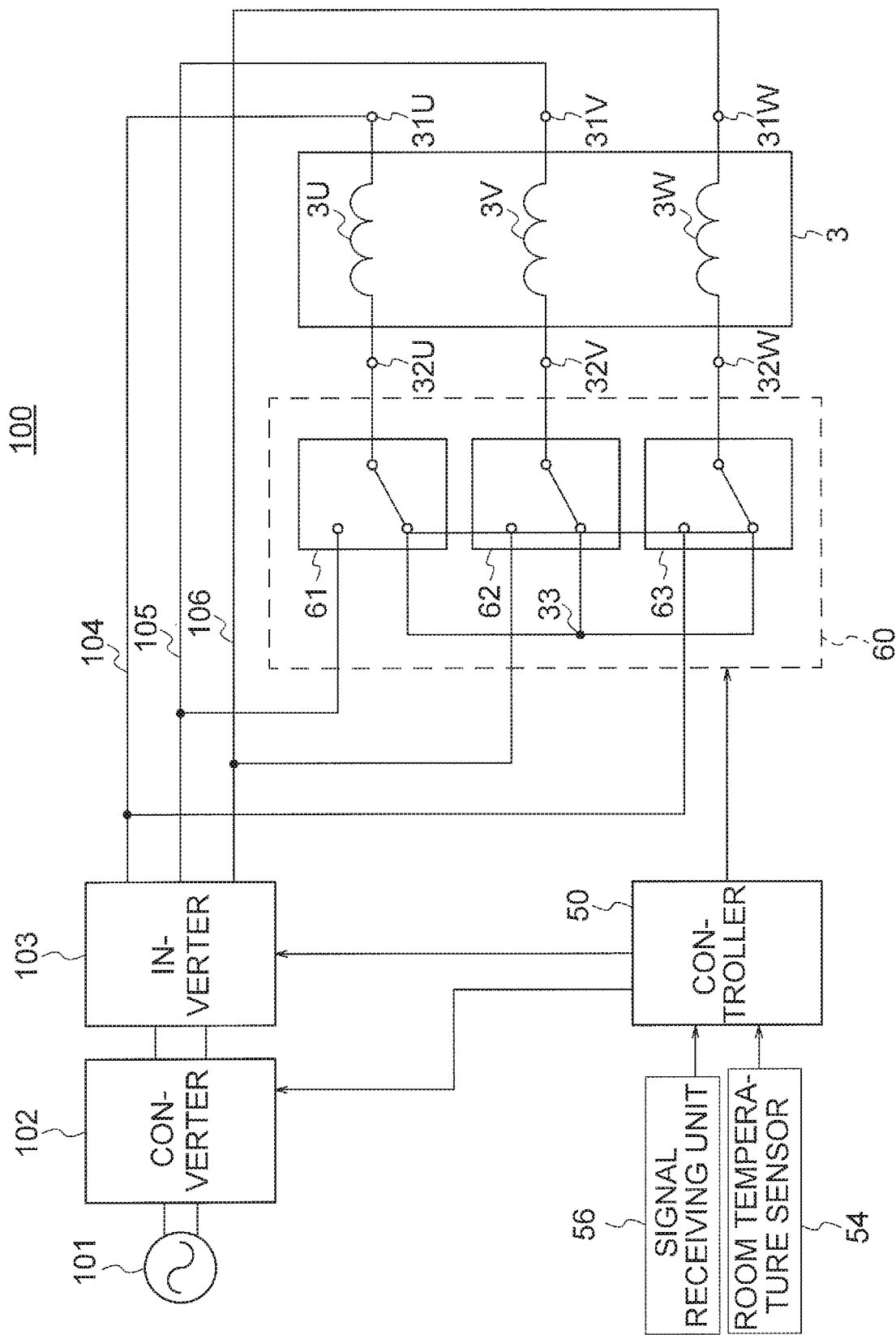
FIG. 6 is a block diagram illustrating a configuration of a driving device according to the first embodiment.

Next, the driving device 100 for driving the motor 1 will be described. FIG. 6 is a block diagram illustrating a configuration of the driving device 100. The driving device 100 includes the converter 102 for rectifying an output of a power source 101, the inverter 103 for outputting an alternating-current voltage to the coils 3 of the motor 1, the connection switching unit 60 for switching the connection state of the coils 3, and the controller 50. The converter 102 is supplied with electric power from the power source 101 that is an alternating-current (AC) power source.

The power source 101 is, for example, an AC power source of 200 V (effective voltage). The converter 102 is a rectifier circuit, and outputs a direct-current (DC) voltage of, for example, 280 V. The voltage output from the converter 102 is referred to as a bus voltage. The inverter 103 is supplied with a bus voltage from the converter 102, and outputs a line voltage (also referred to as a motor voltage) to the coils 3 of the motor 1. Wires 104, 105, and 106 connected to the coils 3U, 3V, and 3W, respectively, are connected to the inverter 103.

The coil 3U has terminals 31U and 32U. The coil 3V has terminals 31V and 32V. The coil 3W has terminals 31W and 32W. The wire 104 is connected to the terminal 31U of the coil 3U. The wire 105 is connected to the terminal 31V of the coil 3V. The wire 106 is connected to the terminal 31W of the coil 3W.

The connection switching unit 60 has switches 61, 62, and 63. The switch 61 connects the terminal 32U of the coil 3U to either the wire 105 or a neutral point 33. The switch 62 connects the terminal 32V of the coil 3V to either the wire 106 or the neutral point 33. The switch 63 connects the terminal 32W of the coil 3w to either the wire 104 or the neutral point 33. The switches 61, 62, and 63 of the connection switching unit 60 are constituted by relay contacts in this example. In this regard, the switches 61, 62, and 63 may be constituted by semiconductor switches.

The controller 50 controls the converter 102, the inverter 103, and the connection switching unit 60. The configuration of the controller 50 is as described with reference to FIG. 5. The controller 50 receives the operation instruction signal from the remote controller 55 received by the signal receiving unit 56 and also receives the room temperature detected by the room temperature sensor 54. Based on the received information, the controller 50 outputs a voltage switching signal to the converter 102, outputs an inverter driving signal to the inverter 103, and outputs a connection switching signal to the connection switching unit 60.

In a state shown in FIG. 6, the switch 61 connects the terminal 32U of the coil 3U to the neutral point 33, the switch 62 connects the terminal 32V of the coil 3V to the neutral point 33, and the switch 63 connects the terminal 32W of the coil 3W to the neutral point 33. That is, the terminals 31U, 31V, and 31W of the coils 3U, 3V, and 3W are connected to the inverter 103, and the terminals 32U, 32V, and 32W are connected to the neutral point 33.

Figure 7:
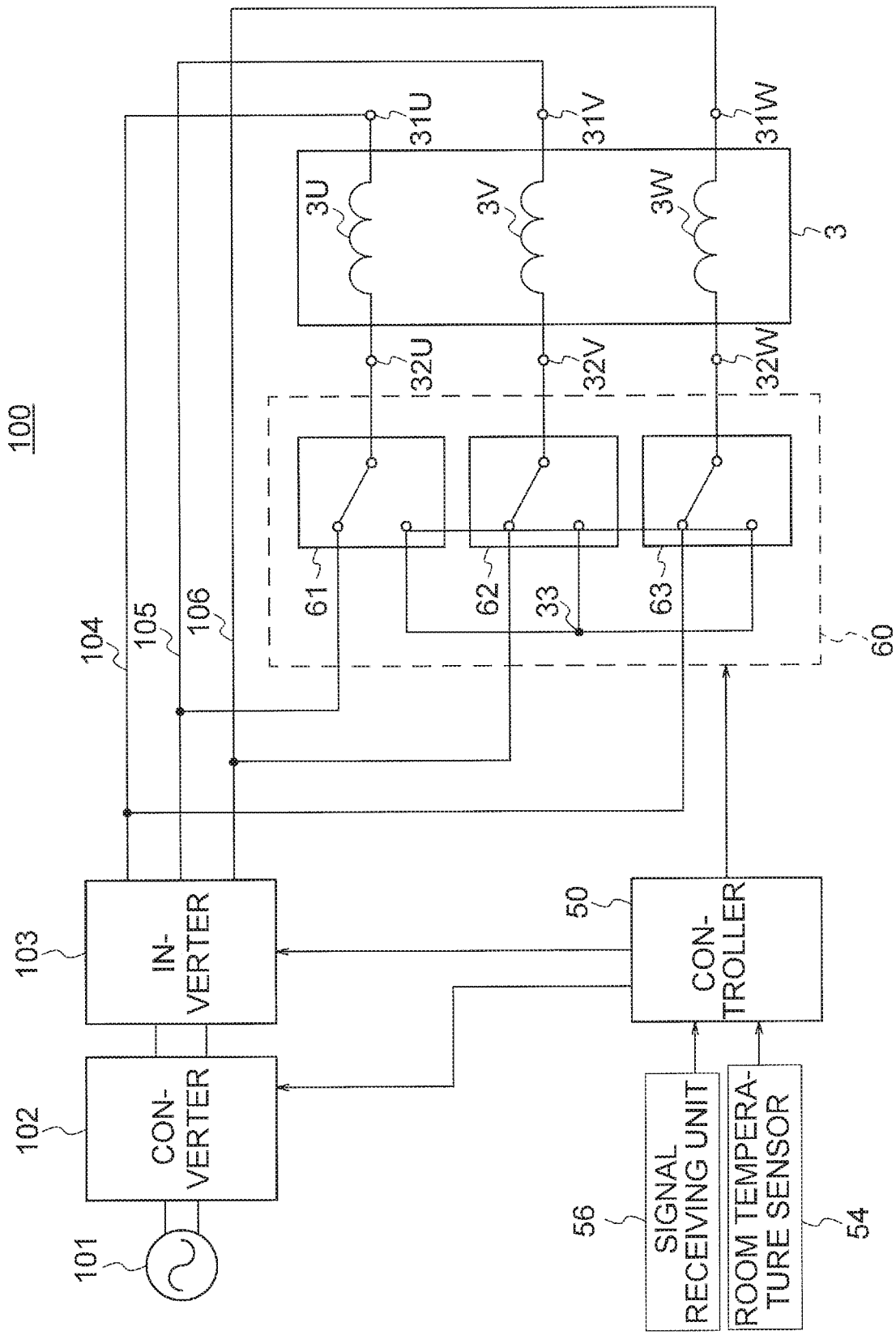
FIG. 7 is a block diagram illustrating a configuration of the driving device according to the first embodiment.

FIG. 7 is a block diagram illustrating a state where the switches 61, 62, and 63 of the connection switching unit 60 in the driving device 100 are switched. In the state illustrated in FIG. 7, the switch 61 connects the terminal 32U of the coil 3U to the wire 105, the switch 62 connects the terminal 32V of the coil 3V to the wire 106, and the switch 63 connects the terminal 32W of the coil 3W to the wire 104.

Figure 8B:
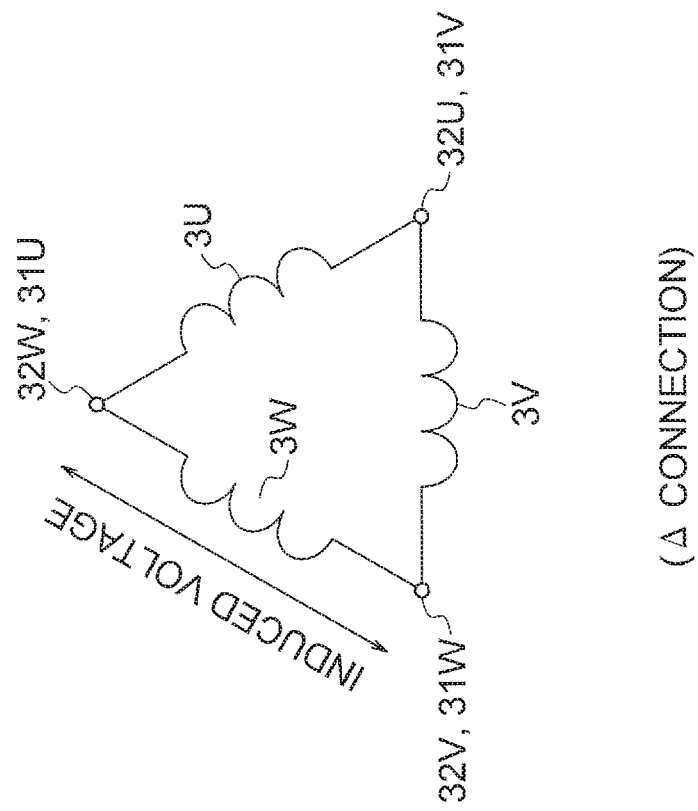
FIGS. 8(A) and 8(B) are schematic diagrams illustrating a switching operation of a connection state of coils according to the first embodiment.
Figure 8A:
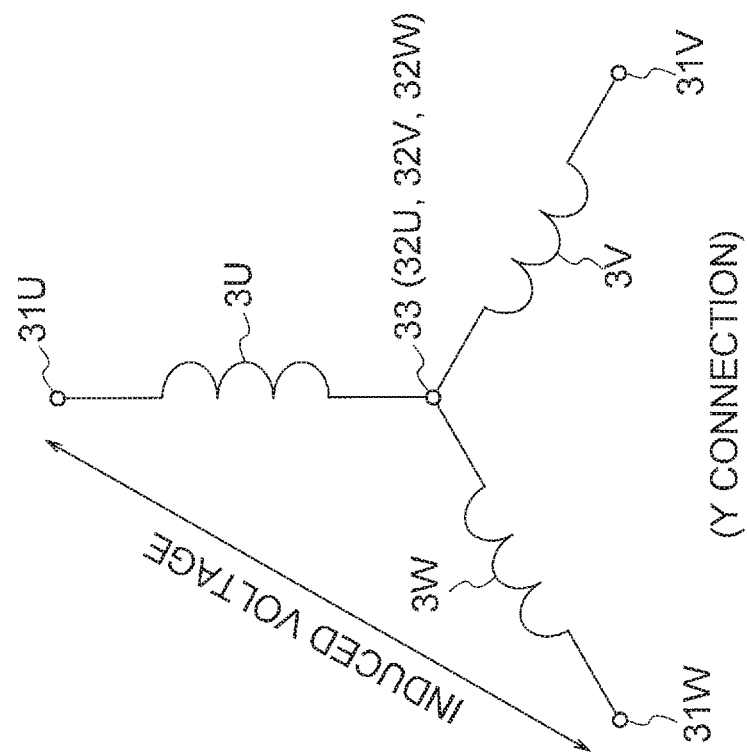

FIG. 8(A) is a schematic diagram illustrating a connection state of the coils 3U, 3V, and 3W when the switches 61, 62, and 63 are in the state shown in FIG. 6. The coils 3U, 3V, and 3W are connected to the neutral point 33 at the terminals 32U, 32V, and 32W, respectively. Thus, the connection state of the coils 3U, 3V, and 3W is the Y connection (star connection).

FIG. 8(B) is a schematic diagram illustrating a connection state of the coils 3U, 3V, and 3W when the switches 61, 62, and 63 are in the state shown in FIG. 7. The terminal 32U of the coil 3U is connected to the terminal 31V of the coil 3V via the wire 105 (FIG. 7). The terminal 32V of the coil 3V is connected to the terminal 31W of the coil 3W via the wire 106 (FIG. 7). The terminal 32W of the coil 3W is connected to the terminal 31U of the coil 3U via the wire 104 (FIG. 7). Thus, the connection state of the coils 3U, 3V, and 3W is the delta connection.

In this manner, the connection switching unit 60 is capable of switching the connection state of the coils 3U, 3V, and 3W of the motor 1 between the Y connection (first connection state) and the delta connection (second connection state) by switching the switches 61, 62, and 63.

Figure 9:
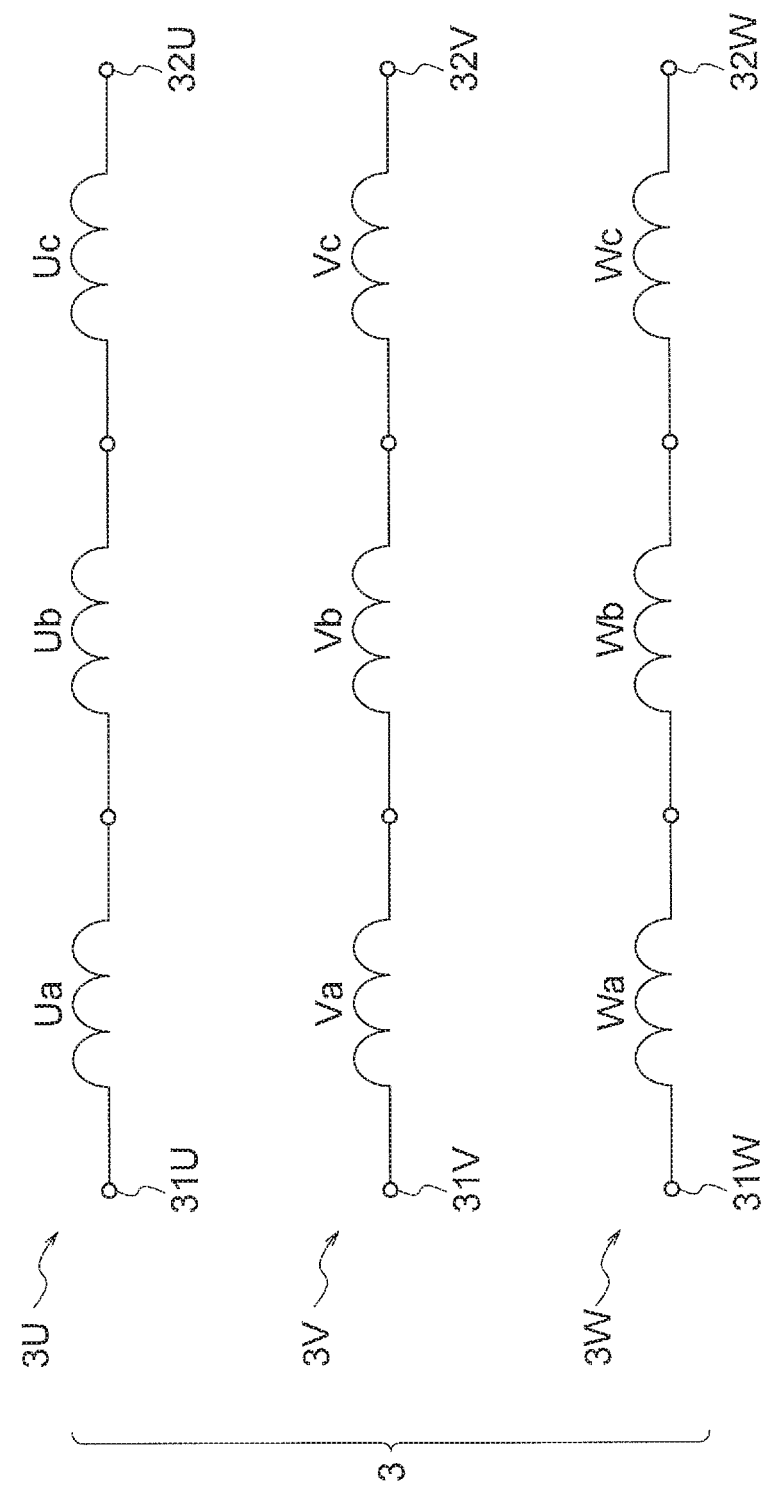
FIG. 9 is a schematic diagram illustrating the connection state of the coils according to the first embodiment.

FIG. 9 is a schematic diagram illustrating coil portions of the coils 3U, 3V, and 3W. As described above, the motor 1 has nine tooth portions 12 (FIG. 1), and each of the coils 3U, 3V, and 3W is wound around three tooth portions 12. That is, the coil 3U is obtained by connecting, in series, U-phase coil portions Ua, Ub, and Uc wound around the three tooth portions 12. Similarly, the coil 3V is obtained by connecting, in series, V-phase coil portions Va, Vb, and Vc wound around the three tooth portions 12. The coil 3W is obtained by connecting, in series, W-phase coil portions Wa, Wb, and Wc wound around the three tooth portions 12.

(Operation of Air Conditioner)

Figure 10:
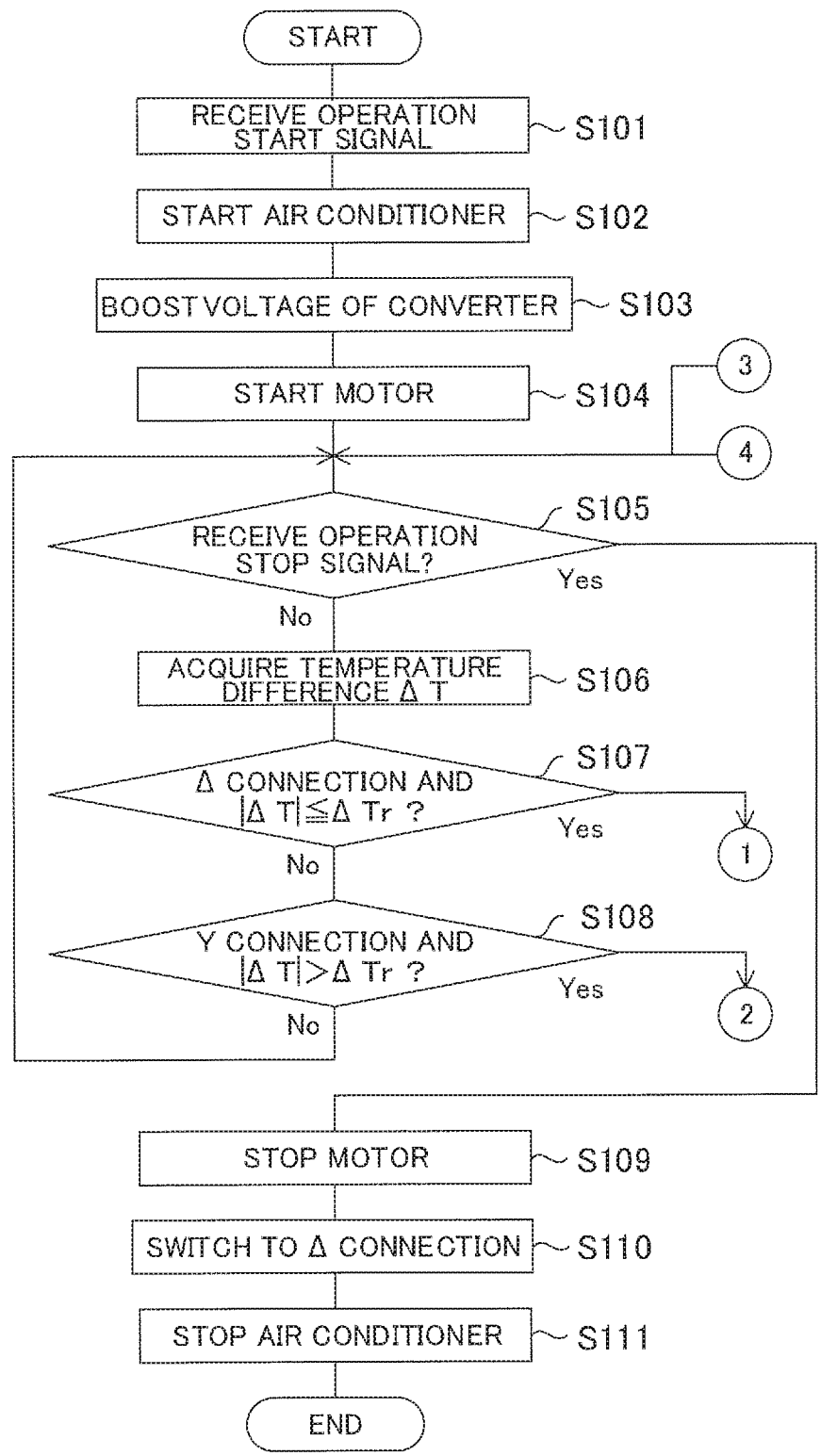
FIG. 10 is a flowchart showing a basic operation of the air conditioner according to the first embodiment.
Figure 11:
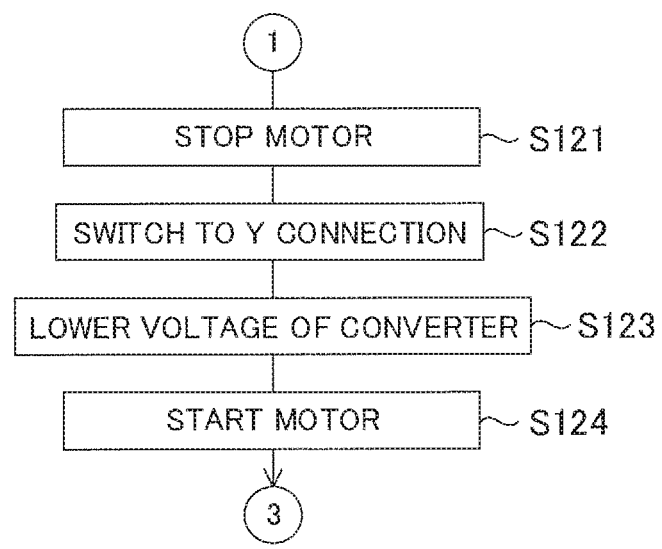
FIG. 11 is a flowchart showing a connection switching operation of the air conditioner according to the first embodiment.
Figure 12:
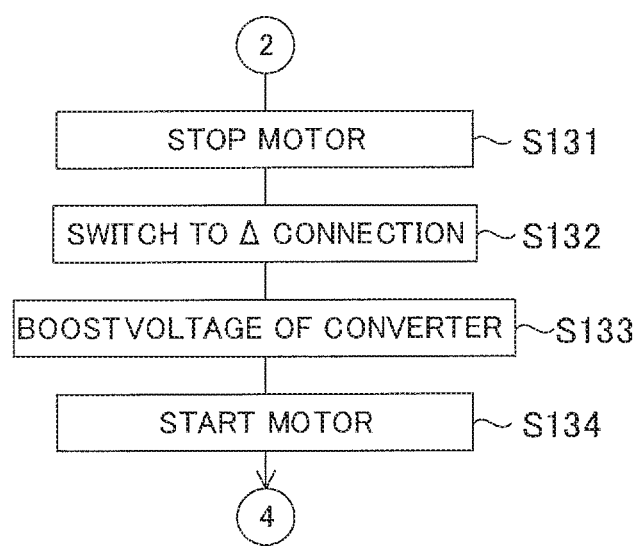
FIG. 12 is a flowchart showing a connection switching operation of the air conditioner according to the first embodiment.

FIGS. 10 through 12 are flowcharts showing a basic operation of the air conditioner 5. The controller 50 of the air conditioner 5 starts an operation when the signal reception unit 56 receives a start signal from the remote controller 55 (step S101). In this example, the CPU 57 of the controller 50 is activated. As will be described later, since the connection state of the coils 3 is switched to the delta connection when the preceding operation of the air conditioner 5 is terminated, the connection state of the coils 3 is the delta connection when the operation is started (at start-up).

Next, the controller 50 performs a start process of the air conditioner 5 (step S102). Specifically, fan motors of the indoor fan 47 and the outdoor fan 46 are driven, for example.

Then, the controller 50 outputs a voltage switching signal to the converter 102 to boost a bus voltage of the converter 102 to a bus voltage (for example, 390 V) corresponding to the delta connection (step S103). The bus voltage of the converter 102 is the maximum voltage applied from the inverter 103 to the motor 1.

Then, the controller 50 starts the motor 1 (step S104). Thus, the motor 1 is started while the connection state of the coils 3 is set to the delta connection. Further, the controller 50 controls the output voltage of the inverter 103 to control the rotation speed of the motor 1.

Specifically, the controller 50 increases the rotation speed of the motor 1 stepwise at a preset speed in accordance with the temperature difference ΔT. An allowable maximum rotation speed of the rotation speed of the motor 1 is, for example, 130 rps. As a result, the amount of the refrigerant circulated by the compressor 41 is increased, and a cooling capacity is increased in the case of the cooling operation whereas a heating capacity is increased in the case of the heating operation.

Further, when the room temperature Ta approaches the set temperature Ts due to air conditioning effect and the temperature difference ΔT shows a decreasing tendency, the controller 50 reduces the rotation speed of the motor 1 in accordance with the temperature difference ΔT. When the temperature difference ΔT decreases to a preset temperature near zero (but larger than zero), the controller 50 operates the motor 1 at an allowable minimum rotation speed (for example, 20 rps).

Further, when the temperature Ta reaches the set temperature Ts (i.e., when the temperature difference ΔT is zero or less), the controller 50 stops rotation of the motor 1 in order to prevent overcooling (or overheating). Accordingly, the compressor 41 is stopped. Then, when the temperature difference ΔT becomes larger than zero again, the controller 50 restarts rotation of the motor 1. The controller 50 restricts restart of rotation of the motor 1 in a short time period so as not to repeat rotation and stop of the motor 1 in a short time period.

When the rotation speed of the motor 1 reaches a preset rotation speed, the inverter 103 starts field-weakening control. The field-weakening control will be described later with reference to FIGS. 15 through 30.

The controller 50 determines whether or not an operation stop signal (signal to stop an operation of the air conditioner 5) is received from the remote controller 55 through the signal receiving unit 56 (step S105). When the operation stop signal is not received, the controller 50 proceeds to step S106. When the operation stop signal is received, the controller 50 proceeds to step S109.

The controller 50 acquires the temperature difference ΔT between the room temperature Ta detected by the room temperature sensor 54 and the set temperature Ts set by the remote controller 55 (step S106). Based on the temperature difference ΔT, the controller 50 determines whether switching of the connection state of the coils 3 from the delta connection to the Y connection is necessary or not. That is, it is determined whether or not the connection state of the coils 3 is the delta connection and an absolute value of the temperature difference ΔT is less than or equal to a threshold ΔTr (step S107). The threshold ΔTr is a temperature difference corresponding to an air-conditioning load (also referred to simply as "load") that is small enough to perform switching to the Y connection.

As described above, ΔT is represented as ΔT=Ts−Ta when the operation mode is the heating operation and is represented as ΔT=Ta−Ts when the operation is the cooling operation. Thus, in this example, the absolute value of ΔT and the threshold ΔTr are compared to each other to determine whether switching to the Y connection is necessary or not.

When the result of the comparison in step S107 indicates that the connection state of the coils 3 is the delta connection and the absolute value of the temperature difference ΔT is less than or equal to the threshold ΔTr, the process proceeds to step S121 (FIG. 11).

As shown in FIG. 11, in step S121, the controller 50 outputs a stop signal to the inverter 103 to stop rotation of the motor 1. Thereafter, the controller 50 outputs the connection switching signal to the connection switching unit 60, and switches the connection state of the coils 3 from the delta connection to the Y connection (step S122). Subsequently, the controller 50 outputs a voltage switching signal to the converter 102 to lower the bus voltage of the converter 102 to a voltage (280 V) corresponding to the Y connection (step S123), and restarts rotation of the motor 1 (step S124). Thereafter, the process returns to step S105 described above (FIG. 10).

When the result of the comparison in step S107 indicates that the connection state of the coils 3 is not the delta connection (when it is the Y connection), or that the absolute value of the temperature difference ΔT is larger than the threshold ΔTr (i.e., when switching to the Y connection is unnecessary), the process proceeds to step S108.

In step S108, it is determined whether switching from the Y connection to the delta connection is necessary or not. That is, it is determined whether or not the connection state of the coils 3 is the Y connection and the absolute value of the temperature difference ΔT described above is larger than the threshold ΔTr.

When the result of the comparison in step S108 indicates that the connection state of the coils 3 is the Y connection and the absolute value of the temperature difference ΔT is larger than the threshold ΔTr, the process proceeds to step S131 (FIG. 12).

As shown in FIG. 12, in step S131, the controller 50 stops rotation of the motor 1. Thereafter, the controller 50 outputs the connection switching signal to the connection switching unit 60, and switches the connection state of the coils 3 from the Y connection to the delta connection (step S132). Subsequently, the controller 50 outputs the voltage switching signal to the converter 102 to boost the bus voltage of the converter 102 to the voltage (390 V) corresponding to the delta connection (step S133), and restarts rotation of the motor 1 (S134).

In the case of the delta connection, the motor 1 can be driven to a higher rotation speed as compared to the case of the Y connection, and thus it is possible to respond to a larger load. It is therefore possible to converge the temperature difference ΔT between the room temperature and the set temperature in a short time period. Thereafter, the process returns to step S105 described above (FIG. 10).

When the result of the comparison in step S108 indicates that the connection state of the coils 3 is not the Y connection (i.e., when it is the delta connection), or that the absolute value of the temperature difference ΔT is less than or equal to the threshold ΔTr (i.e., when switching to the delta connection is unnecessary), the process returns to step S105.

When the operation stop signal is received in step S105 described above, rotation of the motor 1 is stopped (step S109). Thereafter, the controller 50 switches the connection state of the coils 3 from the Y connection to the delta connection (step S110). When the connection state of the coils 3 is already the delta connection, the connection state is unchanged. In this regard, although not shown in FIG. 10, when the operation stop signal is received in steps S106 through S108, the process proceeds to step S109 and rotation of the motor 1 is stopped.

Thereafter, the controller 50 performs a stop process of the air conditioner 5 (step S111). Specifically, the fan motors of the indoor fan 47 and the outdoor fan 46 are stopped. Thereafter, the CPU 57 of the controller 50 is stopped, and the operation of the air conditioner 5 is terminated.

As described above, when the absolute value of the temperature difference ΔT between the room temperature Ta and the set temperature Ts is relatively small (i.e., when the absolute value is less than or equal to the threshold ΔTr), the motor 1 is operated using the Y connection achieving high efficiency. When it is necessary to respond to a larger load, that is, when the absolute value of the temperature difference ΔT is larger than the threshold ΔTr, the motor 1 is operated using the delta connection enabling responding to a larger load. Accordingly, the operation efficiency of the air conditioner 5 can be enhanced.

Figure 13A:
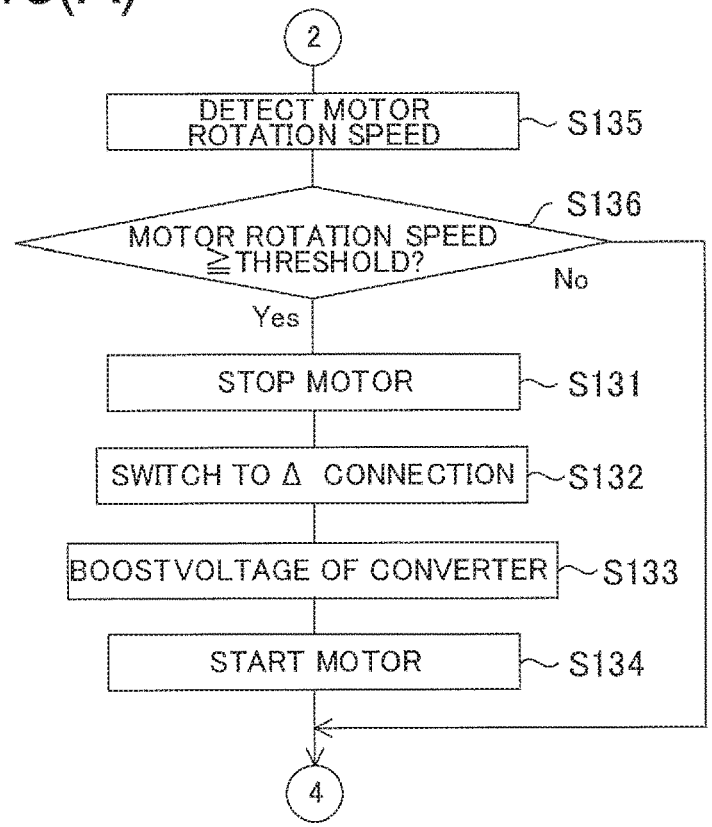
FIGS. 13(A) and 13(B) are flowcharts showing other examples of the connection switching operation of the air conditioner according to the first embodiment.

In this regard, in the switching operation from the Y connection to the delta connection (FIG. 12), as shown in FIG. 13(A), it is also possible to detect the rotation speed of the motor 1 (step S135) and to determine whether or not the detected rotation speed is greater than or equal to a threshold (reference value of rotation speed) (step S136), before step 131 in which the rotation of the motor 1 is stopped. The rotation speed of the motor 1 is detected as a frequency of an output current of the inverter 103.

In step S136, a rotation speed of 60 rps is used as a threshold of the rotation speed of the motor 1. The rotation speed of 60 rps is intermediate between a rotation speed of 35 rps corresponding to an intermediate heating condition described later and a rotation speed of 85 rps corresponding to a rated heating condition. When the rotation speed of the motor 1 is greater than or equal to the threshold, rotation of the motor 1 is stopped and switching to the delta connection is performed, and the bus voltage of the converter 102 is boosted (steps S131, S132, and S133). When the rotation speed of the motor 1 is less than the threshold, the process returns to step S105 in FIG. 10.

As above, in addition to the determination on whether the connection switching is necessary or not based on the temperature difference ΔT (step S108), the determination on whether the connection switching is necessary or not is performed based on the rotation speed of the motor 1. Thus, frequent repetition of connection switching can be sufficiently suppressed.

Figure 13B:
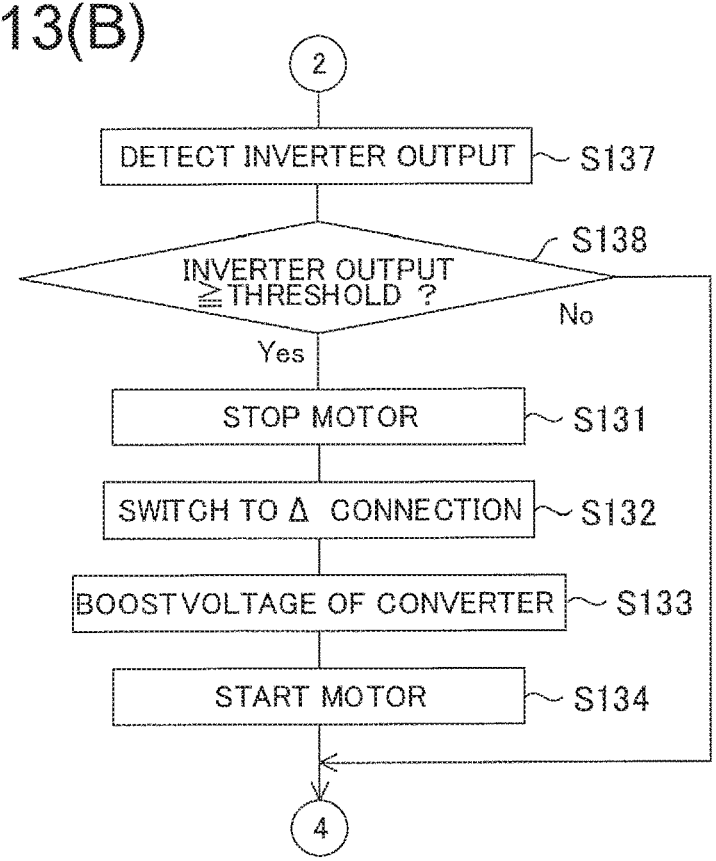

Further, as shown in FIG. 13(B), it is also possible to detect an output voltage of the inverter 103 (step S137), and to determine whether or not the detected output voltage is greater than or equal to a threshold (reference value of the output voltage) (step S138), before step S131 in which rotation of the motor 1 is stopped.

FIGS. 13(A) and 13(B) show the switching operations from the Y connection to the delta connection. However, determination based on the rotation speed of the motor 1 or the output voltage of the inverter 103 may be performed when the switching from the delta connection to the Y connection is performed.

Figure 14:
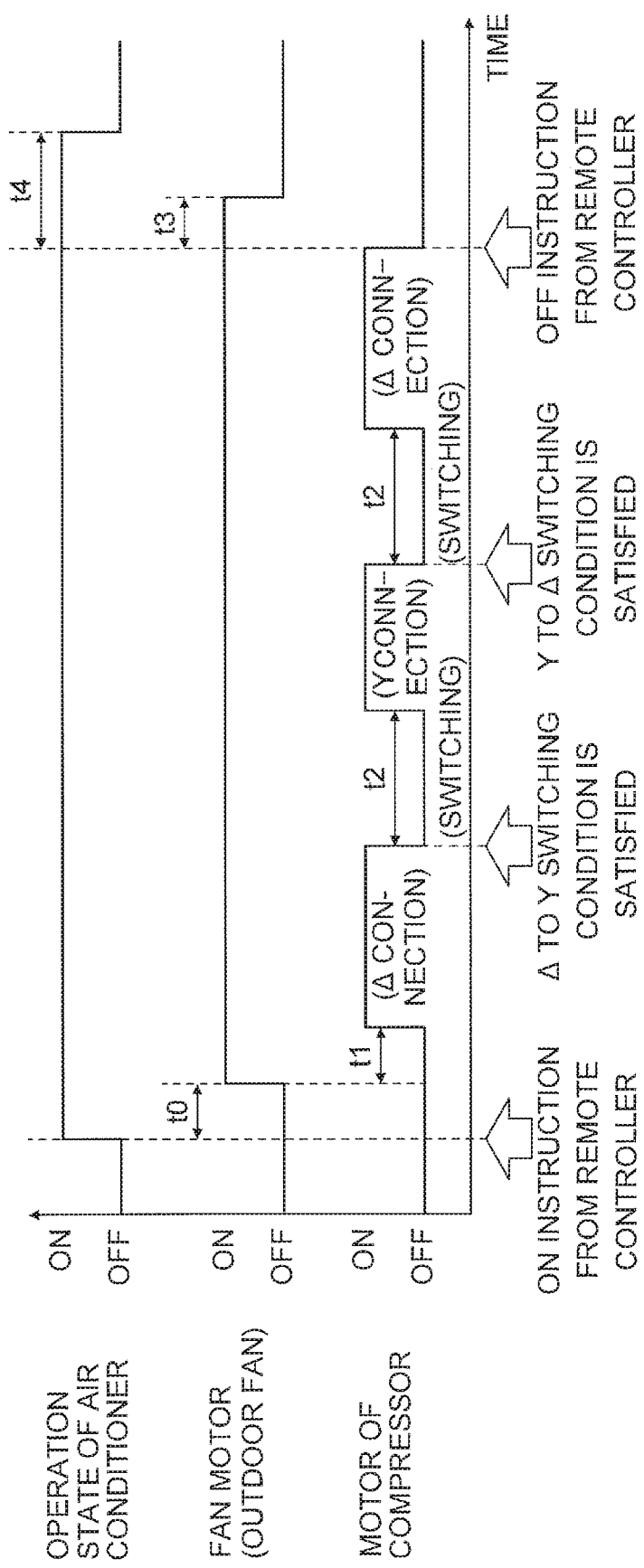
FIG. 14 is a timing chart showing an example of an operation of the air conditioner according to the first embodiment.

FIG. 14 is a timing chart showing an example of an operation of the air conditioner 5. FIG. 14 shows an operation state of the air conditioner 5 and driving states of the outdoor fan 46 and the motor 1 (compressor 41). The outdoor fan 46 is shown as an example of components other than the motor 1 of the air conditioner 5.

When the signal receiving unit 56 receives an operation start signal (ON command) from the remote controller 55, the CPU 57 is activated, and the air conditioner 5 is brought into an active state (ON state). The fan motor of the outdoor fan 46 starts rotating when a time t0 elapses after the air conditioner 5 is brought into the active state. The time t0 is a delay time due to communication between the indoor unit 5A and the outdoor unit 5B.

Rotation of the motor 1 using the delta connection is started when a time t1 elapses after the start-up of the air conditioner 5. The time t1 is a waiting time until rotation of the fan motor of the outdoor fan 46 is stabilized. By rotating the outdoor fan 46 before rotation of the motor 1 starts, a temperature of the refrigeration cycle can be prevented from rising higher than necessary.

In the example of FIG. 14, switching from the delta connection to the Y connection is performed, then switching from the Y connection to the delta connection is performed, and subsequently the operation stop signal (OFF instruction) is received from the remote controller 55. A time t2 necessary for switching the connection is a waiting time necessary for restarting the motor 1 and is set at a time necessary until a refrigerant pressure in the refrigeration cycle becomes substantially uniform.

When the operation stop signal is received from the remote control 55, rotation of the motor 1 is stopped. Then, rotation of the fan motor of the outdoor fan 46 is stopped when a time t3 elapses after the motor 1 is stopped. The time t3 is a waiting time necessary for the temperature of the refrigeration cycle to sufficiently decrease. Then, the CPU 57 stops when a time t4 elapses, and the air conditioner 5 is brought into an operation stop state (OFF state). The time t4 is a preset waiting time.

(Connection Switching Based on Temperature Detection)

In the foregoing operation of the air conditioner 5, determination on whether switching of the connection state of the coils 3 is necessary or not (steps S107 and S108) may be performed based on, for example, the rotation speed of the motor 1 or the inverter output voltage. However, since the rotation speed of the motor 1 may fluctuate in a short time period, it is necessary to determine whether a state where the rotation speed is less than or equal to a threshold (or greater than or equal to the threshold) continues for a certain time period. The same applies to the inverter output voltage.

In particular, in a case where the set temperature by the remote controller 55 is greatly changed, or in a case where the load of the air conditioner 5 rapidly changes due to opening of a window of the room or the like, there may be a delay until the operation state of the compressor 41 responds to the load change if it takes time to determine whether switching of the connection state is necessary or not. As a result, comfort provided by the air conditioner 5 may deteriorate.

Meanwhile, in this embodiment, the temperature difference ΔT (absolute value) between the room temperature Ta detected by the room temperature sensor 54 and the set temperature Ts is compared to the threshold. Since fluctuation in temperature is small in a short time period, it is not necessary to continue the detection of the temperature difference ΔT and the comparison to the threshold, and thus it is possible to determine whether switching of the connection is necessary or not in a short time period. Accordingly, the operation state of the compressor 41 can quickly respond to the load change, and comfort provided by the air conditioner 5 can be enhanced.

In the operation of the air conditioner 5 described above, determination on whether switching from the delta connection to the Y connection is necessary or not (step S107) and determination on whether switching from the Y connection to the delta connection is necessary or not (step S108) are consecutively performed. However, switching from the delta connection to the Y connection is performed when the air-conditioning load is decreasing (when the room temperature is approaching the set temperature), and the air-conditioning load is less likely to rapidly increase after that. Thus, it is unlikely that the connection switching is frequently performed.

Further, in the operation of the air conditioner 5 described above, switching of the connection state of the coils 3 (steps S122 and S132) is performed in a state where rotation of the motor 1 is stopped (i.e., a state where the inverter 103 stops outputting). Although switching of the connection state of the coils 3 may be performed in a state where electric power is continuously supplied to the motor 1, it is preferable to perform switching in a state where the power supply to the motor 1 is stopped, from the viewpoint of reliability of relay contacts constituting the switches 61, 62, and 63 (FIG. 6) of the connection switching unit 60.

In this regard, it is also possible to perform switching of the connection state of the coils 3 in a state where the rotation speed of the motor 1 is sufficiently reduced, and then to return the rotation speed to the original rotation speed.

Further, the switches 61, 62 and 63 of the connection switching unit 60 are constituted by relay contacts in this example. When the switches are constituted by semiconductor switches, however, it is unnecessary to stop rotation of the motor 1 when the connection state of the coils 3 is switched.

Further, the connection state of the coils 3 may be switched when a state in which the temperature difference ΔT (absolute value) between the room temperature Ta and the set temperature Ts is less than or equal to the threshold ΔTr is repeated a plurality of times (a preset number of times). This suppresses repetition of connection switching due to small temperature changes.

In this regard, when the temperature difference ΔT between the room temperature and the set temperature becomes zero or less ($\Delta T \leq 0$), the controller 50 stops rotation of the motor 1 in order to prevent overcooling (overheating) as described above. The connection state of the coils 3 may be switched from the delta connection to the Y connection at this timing. Specifically, whether or not the temperature difference ΔT is less than or equal to zero may be determined at step S107 described above, and when the temperature difference ΔT is less than or equal to zero, rotation of the motor 1 may be stopped and the connection state of the coils 3 may be switched to the Y connection.

Further, in the operation of the air conditioner 5 described above, since the bus voltage of the converter 102 is boosted when switching from the Y connection to the delta connection is performed, high torque can be generated by the motor 1. Thus, the difference ΔT between the room temperature and the set temperature can be converged in a shorter time period. The boosting of the bus voltage of the converter 102 will be described later.

(Regarding Connection State at Start-Up)

As described above, when the air conditioner 5 according to the first embodiment receives the operation start signal and starts the motor 1, the air conditioner 5 starts control while the connection state of the coils 3 is set to the delta connection. Further, when the operation of the air conditioner 5 is terminated, the connection state of the coils 3 is switched to the delta connection.

It is difficult to accurately detect an air-conditioning load when the air conditioner 5 starts operation. In particular, when the air conditioner 5 starts operation, the difference between the room temperature and the set temperature is generally large and the air-conditioning load is generally large. Thus, in the first embodiment, the motor 1 is started while the connection state of the coils 3 is set to the delta connection capable of responding to a larger load (i.e., capable of rotating to a higher rotation speed). Accordingly, it is possible to converge the difference ΔT between the room temperature Ta and the set temperature Ts in a shorter time period when the air conditioner 5 starts operation.

Further, even in a case where the air conditioner 5 stops for a long time period, and an abnormality (for example, inoperability of relays of the switches 61 through 63 due to sticking, or the like) occurs in the connection switching unit 60 during the stop, the motor 1 can be started with the delta connection since switching from the Y connection to the delta connection is performed before termination of the operation of the air conditioner 5. Accordingly, degradation of performance of the air conditioner 5 can be prevented, and comfort is not impaired.

In this regard, in a case where the motor 1 is started while the connection state of the coils 3 is set to the delta connection and switching to the Y connection is not performed, it is possible to obtain motor efficiency equal to that of a general motor in which the connection state of coils is fixed to the delta connection (i.e., having no connection switching function).

(Motor Efficiency and Motor Torque)

Next, improvements of motor efficiency and motor torque will be described. In general, household air conditioners are subject to Energy Conservation Act, and it is mandatory to reduce $CO_2$ emissions from the viewpoint of global environments. With the advance of technology, compression efficiency of compressors, operation efficiency of motors of the compressors, heat transfer coefficient of heat exchangers and the like have been improved, a coefficient of performance (COP) of energy consumption efficiency of the air conditioners has been increased year by year, and running costs (power consumption) and $CO_2$ emissions of the air conditioners have also been reduced.

The COP is used for evaluating performance in the case of operation under a certain temperature condition, and an operating condition of the air conditioner for each season is not taken into consideration. However, when the air conditioner is actually used, capacity and power consumption necessary for cooling or heating change with a change in outdoor air temperature. Thus, in order to perform evaluation in a state close to actual use, an annual performance factor (APF) is used as an index of energy saving. The APF is efficiency obtained by determining a certain model case, and calculating a total load and a total electric power consumption throughout the year.

In particular, in the inverter motor, which is a current mainstream, the capacity varies depending on the rotation speed of the compressor, and thus there is a problem in performing evaluation close to actual use only under the rated condition.

The APF of a household air conditioner is obtained by calculating a power consumption amount in accordance with annual total load at five evaluation points: a rated cooling condition, an intermediate cooling condition, a rated heating condition, an intermediate heating condition, and a low heating temperature. As the calculated amount is larger, energy saving performance is evaluated to be higher.

As a breakdown of the annual total load, the ratio of the intermediate heating condition is very large (50%), and the ratio of the rated heating condition is the next largest (25%). Thus, it is effective in enhancing energy saving performance of air conditioners to increase motor efficiency under the intermediate heating condition and the rated heating condition.

The rotation speed of a motor of a compressor under evaluation load conditions of the APF varies depending on a capacity of an air conditioner and performance of a heat exchanger. For example, in a household air conditioner having a refrigeration capacity of 6.3 kW, a rotation speed N1 (first rotation speed) under the intermediate heating condition is 35 rps, and a rotation speed N2 (second rotation speed) under the rated heating condition is 85 rps.

The motor 1 according to this embodiment is intended to obtain high motor efficiency and high motor torque at the rotation speed N1 corresponding to the intermediate heating condition and the rotation speed N2 corresponding to the rated heating condition. That is, out of the two load conditions for which performance is to be improved, the rotation speed at a low-speed side is N1 and the rotation speed at a high-speed side is N2.

In the motor 1 in which the permanent magnets 25 are mounted on the rotor 20, when the rotor 20 rotates, the magnetic fluxes of the permanent magnets 25 interlink with the coils 3 of the stator 10, and an induced voltage is generated in the coils 3. The induced voltage is proportional to the rotation speed (rotation velocity) of the rotor 20 and is also proportional to the number of turns of each coil 3. As the rotation speed of the motor 1 increases and the number of turns of the coil 3 increases, the induced voltage increases.

The line voltage (motor voltage) output from the inverter 103 is equal to a sum of the induced voltage and a voltage generated by a resistance and an inductance of the coils 3. The resistance and the inductance of the coils 3 are negligibly small as compared to the induced voltage, and thus the line voltage is practically dominated by the induced voltage. A magnet torque of the motor 1 is proportional to the product of the induced voltage and a current flowing through the coils 3.

As the number of turns of the coil 3 increases, the induced voltage increases. Thus, as the number of turns of the coil 3 increases, a current for generating a necessary magnet torque decreases. Consequently, a conduction loss of the inverter 103 can be reduced, and operation efficiency of the motor 1 can be enhanced. Meanwhile, since the induced voltage increases, the line voltage dominated by the induced voltage reaches an inverter maximum output voltage (i.e., a bus voltage supplied from the converter 102 to the inverter 103) at a lower rotation speed, and the rotation speed cannot be increased higher than that.

Further, when the number of turns of the coil 3 is reduced, the induced voltage decreases and the line voltage dominated by the induced voltage does not reach the inverter maximum output voltage even at a higher rotation speed, and high-speed rotation is made possible. However, since the induced voltage decreases, the current for generating the necessary magnet torque increases, and thus the conduction loss of the inverter 103 increases, so that operation efficiency of the motor 1 decreases.

Further, from the viewpoint of the switching frequency of the inverter 103, a harmonic component caused by an ON/OFF duty of switching of the inverter 103 decreases as the line voltage is closer to the inverter maximum output voltage, and thus an iron loss caused by the high harmonic component of the current can be reduced.

Figure 15:
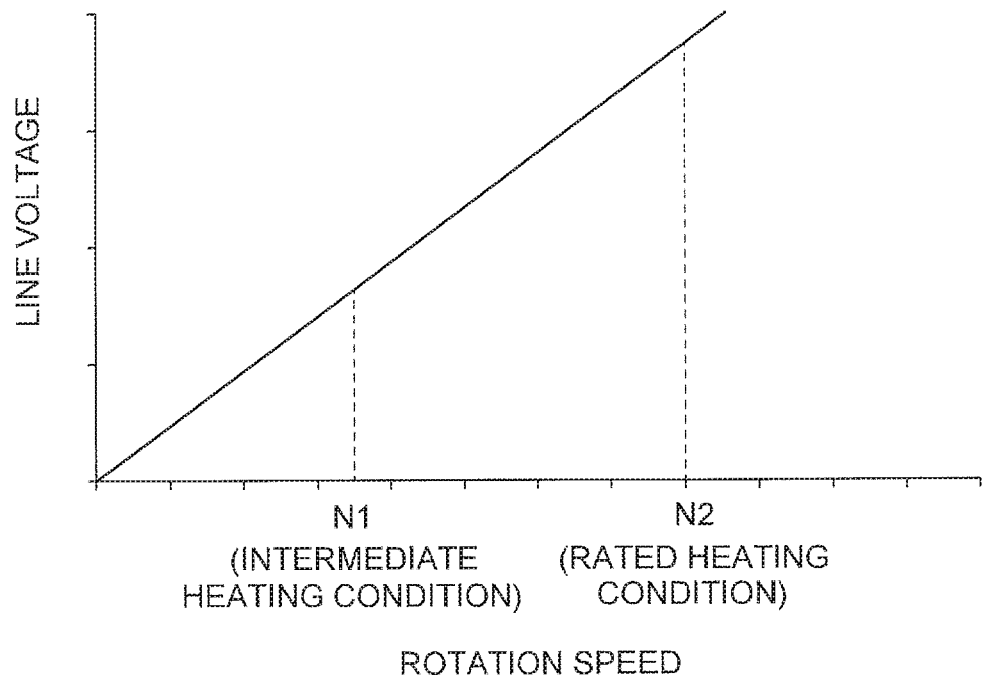
FIG. 15 is a graph showing a relationship between a line voltage and a rotation speed of the motor in a case where coils are connected in a Y connection.
Figure 16:
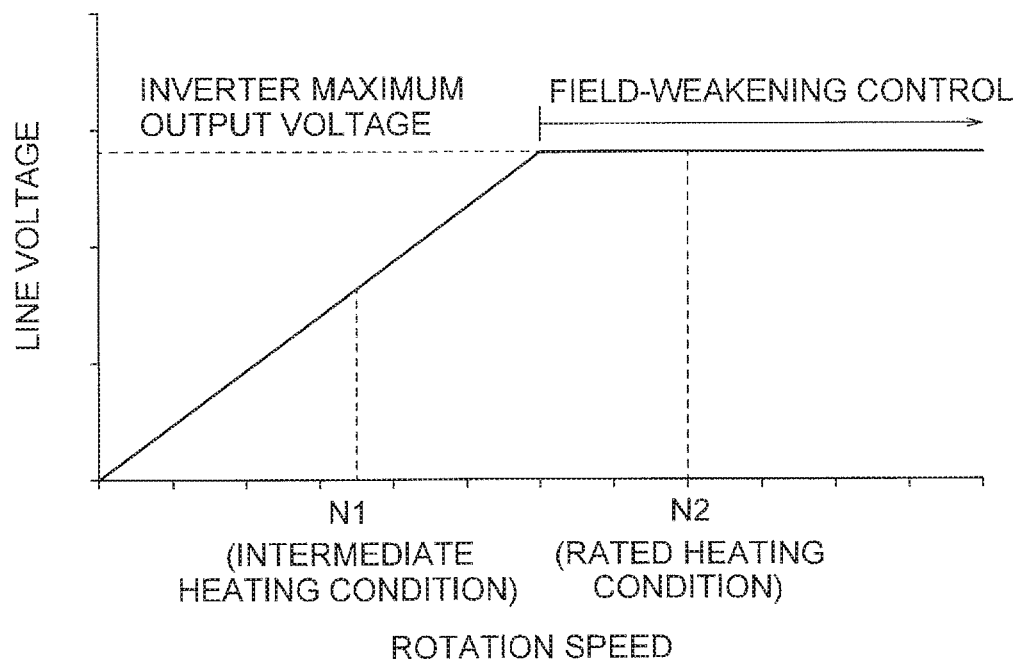
FIG. 16 is a graph showing a relationship between the line voltage and the rotation speed of the motor in a case where the coils are connected in the Y connection and field-weakening control is performed.

FIGS. 15 and 16 are graphs each showing a relationship between the line voltage and the rotation speed in the motor 1. The connection state of the coils 3 is the Y connection. The line voltage is proportional to the product of a field magnetic field and a rotation speed. When the field magnetic field is constant, the line voltage and the rotation speed are proportional as shown in FIG. 15. In this regard, in FIG. 15, the rotation speed N1 corresponds to the intermediate heating condition, and the rotation speed N2 corresponds to the rated heating condition.

The line voltage increases as the rotation speed increases. However, as shown in FIG. 16, when the line voltage reaches the inverter maximum output voltage, the line voltage cannot be increased higher than that, and thus field-weakening control by the inverter 103 is started. In this example, it is assumed that the field-weakening control is started at a rotation speed between the rotation speeds N1 and N2.

In the field-weakening control, the induced voltage is weakened by causing a current having a d-axis phase (in a direction of canceling magnetic fluxes of the permanent magnets 25) to flow in the coils 3. This current will be referred to as a weakening current. Since the weakening current is needed to flow in addition to a usual current for generating motor torque, a copper loss due to the resistance of the coils 3 increases, and the conduction loss of the inverter 103 also increases.

Figure 17:
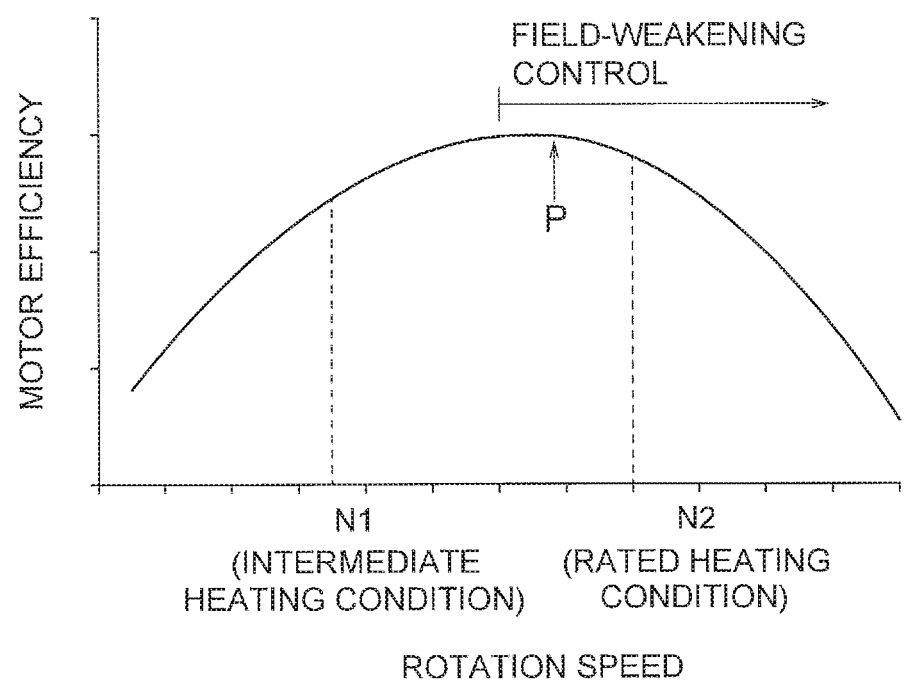
FIG. 17 is a graph showing a relationship between motor efficiency and a rotation speed in a case where the field-weakening control shown in FIG. 16 is performed.

FIG. 17 is a graph showing a relationship between the motor efficiency and the rotation speed in a case where the field-weakening control shown in FIG. 16 is performed. As shown in FIG. 17, the motor efficiency increases as the rotation speed increases, and immediately after the field-weakening control starts, the motor efficiency reaches its peak as indicated by an arrow P.

When the rotation speed further increases, the weakening current flowing in the coils 3 also increases, and thus the copper loss increases accordingly so that the motor efficiency decreases. In the overall efficiency that is the product of the motor efficiency and the inverter efficiency, a change represented by a curve similar to that in FIG. 17 is observed.

Figure 18:
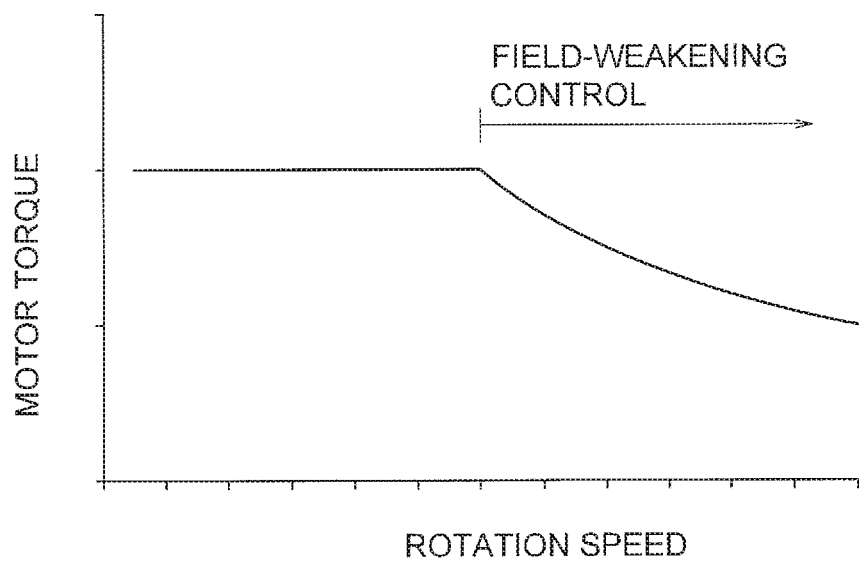
FIG. 18 is a graph showing a relationship between motor torque and the rotation speed in a case where the field-weakening control shown in FIG. 16 is performed.

FIG. 18 is a graph showing a relationship between the maximum torque and the rotation speed of the motor in a case where the field-weakening control shown in FIG. 16 is performed. Before the field-weakening control is started, the maximum torque of the motor is constant (due to, for example, restriction by a current threshold). When the field-weakening control is started, the maximum torque of the motor 1 decreases as the rotation speed increases. The maximum torque of the motor 1 is set to be larger than a load (necessary load) actually generated by the motor 1 when a product is used. Hereinafter, the maximum torque of the motor will be referred to as motor torque, for convenience of description.

Figure 19:
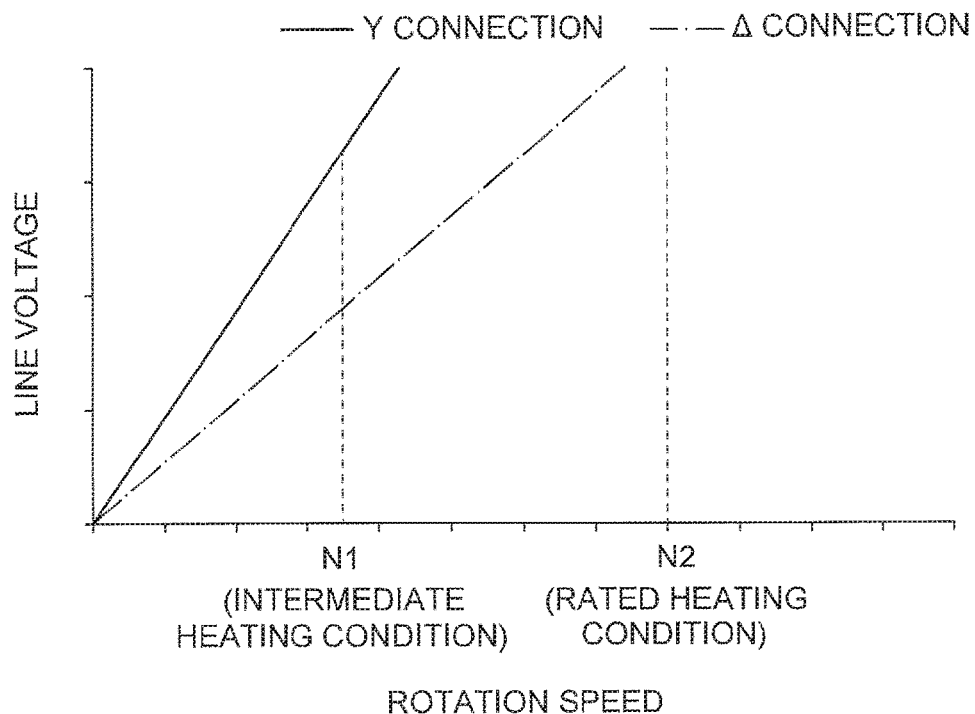
FIG. 19 is a graph showing relationships between the line voltage and the rotation speed in the case where the connection state of the coils is a Y connection and in the case where the connection state of the coils is a delta connection.

FIG. 19 is a graph showing relationships between the line voltage and the rotation speed for the Y connection and the delta connection. In a case where the connection state of the coils 3 is the delta connection, a phase impedance of the coils 3 is 1/√3 times as large as a phase impedance in a case where the connection state of the coils 3 is the Y connection, suppose that the number of turns is the same in each case. Thus, the line voltage (chain line) in the case where the connection state of the coils 3 is the delta connection is 1/√3 times as high as the line voltage (solid line) in the case where the connection state of the coils 3 is the Y connection, suppose that the rotation speed is the same in each case.

That is, when the coils 3 are connected in the delta connection, when the number of turns is made √3 times as large as the number of turns in the case of the Y connection, the line voltage (motor voltage) is equivalent to that in the case of the Y connection for the same rotation speed N. Thus, an output current of the inverter 103 is also equivalent to that in the case of the Y connection.

In motors in which the number of turns around each tooth is several tens or more, the Y connection is more often used than the delta connection for the following reasons. One reason is that the number of turns of each coil in the delta connection is larger than that in the Y connection, and thus the time necessary for winding the coils is longer in a manufacturing process. Another reason is that there is a possibility that a circulating current may occur in the case of the delta connection.

In general, in a motor employing the Y connection, the number of turns of the coil is adjusted so that the line voltage (motor voltage) reaches the inverter maximum output voltage at the rotation speed N2 (i.e., the rotation speed at the high-speed side of the rotation speeds for which performance is to be enhanced). In this case, however, the motor is operated with the line voltage lower than the inverter maximum output voltage at the rotation speed N1 (i.e., the rotation speed at the low-speed side of the rotation speeds for which performance is to be enhanced), and thus it is difficult to obtain high motor efficiency.

Thus, the connection state of the coils is set to the Y-connection, the number of turns is adjusted so that the line voltage reaches the inverter maximum output voltage at a rotation speed slightly lower than the rotation speed N1, and control is performed to switch the connection state of the coils to the delta connection before the motor reaches the rotation speed N2.

Figure 20:
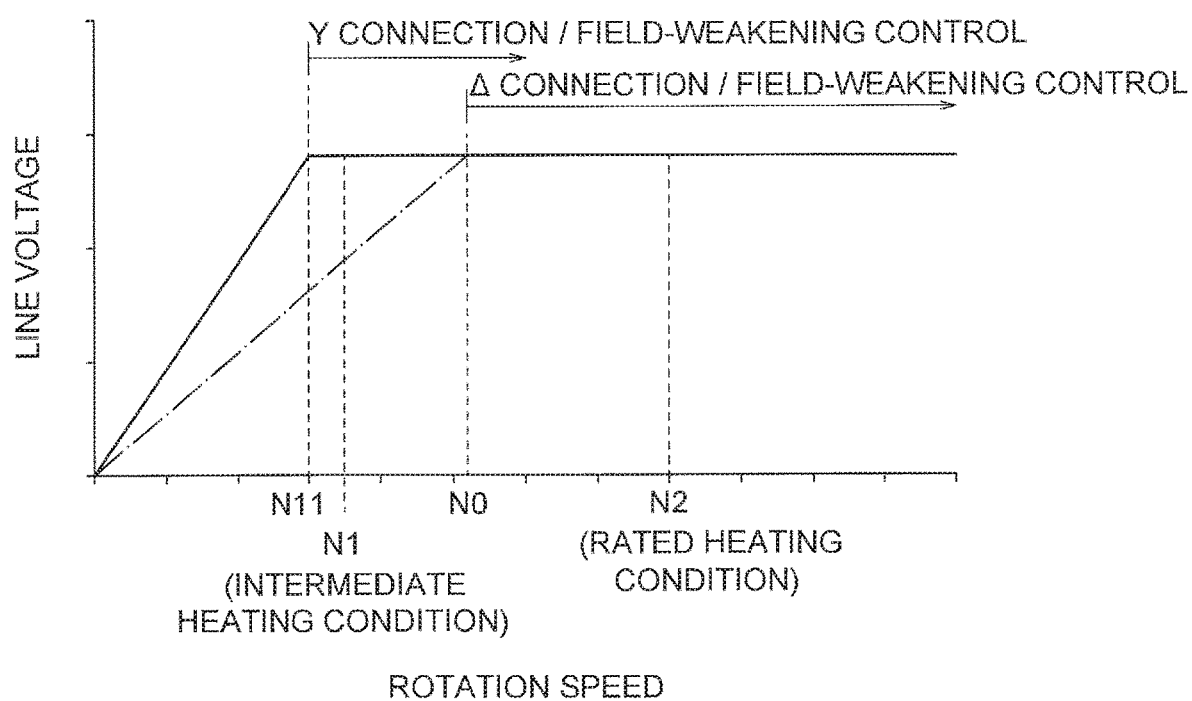
FIG. 20 is a graph showing a relationship between the line voltage and the rotation speed in a case where switching from the Y connection to the delta connection is performed.

FIG. 20 is a graph showing a relationship between the line voltage and the rotation speed in the case where switching from the Y connection to the delta connection is performed. In the example shown in FIG. 20, when the motor reaches a rotation speed (hereinafter referred to as a rotation speed N11) slightly lower than the rotation speed N1 (intermediate heating condition), the field-weakening control described above is started. When the rotation speed N further increases and reaches a rotation speed N0, switching from the Y connection to the delta connection is performed. Here, the rotation speed N11 is 5% lower than the rotation speed N1 (i.e., N11=N1×0.95).

By switching to the delta connection, the line voltage decreases to be 1/√3 times as high as that in the Y connection, and thus the degree of field-weakening can be reduced (i.e., the weakening current can be reduced). Accordingly, a copper loss due to the weakening current can be reduced, and decreases in motor efficiency and motor torque can be suppressed.

Figure 21:
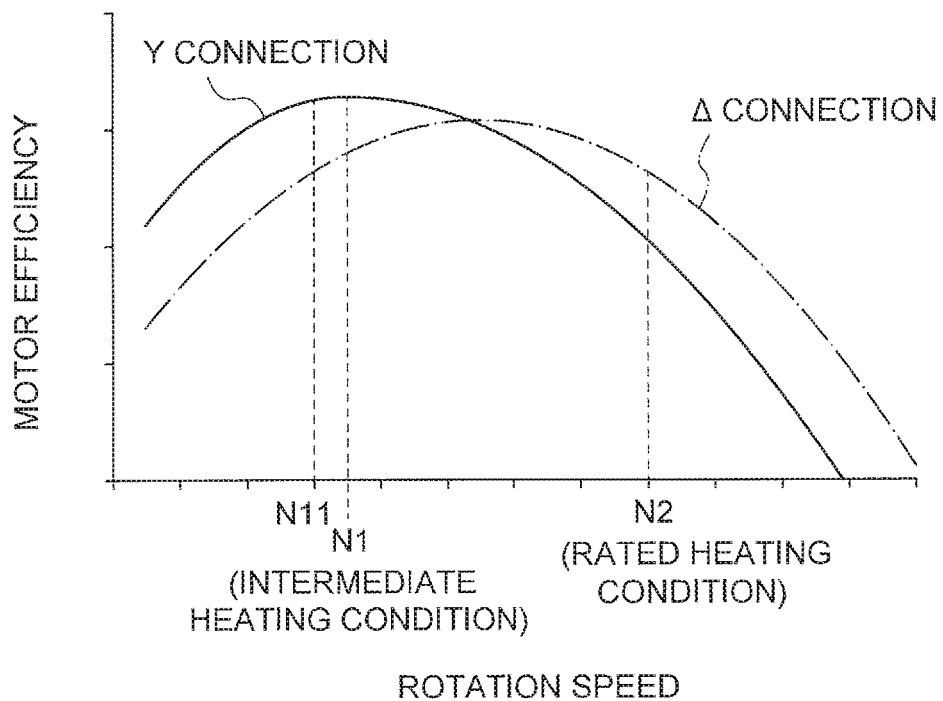
FIG. 21 is a graph showing relationships between the motor efficiency and the rotation speed in the case where the connection state of the coils is the Y connection and in the case where the connection state of the coils is the delta connection.

FIG. 21 is a graph showing relationships between the motor efficiency and the rotation speed for the Y connection and the delta connection. As described above, the connection state of the coils 3 is the Y connection and the number of turns is adjusted so that the line voltage reaches the inverter maximum output voltage at the rotation speed N11 slightly lower than the rotation speed N1. Thus, as indicated by the solid line in FIG. 21, high motor efficiency can be obtained at the rotation speed N1.

Meanwhile, in the case of the delta connection, motor efficiency higher than that in the Y connection can be obtained at the rotation speed N2 as indicated by the chain line in FIG. 21, suppose that the number of turns of the coil 3 is the same. Thus, by switching from the Y connection to the delta connection at an intersection of the solid line and the chain line shown in FIG. 21, high motor efficiency can be obtained at both of the rotation speed N1 (intermediate heating condition) and the rotation speed N2 (rated heating condition).

Thus, as described with reference to FIG. 20, the connection state of the coils 3 is set to the Y connection, the number of turns is adjusted so that the line voltage reaches the inverter maximum output voltage at the rotation speed N11 (rotation speed slightly lower than the rotation speed N1), and control is performed to switch from the Y connection to the delta connection at the rotation speed N0 higher than the rotation speed N1.

However, motor efficiency cannot be sufficiently enhanced by simply switching the connection state of the coils 3 from the Y connection to the delta connection. This will be described below.

Figure 22:
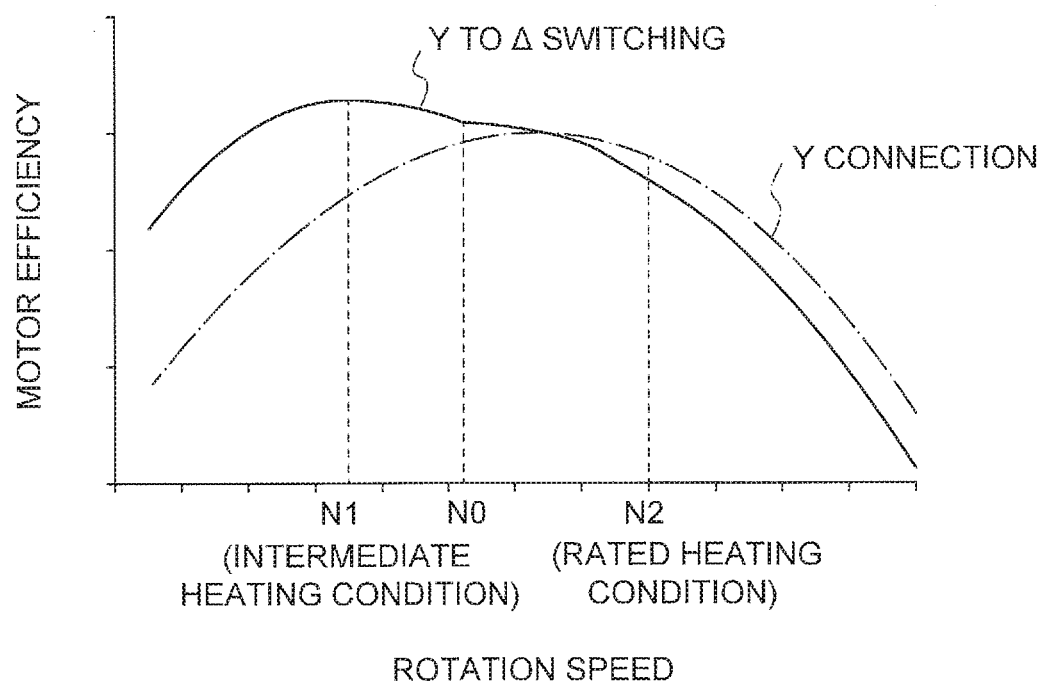
FIG. 22 is a graph showing a relationship between the motor efficiency and the rotation speed in a case where the connection state of the coils is the Y connection, the number of turns is adjusted so that the line voltage reaches an inverter maximum output voltage at a rotation speed slightly lower than that in an intermediate heating condition, and switching from the Y connection to the delta connection is performed.

FIG. 22 is a graph showing a relationship between the motor efficiency and the rotation speed in a case (solid line) where the connection state of the coils 3 is the Y connection, the number of turns is adjusted so that the line voltage reaches the inverter maximum output voltage at the rotation speed N11, and switching from the Y connection to the delta connection is performed at the rotation speed N0. The broken line shows a relationship between the motor efficiency and the rotation speed in a case where field-weakening control is performed while the connection state of the coils 3 is set to the Y-connection as shown in FIG. 17.

The line voltage is proportional to the rotation speed. For example, in a household air conditioner having a refrigeration capacity of 6.3 kW, the rotation speed N1 (intermediate heating condition) is 35 rps and the rotation speed N2 (rated heating condition) is 85 rps, and thus the line voltage in the rated heating condition is 2.4 times (=85/35) as high as the line voltage in the intermediate heating condition.

The line voltage in the rated heating condition (rotation speed N2) after the connection state of the coils 3 is switched to the delta connection is 1.4 times (=85/35/√3) as high as the inverter maximum output voltage. Since the line voltage cannot be made larger than the inverter maximum output voltage, the field-weakening control is started.

In the field-weakening control, the weakening current necessary for weakening the field flows in the coils 3, and thus the copper loss increases and the motor efficiency and the motor torque decrease. Consequently, as indicated by the solid line in FIG. 22, the motor efficiency in the rated heating condition (rotation speed N2) cannot be improved.

In order to reduce the degree of field-weakening (i.e., reduce the weakening current) in the rated heating condition (rotation speed N2), it is necessary to reduce the line voltage by reducing the number of turns of the coils 3. In this case, the line voltage in the intermediate heating condition (rotation speed N1) also decreases, and the improving effect of the motor efficiency by switching the connection decreases.

That is, when there are two load conditions for which performance is to be improved and the rotation speed N1 at the low-speed side and the rotation speed N2 at the high-speed side satisfy (N2/N1)>√3, the field-weakening control is necessary even when switching from the Y connection to the delta connection is performed. Thus, sufficient improving effect of the motor efficiency cannot be obtained by simply performing switching from the Y connection to the delta connection.

Figure 23:
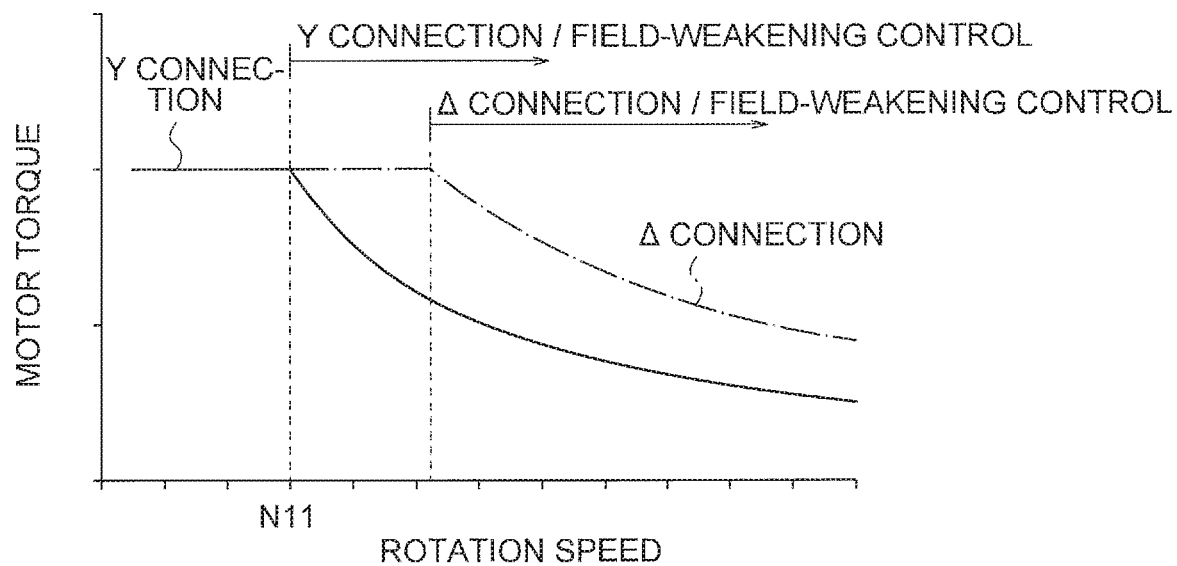
FIG. 23 is a graph showing relationships between the motor torque and the rotation speed in the case where the connection state of coils is the Y connection and in the case where the connection state of coils is the delta connection.

FIG. 23 is a graph showing relationships between the motor torque and the rotation speed for the Y connection and the delta connection. In the case of the Y connection, as described with reference to FIG. 18, the motor torque is constant with respect to an increase in the rotation speed N, but when the field-weakening control is started, the motor torque decreases as the rotation speed N increases. In the case of the delta connection, the field-weakening control is started at a higher rotation speed than that in the case of the Y connection (N11), but when the field-weakening control is started, the motor torque decreases as the rotation speed N increases.

Figure 24:
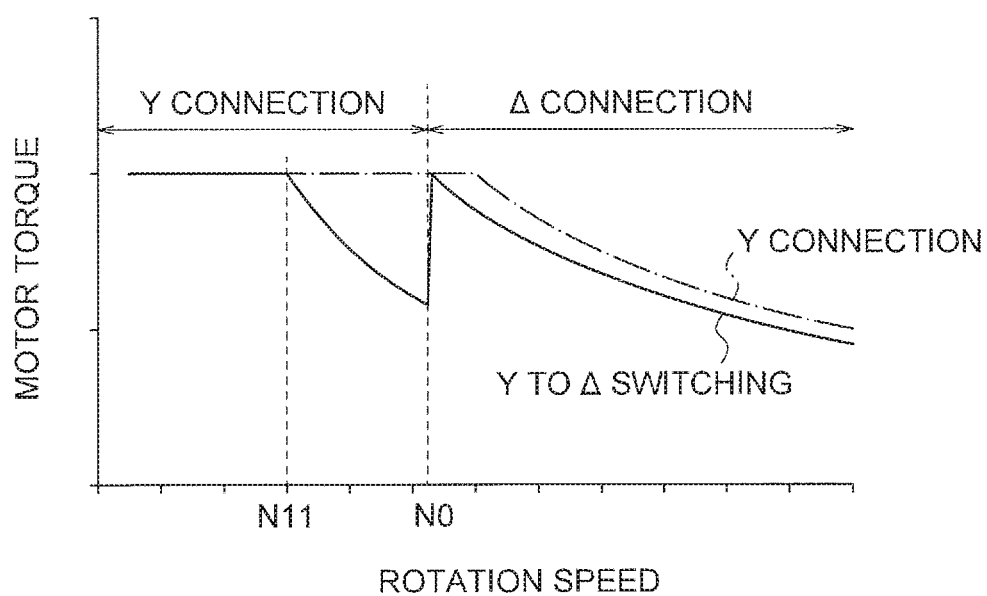
FIG. 24 is a graph showing a relationship between the motor torque and the rotation speed in the case where the connection state of the coils is the Y connection, the number of turns is adjusted so that the line voltage reaches the inverter maximum output voltage at the rotation speed slightly lower than that in the intermediate heating condition, and switching from the Y connection to the delta connection is performed.

FIG. 24 is a graph showing a relationship between the motor torque and the rotation speed in a case where the connection state of the coils 3 is the Y connection, the number of turns is adjusted so that the line voltage reaches the inverter maximum output voltage at the rotation speed N11 (rotation speed slightly lower than the rotation speed N1), and switching from the Y connection to the delta connection is performed at the rotation speed N0 higher than the rotation speed N1. As shown in FIG. 24, when the rotation speed reaches the rotation speed N11 and the field-weakening control is started, the motor torque decreases as the rotation speed N increases.

When the rotation speed further increases to reach the rotation speed N0 and switching from the Y connection to the delta connection is performed, the field-weakening control temporarily stops, and thus the motor torque increases. However, when the rotation speed N further increases and the field-weakening control is started, the motor torque decreases as the rotation speed N increases. In this manner, simply switching from the Y connection to the delta connection is not enough to suppress a decrease in the motor torque especially in a high rotation speed range.

Thus, the driving device 100 according to the first embodiment switches the bus voltage by the converter 102, in addition to switching of the connection state of the coils 3 by the connection switching unit 60. The converter 102 is supplied with a power supply voltage (200 V) from the power source 101 and supplies the bus voltage to the inverter 103. The converter 102 is preferably constituted by an element exhibiting a small loss due to an increase in voltage (boosting), such as a SiC element or a GaN element.

Specifically, a bus voltage V1 (first bus voltage) when the connection state of the coils 3 is the Y connection is set to 280 V (DC). Meanwhile, a bus voltage V2 (second bus voltage) when the connection state of the coils 3 is the delta connection is set to 390 V (DC). That is, the bus voltage V2 in the case of the delta connection is set to 1.4 times as high as the bus voltage V1 in the case of the Y connection. In this regard, it is sufficient that the bus voltage V2 satisfies $V2 \geq (V1/\sqrt{3}) \times N2/N1$ in relation to the bus voltage V1. The inverter 103 supplied with the bus voltage from the converter 102 supplies the line voltage to the coils 3. The inverter maximum output voltage is $1/\sqrt{2}$ of the bus voltage.

Figure 25:
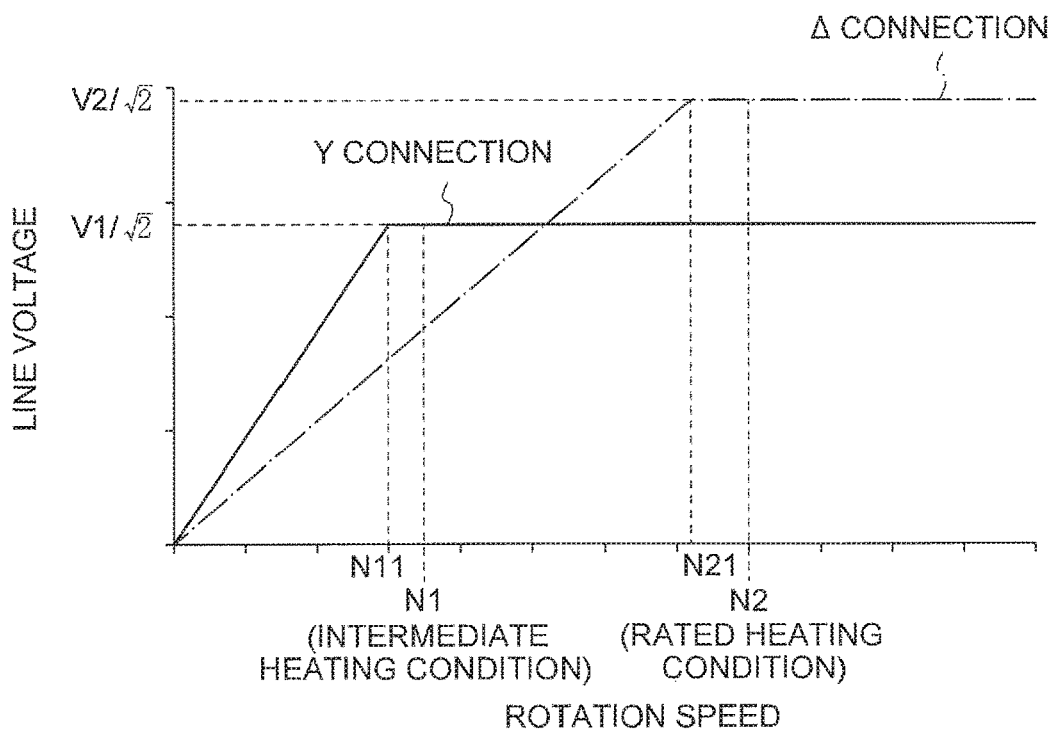
FIG. 25 is a graph showing a relationship between the line voltage and the rotation speed in a case where a bus voltage is switched by a converter.

FIG. 25 is a graph showing relationships between the line voltage and the rotation speed in a case where the bus voltage is switched by the converter 102 for the Y connection and the delta connection. As shown in FIG. 25, the line voltage (solid line) in the case where the connection state of the coils 3 is the Y connection is $1/\sqrt{2}$ (i.e., $V1 \times 1/\sqrt{2}$) of the bus voltage V1 at maximum. The line voltage (chain line) in the case where the connection state of the coils 3 is the delta connection is $1/\sqrt{2}$ (i.e., $V2 \times 1/\sqrt{2}$) of the bus voltage V2 at maximum.

Figure 26:
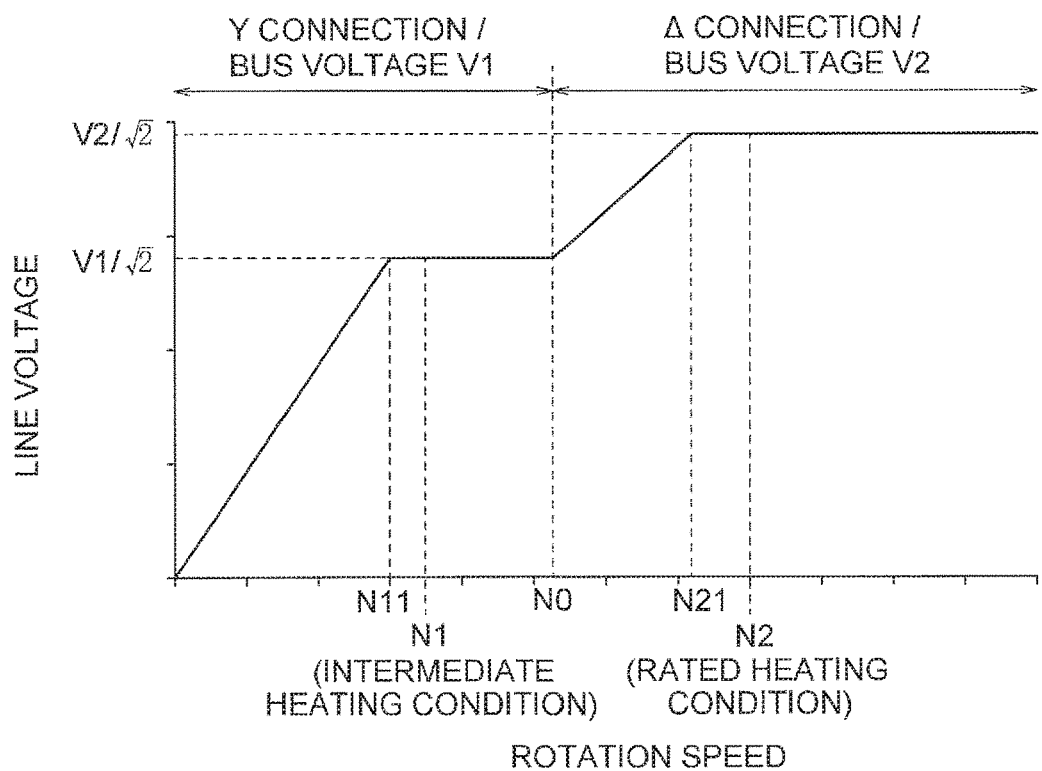
FIG. 26 is a graph showing a relationship between the line voltage and the rotation speed in a case where switching of the connection state of the coils and switching of the bus voltage of the converter are performed in the first embodiment.

FIG. 26 is a graph showing a relationship between the line voltage and the rotation speed in a case where the connection state is switched by the connection switching unit 60 and the bus voltage is switched by the converter 102. As shown in FIG. 26, in a rotation speed range including the rotation speed N1 (intermediate heating condition), the connection state of the coils 3 is the Y connection. As the rotation speed increases, the line voltage increases, and the line voltage reaches the inverter maximum output ($V1 \times 1/\sqrt{2}$) at the rotation speed N11 slightly lower than the rotation speed N1. Thus, the field-weakening control is started.

When the rotation speed further increases to reach the rotation speed N0, the connection switching unit 60 switches the connection state of the coils 3 from the Y connection to the delta connection. At the same time, the converter 102 boosts the bus voltage from V1 to V2. As the bus voltage is boosted, the inverter maximum output becomes $V2 \times 1/\sqrt{2}$. At this point of time, the line voltage is lower than the inverter maximum output, and thus the field-weakening control is not performed.

Thereafter, the line voltage increases as the rotation speed N increases, the line voltage reaches the inverter maximum output ($V2 \times 1/\sqrt{2}$) at a rotation speed N21 slightly lower than the rotation speed N2 (rated heating condition), and the field-weakening control is started. In this regard, the rotation speed N21 is 5% lower than the rotation speed N2 (i.e., $N21 = N2 \times 0.95$).

In the first embodiment, the connection state of the coils 3 is switched based on the result of comparison between the temperature difference $\Delta T$ between the room temperature Ta and the set temperature Ts and the threshold $\Delta Tr$, as described above. Switching from the Y connection to the delta connection at the rotation speed N0 corresponds to the switching from the Y connection to the delta connection shown in step S108 in FIG. 10 and steps S131 through S134 in FIG. 12.

Figure 27:
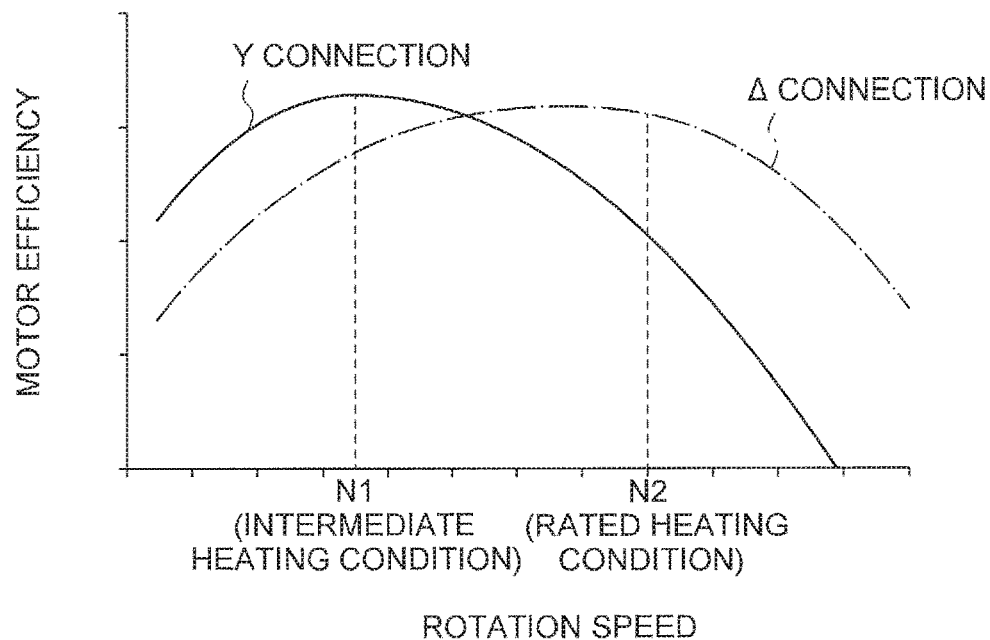
FIG. 27 is a graph showing relationships between the motor efficiency and the rotation speed in the case where the connection state of the coils is the Y connection and in the case where the connection state of the coils is the delta connection.

The improving effect of the motor efficiency in this case will be described. FIG. 27 is a graph showing relationships between the motor efficiency and the rotation speed for the Y connection and the delta connection. In FIG. 27, the motor efficiency (solid line) in the case where the connection state of the coils 3 is the Y connection is similar to the motor efficiency in the case of the Y connection shown in FIG. 21. Meanwhile, the motor efficiency (chain line) in the case where the connection state of the coils 3 is the delta connection is higher than the motor efficiency in the delta connection shown in FIG. 21 because of an increase in the bus voltage of the converter 102.

Figure 28:
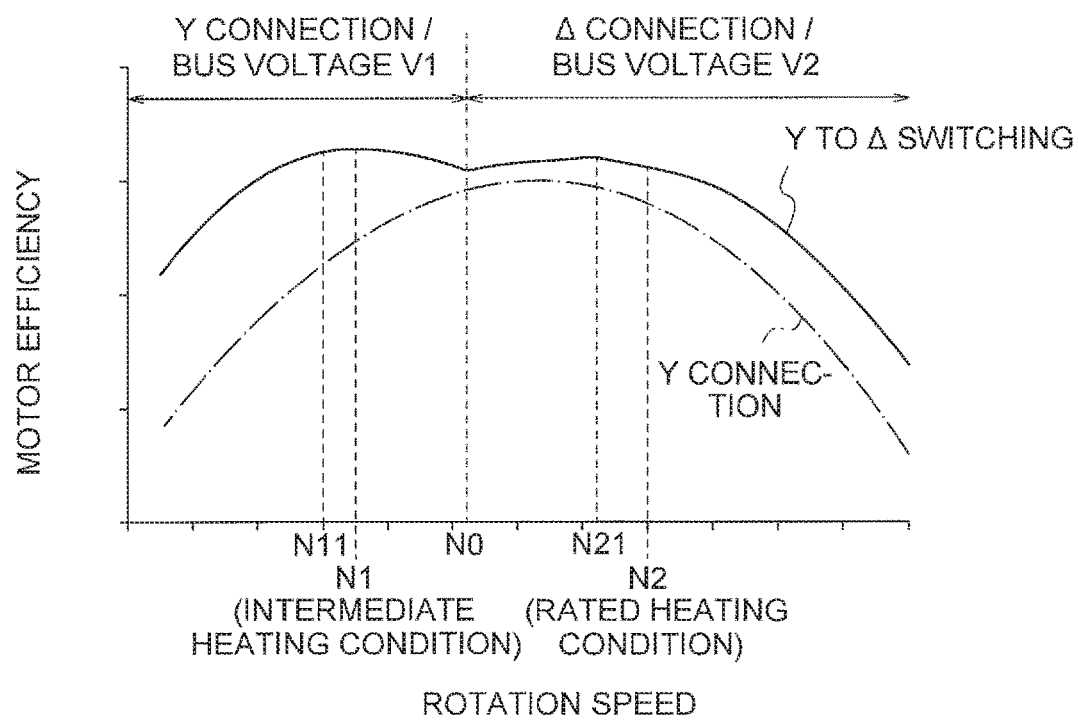
FIG. 28 is a graph showing a relationship between the motor efficiency and the rotation speed in a case where switching of the connection state of the coils and switching of the bus voltage of the converter are performed in the first embodiment.

FIG. 28 is a graph showing a relationship between the motor efficiency and the rotation speed in a case where the connection state is switched by the connection switching unit 60 and the bus voltage is switched by the converter 102. Since the connection state of the coils 3 is the Y connection and the number of turns is set so that the line voltage reaches the inverter maximum output voltage at the rotation speed N11 (rotation speed slightly lower than the rotation speed N1), high motor efficiency can be obtained in a rotation speed range including the rotation speed N1.

When the rotation speed reaches the rotation speed N11, the field-weakening control is started. When the rotation speed then reaches the rotation speed N0, the connection state of the coils 3 is switched from the Y connection to the delta connection, and the bus voltage is increased by the converter 102.

Since the inverter maximum output voltage increases with an increase in the bus voltage, the line voltage becomes lower than the inverter maximum output voltage, and accordingly the field-weakening control is stopped. As the field-weakening control is stopped, a copper loss caused by the weakening current is reduced, and thus the motor efficiency increases.

Thereafter, when the rotation speed N reaches the rotation speed N21 slightly lower than the rotation speed N2 (rated heating condition), the line voltage reaches the inverter maximum output voltage, and the field-weakening control is started. Although the copper loss increases as a result of start of the field-weakening control, high motor efficiency can be obtained since the bus voltage has been increased by the converter 102.

That is, as indicated by the solid line in FIG. 28, high motor efficiency can be obtained at both of the rotation speed N1 (intermediate heating condition) and the rotation speed N2 (rated heating condition).

Figure 29:
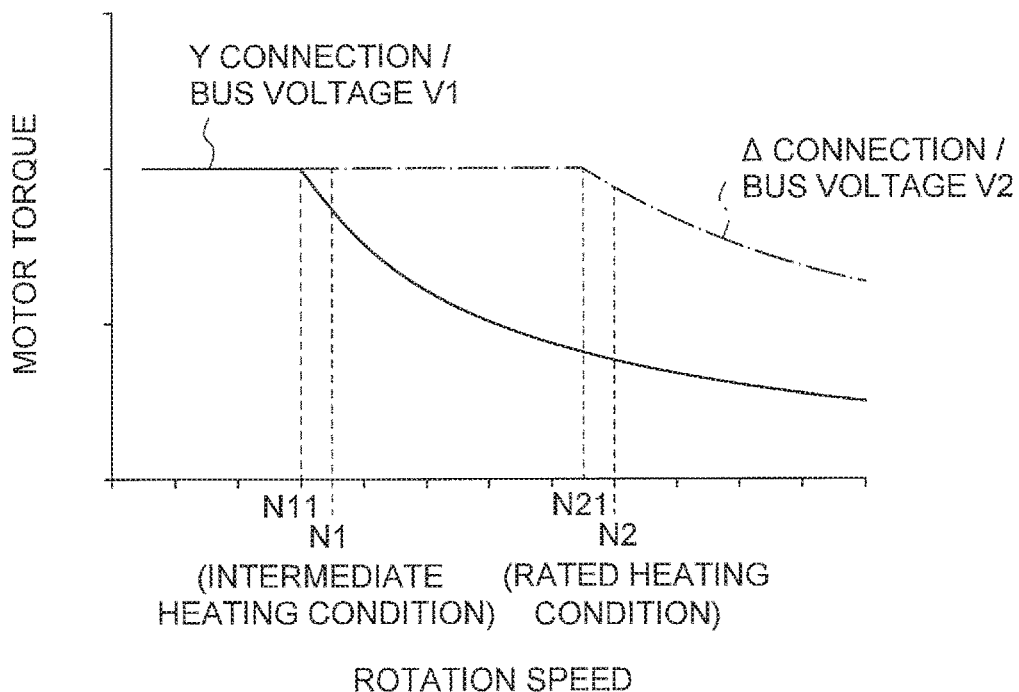
FIG. 29 is a graph showing relationships between the motor torque and the rotation speed in the case where the connection state of the coils is the Y connection and in the case where the connection state of the coils is the delta connection.

Next, the improving effect of the motor torque will be described. FIG. 29 is a graph showing relationships between the motor torque and the rotation speed in the case where the connection state of the coils 3 is the Y connection and the case where the connection state of the coils 3 is the delta connection. The motor torque (solid line) in the case of the Y connection is similar to that in FIG. 18. When the field-weakening control is started at the rotation speed N21 slightly lower than the rotation speed N2 (rated heating condition), the motor torque (chain line) in the case of the delta connection decreases as the rotation speed N increases.

Figure 30:
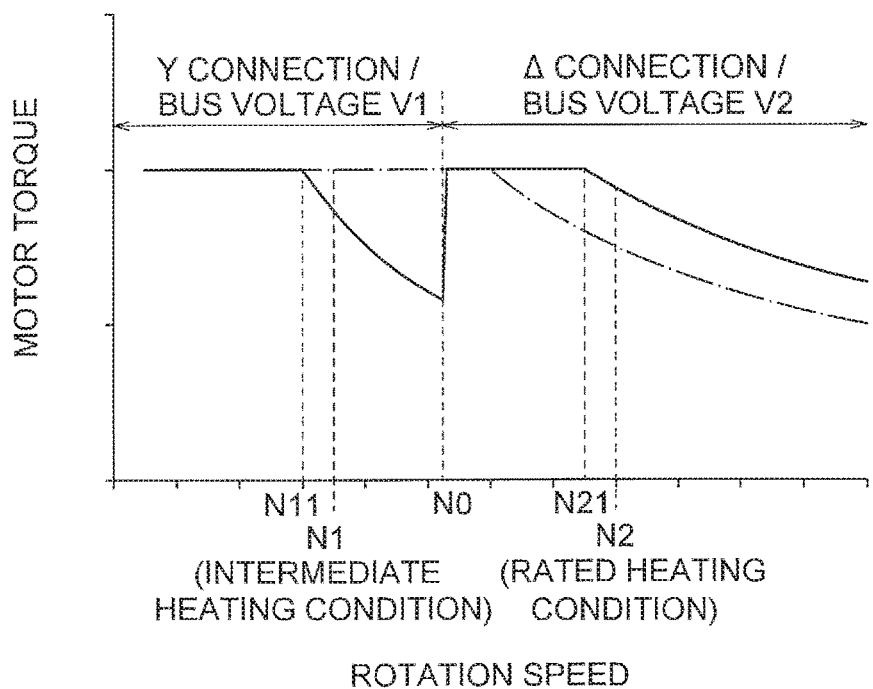
FIG. 30 is a graph showing a relationship between the motor efficiency and the rotation speed in the case where switching of the connection state of the coils and switching of the bus voltage of the converter are performed in the first embodiment.

FIG. 30 is a graph showing a relationship between the motor torque and the rotation speed in a case where the connection state of the coils 3 is the Y connection, the number of turns is adjusted so that the line voltage reaches the inverter maximum output voltage at the rotation speed N11, the connection state is switched from the Y connection to the delta connection at the rotation speed N0 (>N1), and the bus voltage is further boosted. As shown in FIG. 30, when the field-weakening control is started at the rotation speed N11 slightly lower than the rotation speed N1 (intermediate heating condition), the motor torque decreases as the rotation speed N increases.

When the rotation speed N further increases to reach the rotation speed N0, the connection state of the coils 3 is switched from the Y connection to the delta connection, and the bus voltage is raised. With the switching to the delta connection and the raising of the bus voltage, the line voltage becomes lower than the inverter maximum output voltage, and thus the field-weakening control is stopped. Accordingly, the motor torque increases. Thereafter, when the field-weakening control is started at the rotation speed N21 slightly lower than the rotation speed N2 (rated heating condition), the motor torque decreases as the rotation speed N increases.

In this manner, since the field-weakening control is not performed until the rotation speed N reaches the rotation speed N21 (rotation speed slightly lower than the rotation speed N2) after the switching to the delta connection, a decrease in motor torque can be suppressed especially in a rotation speed range including the rotation speed N2 (rated heating condition).

Specifically, as indicated by the solid line in FIG. 30, high motor torque can be obtained at both of the rotation speed N1 (intermediate heating condition) and the rotation speed N2 (rated heating condition). That is, high performance (motor efficiency and motor torque) can be obtained in both of the intermediate heating condition and the rated heating condition of the air conditioner 5.

In this regard, when the voltage of the converter 102 is boosted, a loss due to the boosting of the voltage occurs. Thus, in the connection state under the intermediate heating condition (i.e., Y connection) where a contribution ratio to the motor efficiency is the highest, it is preferable to use the power supply voltage without boosting. The power supply voltage of the power source 101 is 200 V (effective value), and the maximum value is 280 V (=200V×√2). Accordingly, it can be said that the bus voltage (280 V) of the converter 102 in the case of the Y connection is the same as the maximum value of the power supply voltage.

Further, switching of the bus voltage supplied to the inverter 103 may be performed by boosting or lowering the power supply voltage.

Further, in the operation control of the air conditioner 5 described above, the Y connection is set to the rotation speed N1 (intermediate heating condition) and the delta connection is set to the rotation speed N2 (rated heating condition). However, when no specific load condition is determined, the voltage level may be adjusted by setting the rotation speed N1 as the maximum rotation speed during the operation in the Y connection state and setting the rotation speed N2 as the maximum rotation speed during the operation in the delta connection state. With such control, the efficiency of the motor 1 can be enhanced.

As described above, in the household air conditioner 5, the efficiency of the motor 1 can be enhanced by setting the rotation speed N1 at the rotation speed in the intermediate heating condition and the rotation speed N2 at the rotation speed in the rated heating condition.

Advantages of First Embodiment

As described above, in the first embodiment, since the connection state of the coils 3 is switched based on the room temperature Ta, the connection state can be switched in a short time period. Accordingly, the operation state of the compressor 41 can quickly respond to a rapid load change of the air conditioner 5 such as a case where a window of the room is opened. As a result, comfort can be enhanced.

Further, since rotation of the motor 1 is stopped before switching of the connection state of the coils 3, reliability of the connection switching operation can be ensured even when the connection switching unit 60 is constituted by relay contacts.

Further, the connection state of the coils 3 is switched between the Y connection (first connection state) and the delta connection (second connection state) in which the line voltage is lower than in the first connection state, and therefore the connection state suitable for the rotation speed of the motor 1 can be selected.

Further, the connection state of the coils 3 is switched to the delta connection (second connection state) when the absolute value of the difference (temperature difference ΔT) between the room temperature Ta detected by the room temperature sensor 54 and the set temperature Ts is larger than the threshold ΔTr. Therefore, when the air-conditioning load is large, the rotation speed of the motor 1 can be increased and a high output can be generated.

Further, the connection state of the coils 3 is switched to the Y connection (first connection state) when the absolute value of the temperature difference ΔT is less than or equal to the threshold ΔTr, and therefore operation efficiency when the air-conditioning load is small can be improved.

Further, the field-weakening control is performed in accordance with the rotation speed of the motor 1 in each of the cases of the Y connection (first connection state) and the delta connection (second connection state), and therefore the rotation speed of the motor 1 can be increased even when the line voltage reaches the inverter maximum output voltage.

Further, since the converter 102 changes a level of the bus voltage in accordance with switching of the connection state of the coils 3 by the connection switching unit 60, high motor efficiency and high motor torque can be obtained before and after the switching of the connection state.

Further, in addition to the comparison between the difference between the room temperature Ta and the set temperature Ts and the threshold, the rotation speed of the motor 1 is compared to a reference value, and the connection state of the coils 3 is switched based on the comparison result. Thus, frequent repetition of connection switching can be effectively suppressed.

Further, in addition to the comparison between the room temperature Ta and the set temperature Ts, the output voltage of the inverter 103 is compared to the reference value, and the connection state of the coils 3 is switched based on the comparison result. Thus, frequent repetition of connection switching can be effectively suppressed.

Further, in a case where the controller 50 receives the operation stop signal from the remote controller 55 through the signal receiving unit 56, the connection state of the coils 3 is switched from the Y connection to the delta connection, and then the controller 50 terminates the operation of the air conditioner 5. In a case where the connection state of the coils 3 is already the delta connection, this connection state is unchanged. Accordingly, at the start of the operation (start-up) of the air conditioner 5, the operation of the air conditioner 5 can be started in a state where the connection state of the coils 3 is the delta connection. Accordingly, even in a case where the temperature difference ΔT between the room temperature Ta and the set temperature Ts is large, the operation of the air conditioner 5 can be started in the delta connection state, and the room temperature Ta can be quickly brought close to the set temperature Ts.

First Modification

Next, a first modification of the first embodiment will be described. In the first embodiment described above, the rotation speed N0 at which the connection state of the coils is switched from the Y connection to the delta connection (i.e., the rotation speed when the temperature difference ΔT becomes equal to the threshold ΔTr) is equal to the rotation speed N0 (temperature difference) at which the connection state is switched from the delta connection to the Y connection, but these rotation speeds may be different from each other.

Figure 31A:
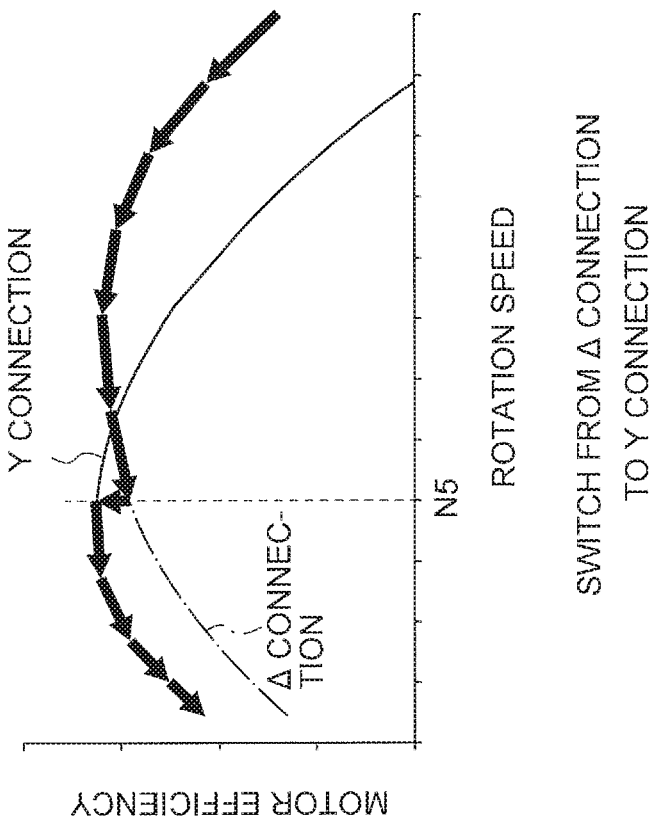
FIGS. 31(A) and 31(B) are graphs each showing a relationship between motor efficiency and a rotation speed in a first modification of the first embodiment.
Figure 31B:
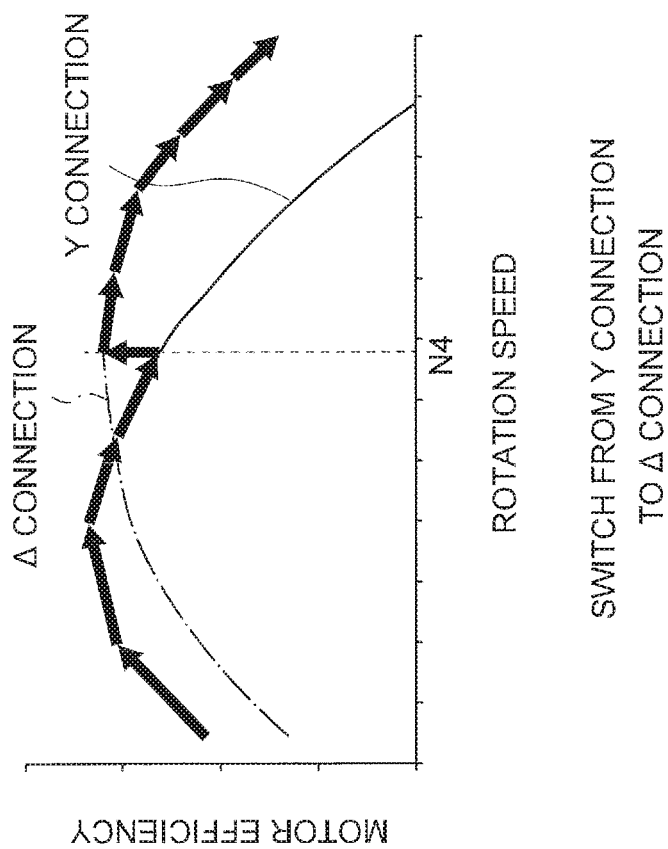

FIGS. 31(A) and 31(B) are graphs each showing a relationship between the motor efficiency and the rotation speed in a case where the connection state is switched by the connection switching unit 60 and the bus voltage is switched by the converter 102. As shown in FIGS. 31(A) and 31(B), a rotation speed N4 at which the connection state of the coils 3 is switched from the Y connection to the delta connection and a rotation speed N5 at which the connection state of the coils 3 is switched from the delta connection to the Y connection are different from each other.

Further, switching of the bus voltage by the converter 102 is performed at the same time as switching of the connection state of the coils 3. That is, the bus voltage is boosted when the rotation speed is N4 at which the Y connection is switched to the delta connection. Meanwhile, the bus voltage is lowered when the rotation speed is N5 at which the delta connection is switched to the Y connection.

Such control can be performed by, for example, setting the threshold ΔTr in step S107 and the threshold ΔTr in step S108 in FIG. 10 to different values. In the examples shown in FIGS. 31(A) and 31(B), the rotation speed N4 at which the Y connection is switched to the delta connection is higher than the rotation speed N5 at which the delta connection is switched to the Y connection, but this relationship may be reversed. The other operations and configurations in the first modification are similar to those in the first embodiment.

In this first modification, the connection state of the coils 3 is switched based on the room temperature Ta, and thus the operation state of the compressor 41 can quickly respond to a rapid load change of the air conditioner 5. In addition, high motor efficiency can be obtained by switching the bus voltage of the converter 102 in accordance with the switching of the connection state of the coils 3.

Second Modification

Next, a second modification of the first embodiment will be described. In the first embodiment described above, the bus voltage of the converter 102 is switched to two stages (V1/V2), but the bus voltage may be switched to three stages as shown in FIG. 32.

Figure 32:
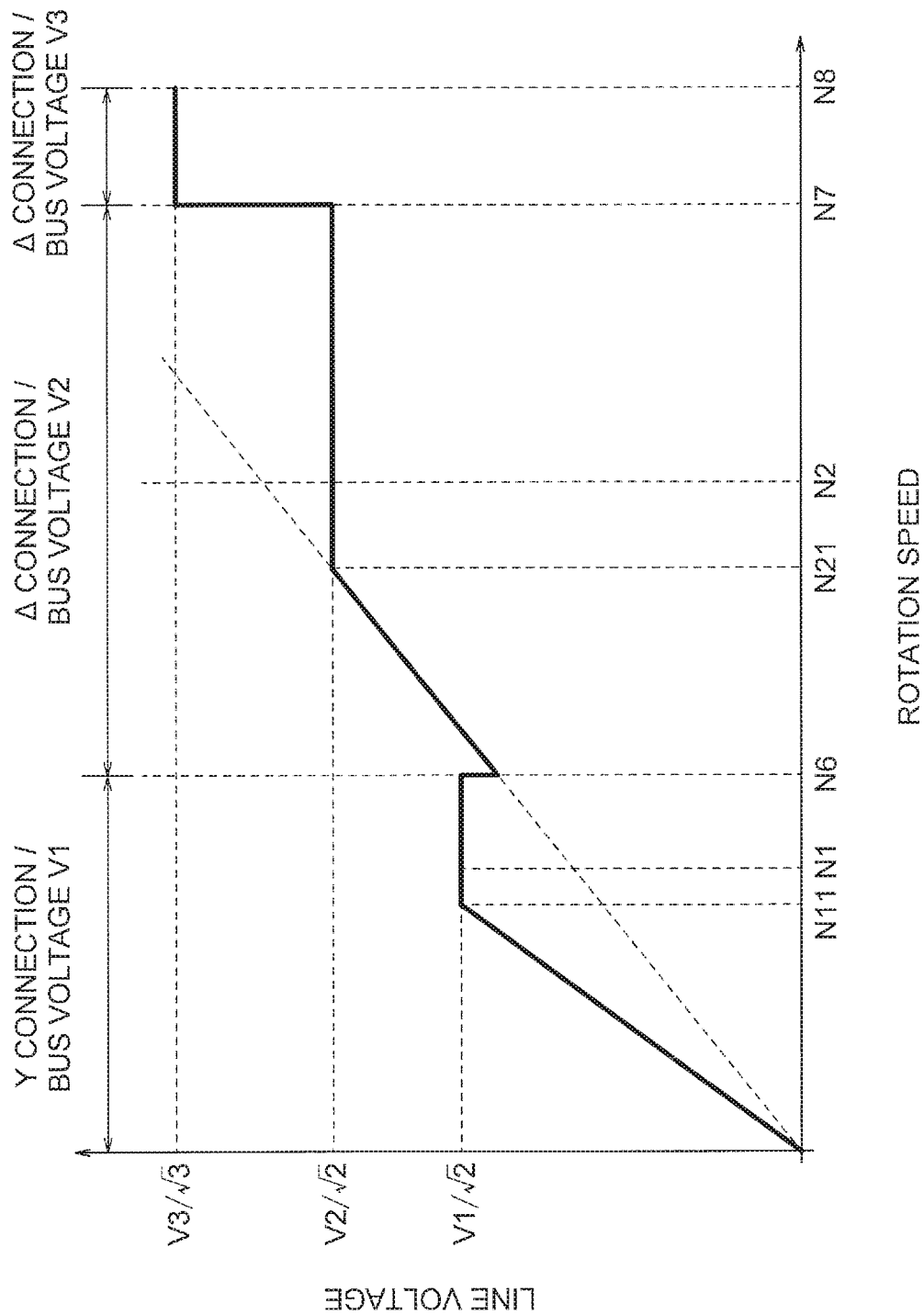
FIG. 32 is a graph showing a relationship between a line voltage and a rotation speed in a second modification of the first embodiment.

FIG. 32 is a graph showing a relationship between a line voltage and a rotation speed in a case where switching of the connection state and switching of the bus voltage of the converter 102 are performed in the second modification. In the example of FIG. 32, the bus voltage of the converter 102 is set to V1 when the rotation speed is N1 (Y connection) corresponding to the intermediate heating condition, and the connection state is switched from the Y connection to the delta connection when the rotation speed is N6 between the rotation speed N1 and the rotation speed N2 (rated heating condition), and the bus voltage is boosted to V2 at the same as the switching of the connection state.

In addition, when the rotation speed is N7 higher than the rotation speed N2, the bus voltage of the converter 102 is boosted to V3 while the connection state is unchanged. During a period from the rotation speed N7 to a maximum rotation speed N8, the bus voltage of the converter 102 is V3. The other operations and configurations in the second modification are similar to those in the first embodiment.

As described above, in the second modification, since the bus voltage of the converter 102 is switched to three stages of V1, V2, and V3, high motor efficiency and high motor torque can be obtained especially in a high rotation speed range.

In this regard, the switching of the bus voltage is not limited to the two stages or the three stages, and may be performed in four or more stages. Further, in the first modification (FIG. 31), the bus voltage of the converter 102 may be switched to three or more stages.

Third Modification

Next, a third modification of the first embodiment will be described. In the first embodiment described above, the connection state of the coils 3 is switched between the Y connection and the delta connection. However, the connection state of the coils 3 may be switched between a series connection and a parallel connection.

Figure 33A:
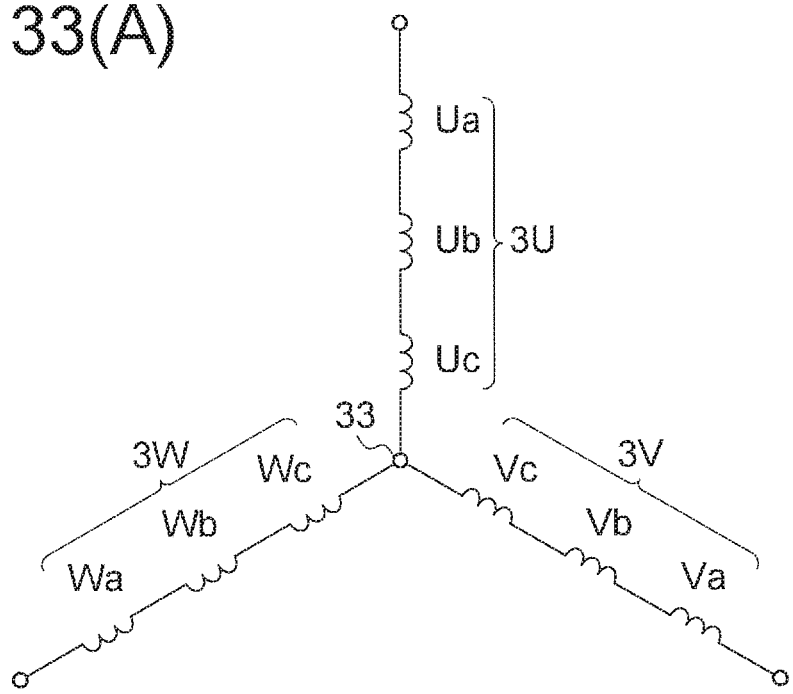
FIGS. 33(A) and 33(B) are schematic diagrams for describing a switching operation of the connection state of the coils in a third modification of the first embodiment.
Figure 33B:
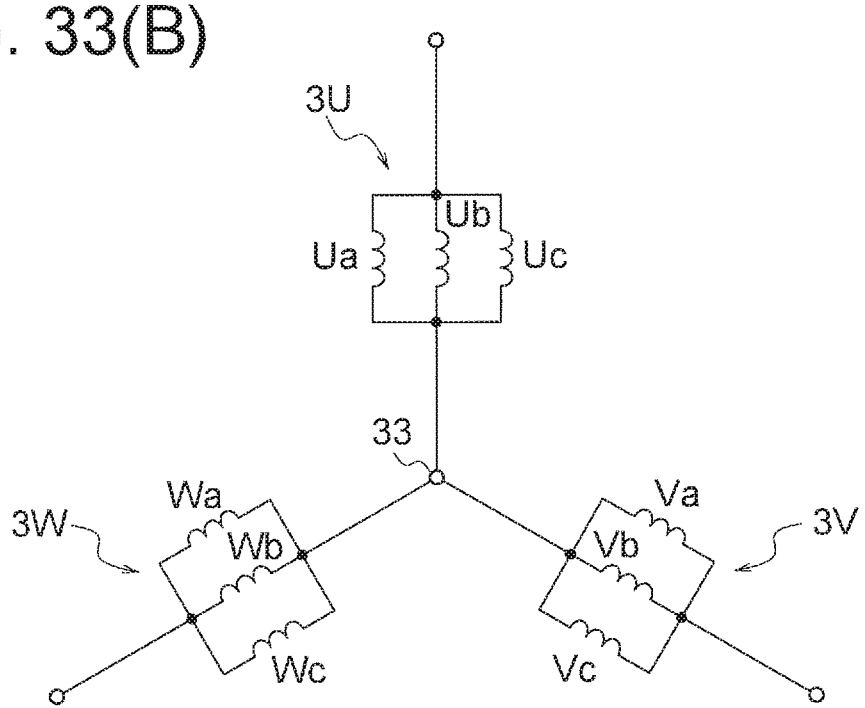

FIGS. 33(A) and 33(B) are schematic diagrams for describing switching of the connection state of the coils 3 according to the third modification. In FIG. 33(A), the three-phase coils 3U, 3V, and 3W are connected in the Y connection. Further, the coil portions Ua, Ub, and Uc of the coil 3U are connected in series, the coil portions Va, Vb, and Vc of the coil 3V are connected in series, and the coil portions Wa, Wb, and Wc of the coil 3W are connected in series. That is, the coil portions of each phase of the coils 3 are connected in series.

In contrast, in FIG. 33(B), the three-phase coils 3U, 3V, and 3W are connected in the Y connection, but the coil portions Ua, Ub, and Uc of the coil 3U are connected in parallel, the coil portion Va, Vb, and Vc of the coil 3V are connected in parallel, and the coil portions Wa, Wb, and Wc of the coil 3W are connected in parallel. That is, the coil portions of each phase of the coils 3 are connected in parallel. Switching of the connection state of the coils 3 as shown in FIGS. 33(A) and 33(B) can be achieved by, for example, providing each of the coil portions of the coils 3U, 3V, and 3W with a selector switch.

Suppose that the number of coil portions (i.e., the number of rows) connected in parallel in each phase is n, the line voltage decreases to $1/n$ times by switching from the series connection (FIG. 33(A)) to the parallel connection (FIG. 33(B)). Thus, by switching the connection state of the coils 3 from the series connection to the parallel connection when the line voltage approaches the inverter maximum output voltage, the degree of field-weakening can be reduced (i.e., weakening current can be reduced).

In a case where there are two load conditions for which performance is to be improved and the rotation speed N1 at the low-speed side and the rotation speed N2 at the high-speed side satisfy (N2/N1)>n, the line voltage becomes larger than the inverter maximum output voltage only by switching the connection state of the coils 3 from the series connection to the parallel connection, and thus the field-weakening control is necessary. Thus, as described in the first embodiment, the bus voltage of the converter 102 is boosted at the same time as when the connection state of the coils 3 is switched from the series connection to the parallel connection. Accordingly, high motor efficiency and high motor torque can be obtained in both of the rotation speed range including the rotation speed N1 and the rotation speed range including the rotation speed N2.

Figure 34A:
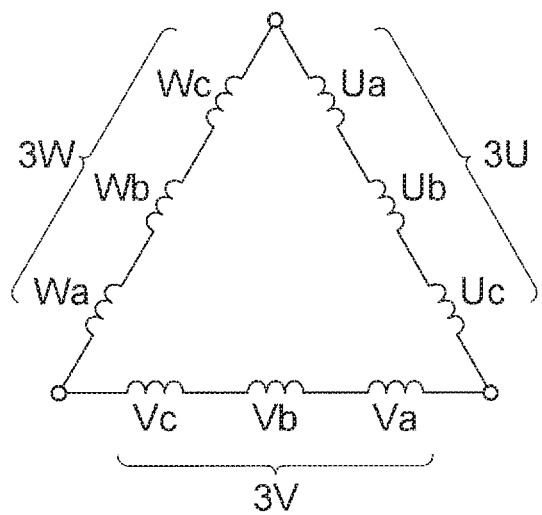
FIGS. 34(A) and 34(B) are schematic diagrams for describing another example of the switching operation of the connection state of the coils in the third modification of the first embodiment.
Figure 34B:
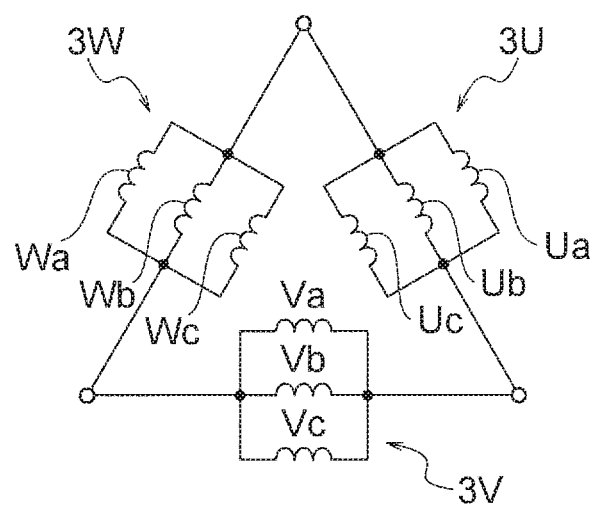

FIGS. 34(A) and 34(B) are schematic diagrams for describing another configuration example of the third modification. In FIG. 34(A), the three-phase coils 3U, 3V, and 3W are connected in the delta connection. Further, the coil portions Ua, Ub, and Uc of the coil 3U are connected in series, the coil portions Va, Vb, and Vc of the coil 3V are connected in series, and the coil portions Wa, Wb, and Wc of the coil 3W are connected in series. That is, the coil portions of each phase of the coils 3 are connected in series.

In contrast, in FIG. 34(B), the three-phase coils 3U, 3V, and 3W are connected in the delta connection, but the coil portions Ua, Ub, and Uc of the coil 3U are connected in parallel, the coil portion Va, Vb, and Vc of the coil 3V are connected in parallel, and the coil portions Wa, Wb, and Wc of the coil 3W are connected in parallel. That is, the coil portions of each phase of the coils 3 are connected in parallel.

In this case, similarly to the examples shown in FIGS. 33(A) and 33(B), when the low-speed side rotation speed N1 and the high-speed side rotation speed N2 of the two load conditions for which performance is to be improved satisfy (N2/N1)>n, the connection state of the coils 3 is switched from the series connection (FIG. 33(A)) to the parallel connection (FIG. 33(B)), and at the same time, the bus voltage of the converter 102 is boosted. The other operations and configurations in the third modification are similar to those in the first embodiment. It is sufficient that the boosted bus voltage V2 satisfies $V2 \geq (V1/n) \times N2/N1$ in relation to the bus voltage V1 before boosting.

As described above, in the third modification, the connection state of the converter 102 is switched between the series connection and the parallel connection, and therefore the degree of field-weakening can be reduced and the motor efficiency can be increased. Further, the bus voltages V1 and V2 and the rotation speeds N1 and N2 satisfy $V2 \geq (V1/n) \times N2/N1$, and therefore high motor efficiency and high motor torque can be obtained at the rotation speeds N1 and N2.

In the first and second modifications, switching between the series connection (first connection state) and the parallel connection (second connection state) may be performed.

Fourth Modification

In the first embodiment described above, the absolute value of the difference $\Delta T$ between the room temperature Ta detected by the room temperature sensor 54 and the set temperature Ts is compared to the threshold $\Delta Tr$, and the connection state of the coils 3 and the bus voltage of the converter 102 are switched. However, an air-conditioning load may be calculated based on the room temperature Ta, and the connection state of the coils 3 and the bus voltage of the converter 102 may be switched based on the air-conditioning load.

Figure 35:
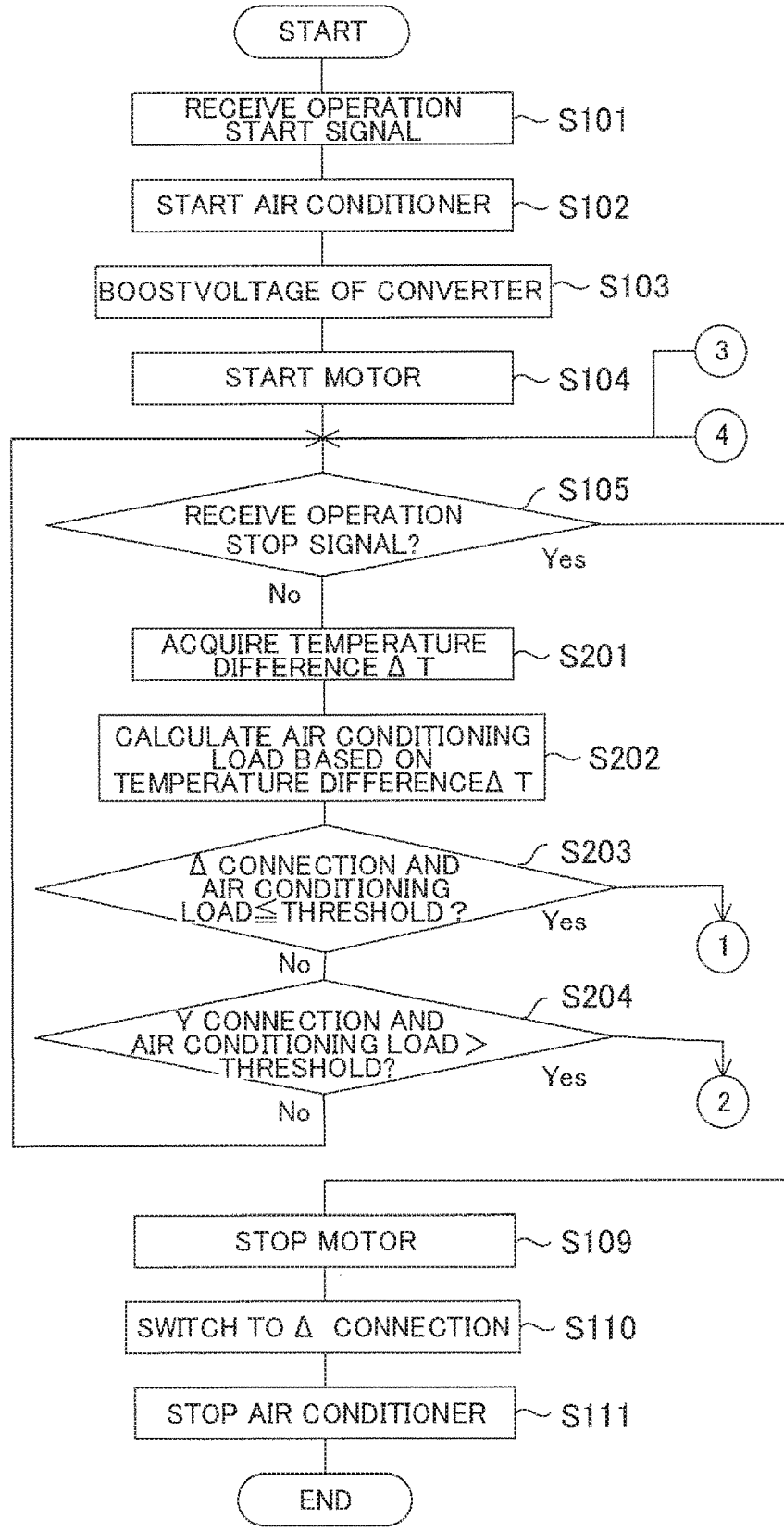
FIG. 35 is a flowchart showing a connection switching operation in a fourth modification of the first embodiment.

FIG. 35 is a flowchart showing a basic operation of an air conditioner according to a fourth modification. Steps S101 through S105 are the same as those in the first embodiment. When the operation stop signal is not received after the motor 1 is started in step S104 (step S105), the controller 50 acquires a temperature difference $\Delta T$ between a room temperature Ta detected by the room temperature sensor 54 and a set temperature Ts set by the remote controller 55 (step S201), and calculates an air-conditioning load based on the temperature difference $\Delta T$ (step S202).

Next, based on the calculated air-conditioning load, it is determined whether switching of the coils 3 from the delta connection to the Y connection is necessary or not. Specifically, it is determined whether or not the connection state of the coils 3 is the delta connection and the air-conditioning load calculated in step S202 is less than or equal to a threshold (reference value of the air-conditioning load) (step S203).

When the result of the comparison in step S203 indicates that the connection state of the coils 3 is the delta connection and the air-conditioning load is less than or equal to the threshold, processes in steps S121 through S124 shown in FIG. 11 are performed. As described in the first embodiment, in steps S121 through S124 in FIG. 11, the switching from the delta connection to the Y connection and the boosting of the bus voltage by the converter 102 are performed.

When the result of the comparison in step S203 indicates that the connection state of the coils 3 is not the delta connection (when it is the Y connection) or that the air-conditioning load is larger than the threshold (i.e., when switching to the Y connection is unnecessary), the process proceeds to step S204.

In step S204, it is determined whether switching from the Y connection to the delta connection is necessary or not. Specifically, it is determined whether or not the connection state of the coils 3 is the Y connection and the air-conditioning load calculated in step S202 is larger than the threshold.

When the result of the comparison in step S204 indicates that the connection state of the coils 3 is the Y connection and the air-conditioning load is larger than the threshold, processes in steps S131 through S134 shown in FIG. 12 are performed. As described in the first embodiment, in steps S131 through S134 in FIG. 12, the switching from the Y connection to the delta connection and the lowering of the bus voltage by the converter 102 are performed.

When the result of the comparison in step S204 indicates that the connection state of the coils 3 is not the Y connection (when it is the delta connection) or that the air-conditioning load is larger than the threshold (i.e., when switching to the delta connection is unnecessary), the process returns to step S105. Processes in the case where the operation stop signal is received (steps S109 through S111) are similar to those in the first embodiment. The other operations and configurations in the fourth modification are similar to those in the first embodiment.

As described above, in the fourth modification, the air-conditioning load is calculated based on the room temperature Ta and the connection state of the coils 3 and the bus voltage of the converter 102 are switched based on the calculated air-conditioning load, and therefore the operation state of the compressor 41 can quickly respond to a load change of the air conditioner 5. As a result, comfort can be enhanced.

In the first, second, and third modifications, the connection state of the coils 3 and the bus voltage of the converter 102 may be switched based on the air-conditioning load.

Fifth Modification

In the first embodiment described above, the connection state of the coils 3 and the bus voltage of the converter 102 are switched based on the temperature difference ΔT between the room temperature Ta detected by the room temperature sensor 54 and the set temperature Ts. However, the connection state of the coils 3 and the bus voltage of the converter 102 may be switched based on the rotation speed of the motor 1.

Figure 36:
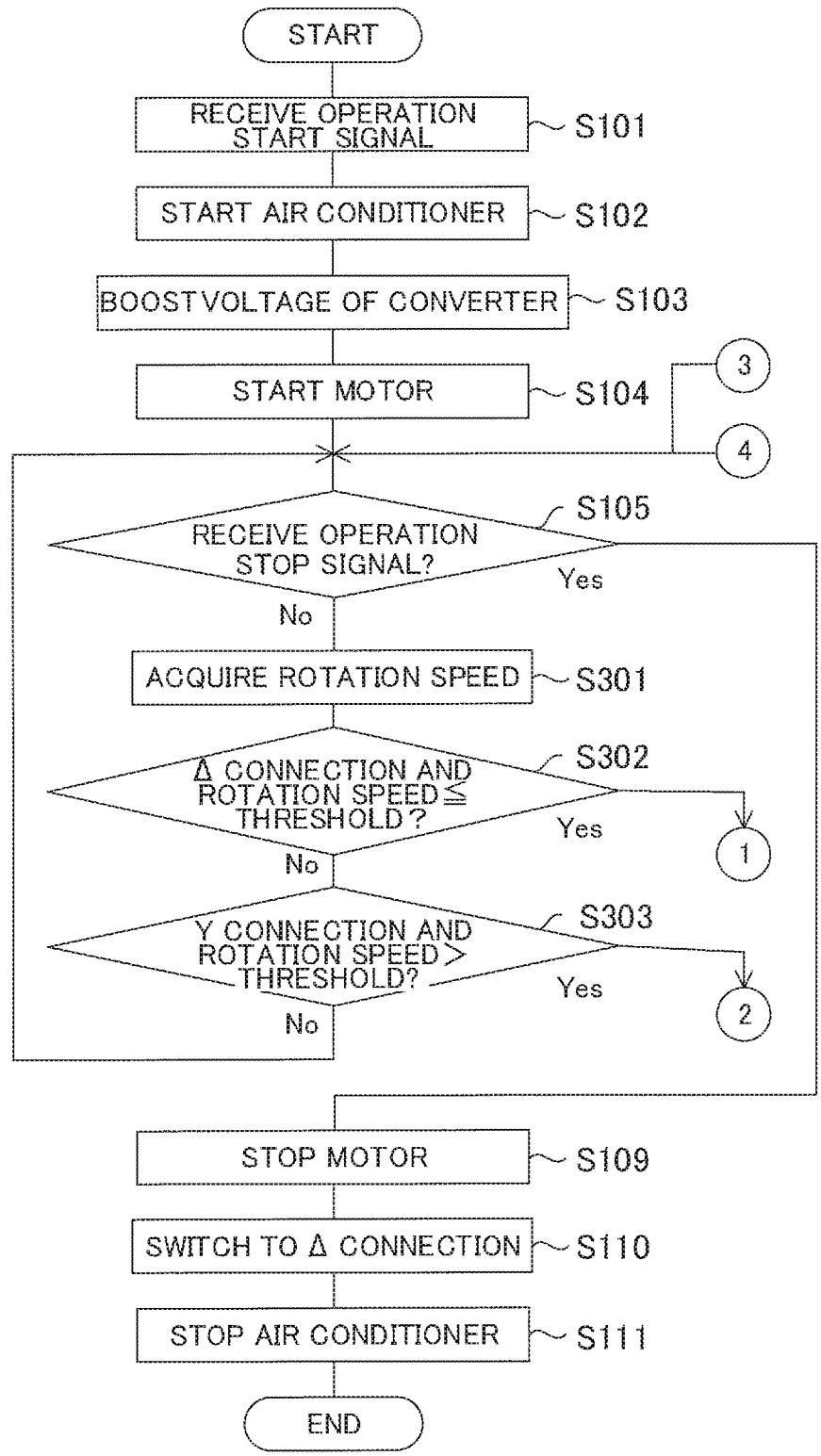
FIG. 36 is a flowchart showing a connection switching operation in a fifth modification of the first embodiment.

FIG. 36 is a flowchart showing a basic operation of an air conditioner according to a fifth modification. Steps S101 through S105 are the same as those in the first embodiment. When the operation stop signal is not received after the motor 1 is started in step S104 (step S105), the controller 50 acquires a rotation speed of the motor 1 (step S301). The rotation speed of the motor 1 is a frequency of an output current of the inverter 103, and can be detected by using a current sensor or the like mounted on the motor 1.

Next, it is determined whether switching of the coils 3 from the delta connection to the Y connection is necessary or not, based on this rotation speed of the motor 1. That is, it is determined whether or not the connection state of the coils 3 is the delta connection and the rotation speed of the motor 1 is less than or equal to a threshold (reference value of the rotation speed) (step S302).

In the case of the heating operation, the threshold used in step S302 is preferably a value (more preferably an intermediate value) between the rotation speed N1 corresponding to the intermediate heating condition and the rotation speed N2 corresponding to the rated heating condition. In the case of the cooling operation, the threshold used in step S302 is preferably a value (more preferably an intermediate value) between the rotation speed N1 corresponding to the intermediate cooling condition and the rotation speed N2 corresponding to the rated cooling condition.

For example, in the case of the household air conditioner having a refrigeration capacity of 6.3 kW, the rotation speed N1 corresponding to the intermediate heating condition is 35 rps and the rotation speed N2 corresponding to the rated heating condition is 85 rps, and therefore the threshold used in step S302 is preferably 60 rps, which is an intermediate value between the rotation speed N1 and the rotation speed N2.

However, the rotation speed of the motor 1 may fluctuate. Thus, in this step S302, it is determined whether or not a state where the rotation speed of the motor 1 is greater than or equal to the threshold continues for a preset time.

When the result of the comparison in step S302 indicates that the connection state of the coils 3 is the delta connection and the rotation speed of the motor 1 is less than or equal to the threshold, processes in steps S121 through S124 shown in FIG. 11 are performed. As described in the first embodiment, in steps S121 through S124 in FIG. 11, the switching from the delta connection to the Y connection and the boosting of the bus voltage of the converter 102 are performed.

When the result of the comparison in step S302 indicates that that the connection state of the coils 3 is not the delta connection (when it is, is the Y connection) or that the rotation speed of the motor 1 is greater than the threshold (i.e., switching to the Y connection is unnecessary), the process proceeds to step S303.

In step S303, it is determined whether switching from the Y connection to the delta connection is necessary or not. Specifically, it is determined whether or not the connection state of the coils 3 is the Y connection and the rotation speed of the motor 1 is greater than the threshold.

When the result of the comparison in step S303 indicates that the connection state of the coils 3 is the Y connection and the rotation speed of the motor 1 is greater than the threshold, processes in steps S131 through S134 shown in FIG. 12 are performed. As described in the first embodiment, in steps S131 through S134 in FIG. 12, the switching from the Y connection to the delta connection and the lowering of the bus voltage of the converter 102 are performed.

When the result of the comparison in step S303 indicates that the connection state of the coils 3 is not the Y connection (when it is the delta connection) or that the rotation speed of the motor 1 is greater than the threshold (i.e., when switching to the delta connection is unnecessary), the process returns to step S105. Processes in the case where the operation stop signal is received (steps S109 through S111) are similar to those in the first embodiment. The other operations and configurations in the fifth modification are similar to those in the first embodiment.

As described above, in the fifth modification, the connection state of the coils 3 and the bus voltage of the converter 102 are switched based on the rotation speed of the motor 1, and therefore high motor efficiency and high motor torque can be obtained.

In this regard, the connection state of the coils 3 and the bus voltage of the converter 102 may be switched based on the rotation speed of the motor 1 in the first, second, and third modifications.

In this regard, although the rotary compressor 8 has been described as an example of the compressor, the motor of the embodiment may be applied to a compressor other than the rotary compressor 8.

Second Embodiment

Next, a second embodiment of the present invention will be described.

(Configuration of Air Conditioner)

Figure 37:
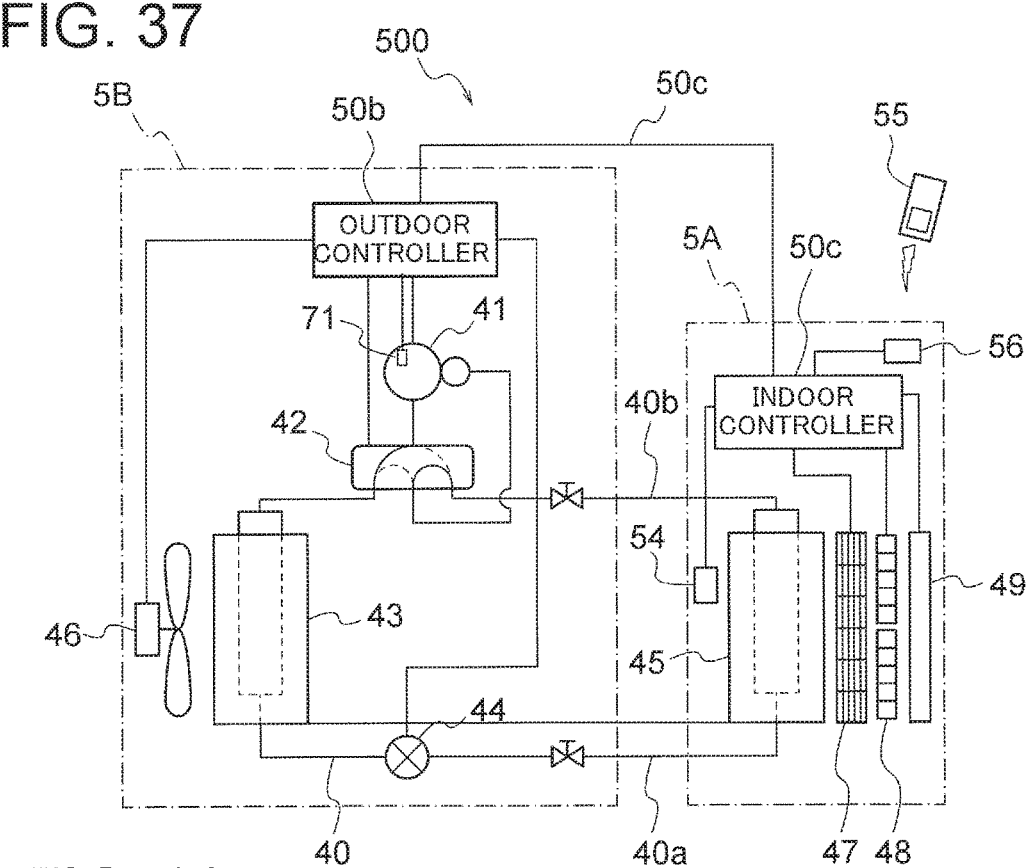
FIG. 37 is a block diagram illustrating a configuration of an air conditioner according to a second embodiment.
Figure 38:
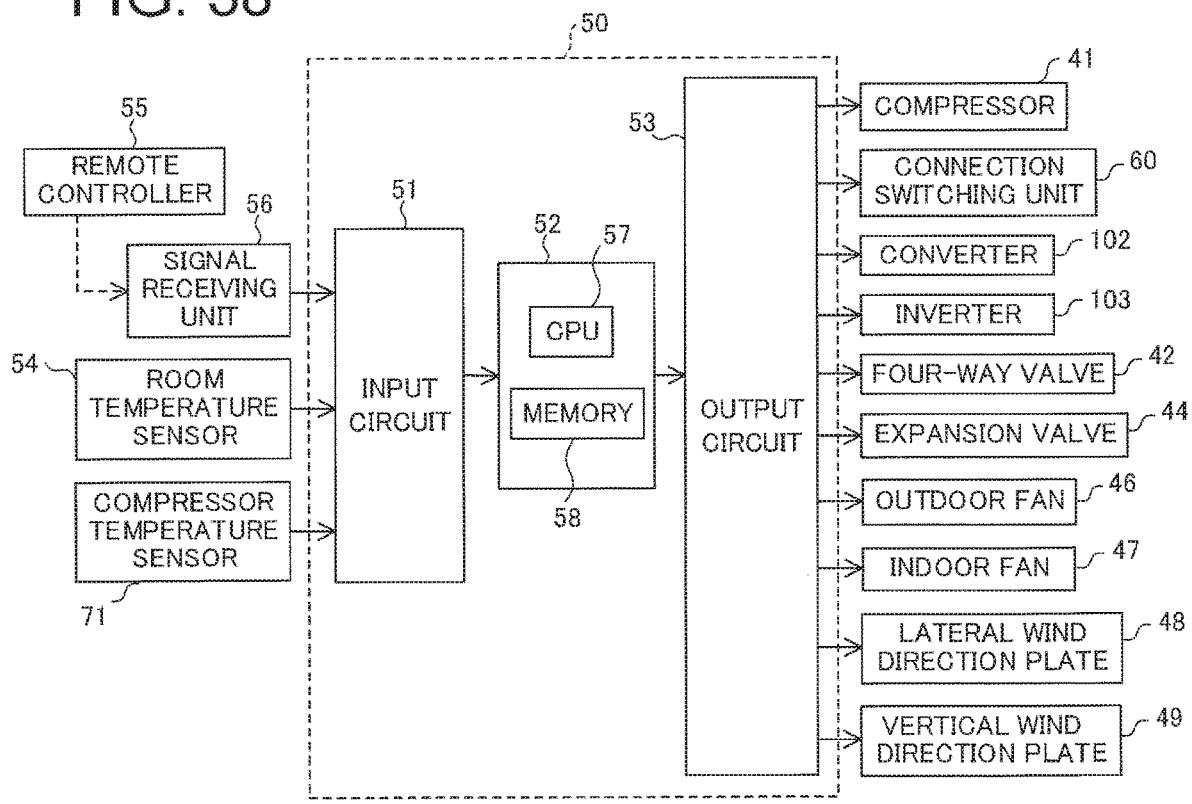
FIG. 38 is a block diagram illustrating a control system of the air conditioner according to the second embodiment.
Figure 39:
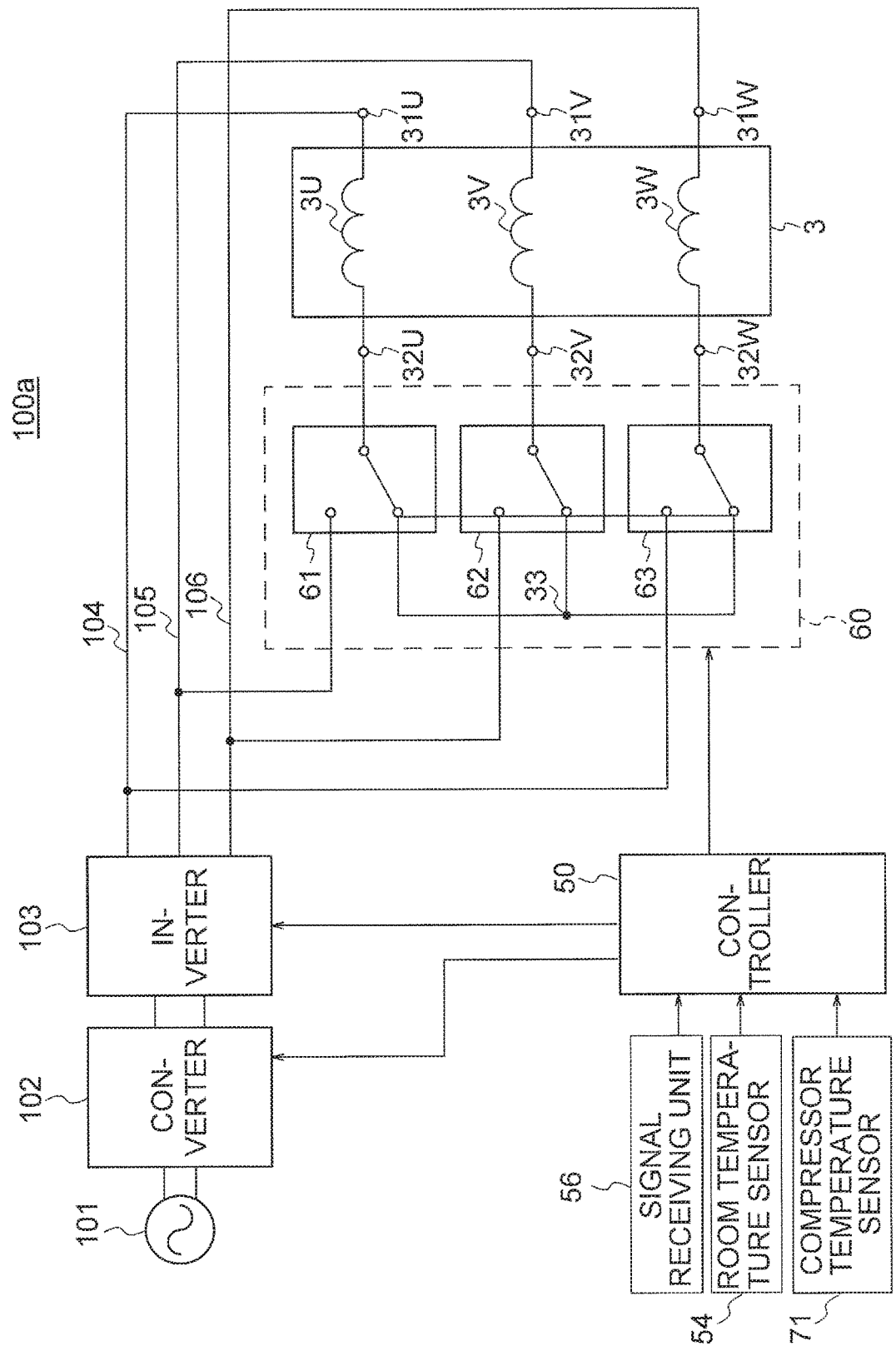
FIG. 39 is a block diagram illustrating a control system of a driving device according to the second embodiment.

FIG. 37 is a block diagram illustrating a configuration of an air conditioner 500 according to the second embodiment. FIG. 38 is a block diagram illustrating a control system of the air conditioner 500 according to the second embodiment. FIG. 39 is a block diagram illustrating a control system of a driving device 100a according to the second embodiment. The air conditioner 500 according to the second embodiment further includes a compressor temperature sensor 71 as a compressor state detection unit. The compressor temperature sensor 71 is a temperature sensor for detecting a compressor temperature $T_C$ indicating a state of the rotary compressor 8. In this regard, the compressor state detection unit may be a detector capable of detecting the state of the rotary compressor 8, and is not limited to the temperature sensor.

Except for the compressor temperature sensor 71, configurations of the air conditioner 500 and the driving device 100a according to the second embodiment are the same as those of the air conditioner 5 and the driving device 100 according to the first embodiment, respectively.

In the example illustrated in FIG. 39, the driving device 100a includes a converter 102 for rectifying an output of a power source 101, an inverter 103 for outputting an AC voltage to coils 3 of a motor 1, a connection switching unit 60 for switching the connection state of the coils 3, a controller 50, and the compressor temperature sensor 71. The converter 102 is supplied with electric power from the power source 101 as an alternating current (AC) power source.

The configuration of the driving device 100a according to the second embodiment is similar to that of the driving device 100 according to the first embodiment, except for the compressor temperature sensor 71. In this regard, the compressor temperature sensor 71 may not be a component of the driving device 100a. The driving device 100a is used together with the rotary compressor 8, and drives the motor 1.

A neodymium rare earth magnet containing neodymium-iron-boron (Nd—Fe—B) as a main component is used in a permanent magnet type motor, and has characteristics such that a coercive force decreases with temperature. When the motor using a neodymium rare earth magnet is used in a high-temperature atmosphere of 140° C. as in a compressor, the coercive force of the magnet decreases with temperature (−0.5 to −0.6%/ΔK), and therefore it is necessary to add a dysprosium (Dy) element to enhance the coercive force.

When the Dy element is added to the magnet, the coercive force is enhanced, but there is a disadvantage such that a residual flux density decreases. When the residual flux density decreases, a magnet torque of the motor decreases and a supply current increases, and accordingly a copper loss increases. Thus, there is a strong demand for reducing an adding amount of Dy in terms of efficiency.

For example, when the maximum temperature of the compressor while the compressor is driven is reduced, the maximum temperature of the magnets can be reduced, and demagnetization of the magnets can be alleviated. Thus, it is effective to control the compressor (for example, the rotation speed of the motor) based on a compressor temperature threshold as a threshold for limiting the temperature of the compressor.

However, when the compressor temperature threshold is set to be low, an instruction to reduce the rotation speed of the motor or an instruction to stop the motor may be issued in a state where the load (air-conditioning load) is low, depending on the set value. In this case, the maximum operation range of the motor is narrowed, and operation of the motor is restricted irrespective of the situation in the room (for example, the temperature difference ΔT described above) in which the air conditioner is provided.

Thus, in the second embodiment, the controller 50 issues an instruction to change a method for driving the motor 1 based on different thresholds (compressor temperature thresholds) depending on the connection state of the coils 3. Specifically, when it is determined that the compressor temperature $T_C$ detected by the compressor temperature sensor 71 is higher than the compressor temperature threshold, the controller 50 issues an instruction to change the driving method of the motor 1. Accordingly, the temperature of the rotary compressor 8 is reduced, and the rotary compressor 8 is protected.

The compressor temperature sensor 71 detects a compressor temperature $T_C$ indicating the state of the rotary compressor 8. In this embodiment, the compressor temperature sensor 71 is fixed to the discharge pipe 85 of the rotary compressor 8. However, the position to which the compressor temperature sensor 71 is fixed is not limited to the discharge pipe 85.

The compressor temperature $T_C$ is a temperature of at least one of a shell 80 of the rotary compressor 8, the discharge pipe 85 (for example, an upper portion of the discharge pipe 85) of the rotary compressor 8, a refrigerant in the rotary compressor 8 (for example, a refrigerant flowing in the discharge pipe 85), and the motor 1 disposed in the rotary compressor 8. The compressor temperature $T_C$ may be a temperature of an element other than these elements.

The compressor temperature $T_C$ is, for example, a maximum temperature measured within a preset time period. A correlation between temperature data in the rotary compressor 8 measured in advance and the compressor temperature $T_C$ may be stored in a memory 58 in the controller 50 for each measurement target of the compressor temperature $T_C$. The temperature data in the rotary compressor 8 measured in advance is data indicating a temperature (maximum temperature) in the rotary compressor 8 that varies depending on the circulation amount of the refrigerant, a heat generation temperature of the motor 1, and the like. In this case, the compressor temperature $T_C$ detected by the compressor temperature sensor 71 may be used as a first detection value or a second detection value described later. The temperature data calculated based on the correlation with the compressor temperature $T_C$ may be used as a first detection value or a second detection value described later.

When the connection state of the coils 3 is the first connection state (for example, the Y connection), the controller 50 controls the motor 1 based on the first detection value detected by the compressor temperature sensor 71 and a threshold $T_Y$ (first threshold) as the compressor temperature threshold. The threshold $T_Y$ is, for example, 90° C. In the case where a detector other than the temperature sensor is used as the compressor state detection unit, a value other than the temperature may be set as the threshold.

Specifically, when the first detection value is larger than the threshold $T_Y$, the controller 50 controls the motor 1 so that the at least one temperature detected by the compressor temperature sensor 71 (compressor temperature $T_C$) decreases. For example, the controller 50 issues an instruction to change the rotation speed of the motor 1 to thereby reduce the rotation speed of the motor 1, or stops driving (rotation) of the motor 1. Accordingly, the compressor temperature $T_C$ can be reduced.

When the connection state of the coils 3 is the second connection state (for example, the delta connection), the controller 50 controls the motor 1 based on the second detection value detected by the compressor temperature sensor 71 and a threshold $T_A$ (second threshold) as the compressor temperature threshold.

Specifically, when the second detection value is larger than the threshold $T_A$, the controller 50 controls the motor 1 so that at least one temperature detected by the compressor temperature sensor 71 (compressor temperature $T_C$) decreases. For example, the controller 50 issues an instruction to change the rotation speed of the motor 1 to thereby reduce the rotation speed of the motor 1, or stops driving (rotation) of the motor 1. Accordingly, the compressor temperature $T_C$ can be reduced.

The motor 1 is designed so that the magnets are not demagnetized at the maximum temperature (compressor temperature threshold) the magnets can reach, taking into consideration a temperature change due to heat generation of the motor 1, a cooling effect by the refrigerant, and the like. For example, in this embodiment, the permanent magnets 25 of the motor 1 are designed so that the magnets are not demagnetized at near 140° C., which is the maximum magnet temperature. In this case, the threshold $T_A$ is set to 140° C.

The compressor temperature threshold is set to be higher in the connection state in which the line voltage is lower, out of the connection states of the coils 3 switchable by the connection switching unit 60. In this embodiment, the line voltage of the inverter 103 in the delta connection is lower than the line voltage of the inverter 103 in the Y connection. Thus, the threshold $T_A$ is set to be larger than the threshold $T_Y$. Accordingly, it is possible to prevent the maximum operation range of the motor 1 (especially the maximum rotation speed of the motor 1 in the delta connection) from being narrowed.

(Operation of Air Conditioner)

Next, a basic operation of the air conditioner 500 according to the second embodiment (method for controlling the motor 1, the rotary compressor 8, and the air conditioner 500) will be described.

Figure 40:
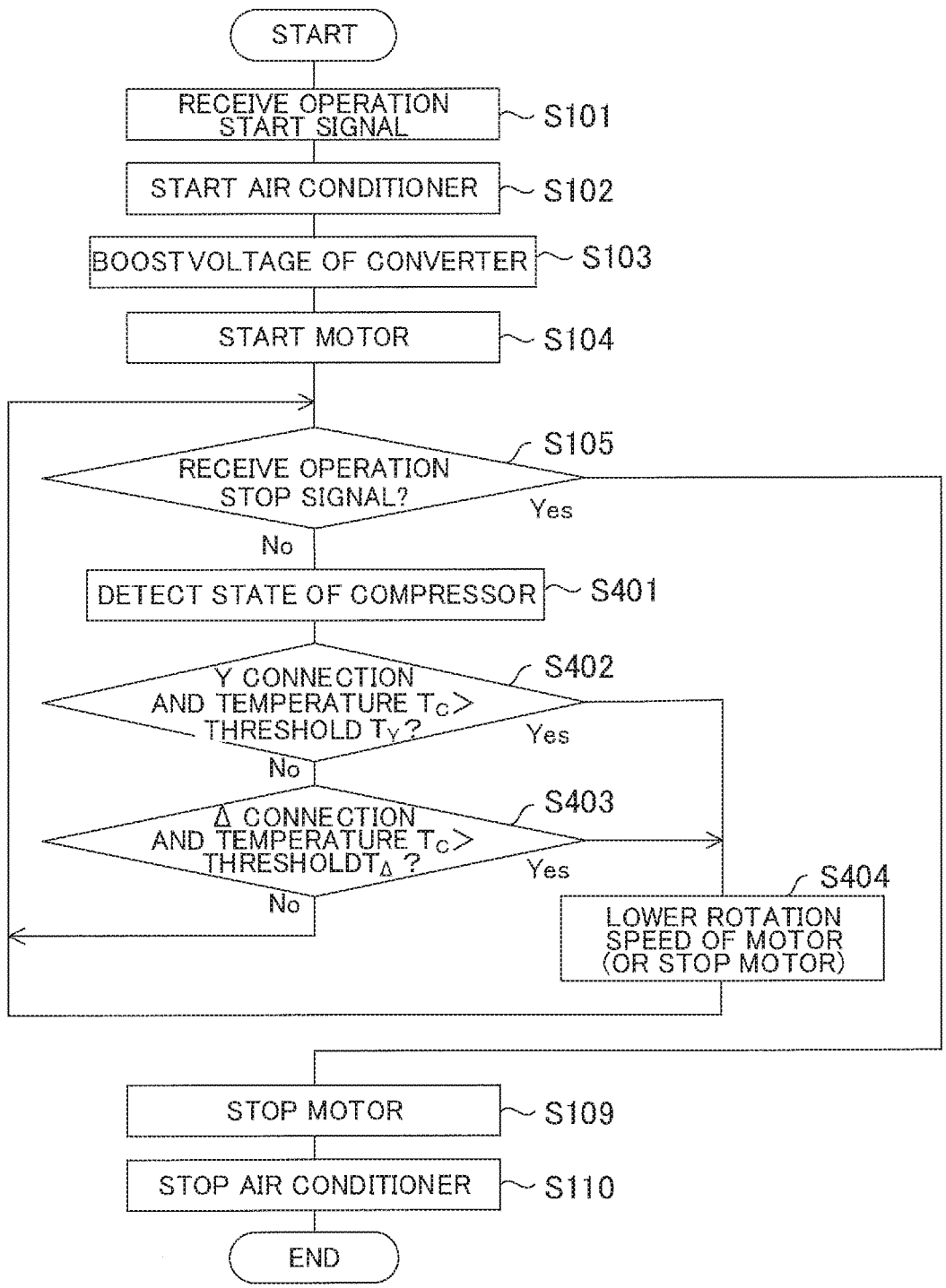
FIG. 40 is a flowchart showing a basic operation of the air conditioner according to the second embodiment.

FIG. 40 is a flowchart showing a basic operation of the air conditioner 500 according to the second embodiment.

Steps S101 through S105 are similar to those in the first embodiment (FIG. 10). In a case where the operation stop signal is not received in step S105, the process proceeds to step S401.

In accordance with the temperature difference ΔT, the rotation speed of the motor 1 or the like, the connection switching unit 60 switches the connection state of the coils 3 between the delta connection (second connection state in this embodiment) and the Y connection (first connection state in this embodiment).

The compressor temperature sensor 71 detects the state of the rotary compressor 8 (step S401). In this embodiment, the compressor temperature sensor 71 detects the compressor temperature $T_C$ (for example, the temperature of the discharge pipe 85) indicating the state of the rotary compressor 8.

In step S401, when the connection state of the coils 3 is the Y connection, the compressor temperature $T_C$ is detected as a first detection value. In contrast, when the connection state of the coils 3 is the delta connection, the compressor temperature $T_C$ is detected as a second detection value.

Further, the controller 50 determines whether or not the connection state of the coils 3 is the Y connection and the compressor temperature $T_C$ is greater than the threshold $T_Y$ (step S402).

When the result of the comparison in S402 indicates that the connection state of the coils 3 is the Y connection and the compressor temperature $T_C$ is greater than the threshold $T_Y$, the process proceeds to step S404.

When the result of the comparison in step S402 indicates that the connection state of the coils 3 is not the Y connection (when it is the delta connection), or that the compressor temperature $T_C$ is less than or equal to the threshold $T_Y$, the process returns to step S403.

In step S403, the controller 50 determines whether or not the connection state of the coils 3 is the delta connection and the compressor temperature $T_C$ is greater than the threshold $T_A$.

When the result of the comparison in S403 indicates that the connection state of the coils 3 is the delta connection and the compressor temperature $T_C$ is greater than the threshold $T_A$, the process proceeds to step S404.

When the result of the comparison in step S403 indicates that the connection state of the coils 3 is not the delta connection (when it is the Y connection), or that the compressor temperature $T_C$ is less than or equal to the threshold $T_A$, the process returns to step S105.

In step S404, the controller 50 reduces the rotation speed of the motor 1. In this regard, instead of reducing the rotation speed of the motor 1, the motor 1 may be stopped. In the case where the motor 1 is stopped in step S404, the motor 1 is stopped without changing the connection state of the coils 3. In the case where the motor 1 is stopped in step S404, the motor 1 is started after a lapse of a preset time and then the process returns to step S105, for example.

That is, in steps S401 through S404, when the connection state of the coils 3 is the Y connection, the motor 1 is controlled based on the first detection value and the first threshold (threshold $T_Y$), whereas when the connection state of the coils 3 is the delta connection, the motor 1 is controlled based on the second detection value and the second threshold (threshold $T_A$). Accordingly, the rotary compressor 8 can be controlled so that the compressor temperature $T_C$ is lower than the threshold $T_Y$ or the threshold $T_A$.

When the operation stop signal is received in step S105 described above, the controller 50 stops rotation of the motor 1 (step S109). In this regard, when the operation stop signal is received in a state where the motor 1 is stopped in step S404, the process proceeds to step S110 while the motor 1 is stopped. In this regard, although not shown in FIG. 40, when the operation stop signal is received during a period between steps S401 through S404, the process proceeds to step S109 and rotation of the motor 1 is stopped.

Thereafter, the controller 50 performs a process of stopping the air conditioner 500 (step S110). Specifically, the fan motors of the indoor fan 47 and the outdoor fan 46 are stopped. Thereafter, the CPU 57 of the controller 50 is stopped, and operation of the air conditioner 500 is terminated.

In the case where the process of stopping the air conditioner 500 is performed in step S110, the connection state of the coils 3 is preferably the delta connection. For example, in step S110, when the connection state of the coils 3 is the Y connection, the controller 50 outputs the connection switching signal to the connection switching unit 60 to switch the connection state of the coils 3 from the Y connection to the delta connection.

Advantages of Second Embodiment

According to the second embodiment, the motor 1 is controlled by using the compressor temperature threshold in consideration of the connection state of the coils 3. For example, when the detected value detected by the compressor temperature sensor 71 is greater than the compressor temperature threshold, the motor 1 is controlled so that the compressor temperature $T_C$ (i.e., the temperature in the rotary compressor 8) decreases. As a result, demagnetization in the motor 1 can be prevented, and the motor 1 can be properly controlled according to the state of the rotary compressor 8.

As described in the first embodiment, in the driving device that operates while switching the connection state of the coils 3 between the Y connection and the delta connection, a conventional high-speed operation is performed with the delta connection, whereas a low-speed operation for a small air-conditioning load is performed with the Y connection. Thus, by switching the connection state of the coils 3 from the delta connection to the Y connection, the maximum temperature of the rotary compressor 8 (the maximum value of the compressor temperature $T_C$) in performing a normal load operation can be set in such a manner that the maximum temperature of the rotary compressor 8 during the operation in the Y connection state is lower than that during the operation in the delta connection state.

For example, in a case where the motor 1 is controlled based on one preset compressor temperature threshold (for example, the same value as the threshold $T_Y$) without taking the connection state of the coil 3 into consideration, there is a case where the maximum operating range of the motor 1 (especially, the maximum rotation speed of the motor 1 in the delta connection state) may be narrowed. Thus, in the second embodiment, the motor 1 is controlled by using a plurality of compressor temperature thresholds by taking the connection state of the coils 3 into consideration.

Specifically, the motor 1 is controlled based on different compressor temperature thresholds (for example, threshold $T_Y$ and threshold $T_\Delta$) depending on the connection states of the coils 3. Thus, even when the compressor temperature threshold is set lower during the operation in the Y connection state than during the operation in the delta connection state, the maximum operation range of the motor 1 (especially, the maximum rotation speed of the motor 1 in the delta connection) can be prevented from being narrowed.

For example, in the configuration in which the connection state of the coils 3 is switched as described in the first embodiment, when the connection state of the coils 3 is the Y connection and the rotation speed of the motor 1 is low (intermediate heating condition), the line voltage (motor voltage) is approximately equal to the inverter maximum output voltage, so that the efficiency is improved. In this case, there is a case where it is desired to rotate the motor 1 at a rotation speed as high as possible in order to reduce the number of times of connection switching. For this reason, operation is performed using field-weakening. However, the weakening current increases, and demagnetization deteriorates.

As the temperature is lower, the coercive force of the permanent magnet 25 is higher and the permanent magnet 25 is less likely to be demagnetized even when the current is increased. Thus, according to the second embodiment, the compressor temperature threshold $T_Y$ when the connection state of the coils 3 is the Y connection is set to be lower than the compressor temperature threshold $T_\Delta$ in the delta connection. Thus, the maximum temperature of the rotary compressor 8 during the operation in the Y connection state can be lower than that during the operation in the delta connection state. Accordingly, a configuration in which demagnetization does not occur even when the weakening current increases is achieved, and it becomes possible to perform driving in the Y connection state at a higher rotation speed. Thus, there is an advantage such that flexibility in switching the connection can be increased. In other words, the motor 1 can be driven in a state where the coercive force of the magnets of the motor 1 is high, and demagnetization is less likely to occur even when a larger current flows in the motor 1. Furthermore, when the connection state of the coils 3 is the Y connection, the motor 1 can be driven at a higher rotation speed using field-weakening.

Further, in the case where the connection of the coils is switched to the delta connection from the Y connection in which the winding number (number of turns) is close to the number of turns of conventional coils that are not subjected to connection switching, field-weakening at a high rotation speed can be suppressed, and a configuration resistant to demagnetization in the delta connection as compared to a conventional configuration can be obtained.

Furthermore, in the Y connection, since the compressor temperature threshold can be set lower than that of the conventional configuration, demagnetization characteristics can be enhanced in both of the Y connection and the delta connection, and the magnet to which no dysprosium (Dy) is added can be used.

For example, as the permanent magnet 25, a rare earth magnet containing neodymium (Nd), iron (Fe), and boron (B) as main components can be used, and this permanent magnet 25 does not contain dysprosium (Dy) as an additive for increasing the coercive force. In this case, the permanent magnet 25 has the residual magnetic flux density of 1.36 T to 1.42 T, the coercive force of 1671 kA/m to 1989 kA/m, and the maximum energy product of 354 kJ/m$^3$ to 398 kJ/m$^3$.

Modification of Second Embodiment

Next, a modification of the second embodiment of the present invention will be described. The second embodiment can be combined with the first embodiment (including the modifications thereof). Thus, in the modification of the second embodiment, another example of operation of the air conditioner described in the second embodiment (method for controlling the motor 1, the rotary compressor 8, and the air conditioner 500) will be described. A configuration of an air conditioner according to the modification of the second embodiment is the same as that of the air conditioner 500 of the second embodiment. Thus, the air conditioner of the modification of the second embodiment will be referred to as the air conditioner 500.

Figure 41:
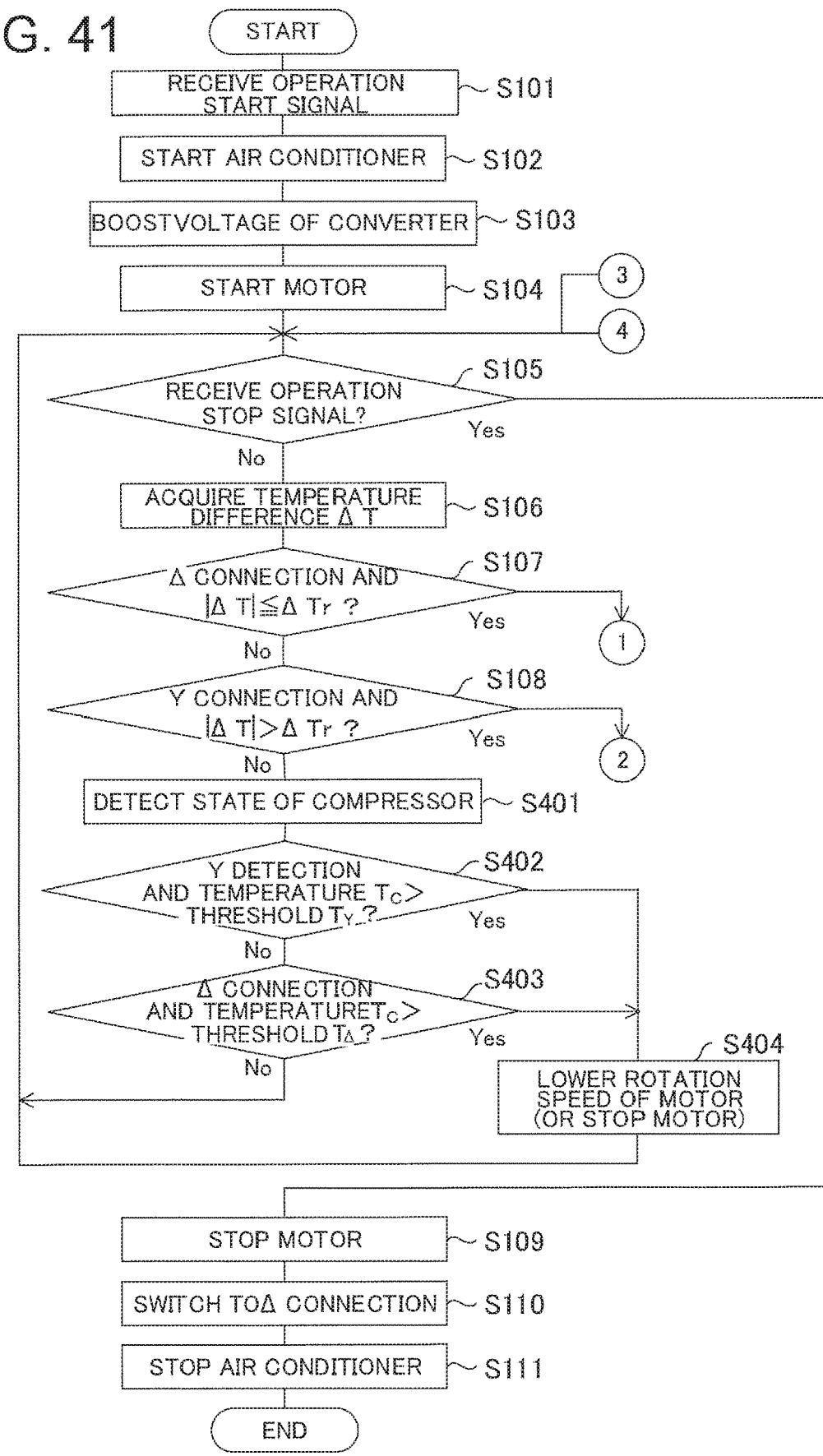
FIG. 41 is a flowchart showing a basic operation of an air conditioner according to a modification of the second embodiment.

FIG. 41 is a flowchart showing a basic operation of the air conditioner 500 according to the modification of the second embodiment.

Steps S101 through S106 are similar to those in the first embodiment (FIG. 10).

In step S107, the controller 50 determines whether switching of the connection state of the coils 3 from the delta connection to the Y connection is necessary or not based on the temperature difference ΔT between the room temperature Ta detected by the room temperature sensor 54 and the set temperature Ts set by the remote controller 55. That is, it is determined whether or not the connection state of the coils 3 is the delta connection and the absolute value of the temperature difference ΔT is less than or equal to the threshold ΔTr (step S107).

When the result of the comparison in step S107 indicates that the connection state of the coils 3 is the delta connection and the absolute value of the temperature difference ΔT is less than or equal to the threshold ΔTr, the process proceeds to step S121 (FIG. 11).

When the result of the comparison in step S107 indicates that the connection state of the coils 3 is not the delta connection (when it is the Y connection), or that the absolute value of the temperature difference ΔT is larger than the threshold ΔTr (i.e., switching to the Y connection is unnecessary), the process proceeds to step S108.

In step S108, it is determined whether switching from the Y connection to the delta connection of the coils 3 is necessary or not. For example, similarly to the first embodiment (step S108), the controller 50 determines whether or not the connection state of the coils 3 is the Y connection and the absolute value of the temperature difference ΔT described above is larger than the threshold ΔTr.

When the result of the comparison in step S108 indicates that the connection state of the coils 3 is the Y connection and the absolute value of the temperature difference ΔT is larger than the threshold ΔTr, the process proceeds to step S131 (FIG. 12). In the modification of the second embodiment, the processes in steps S131 through S134 shown in FIG. 12 may be replaced by the processes (steps S135, S136, and S131 through S134) shown in FIG. 13(A) or the processes (steps S137, S138, and S131 through S134) shown in FIG. 13(B).

The processes in steps S106 through S108 shown in FIG. 41 may be replaced by the processes in the modifications of the first embodiment (e.g., steps S201 through S204 shown in FIG. 35 or steps S301 through S303 shown in FIG. 36).

When the result of the comparison in step S108 indicates that the connection state of the coils 3 is not the Y connection (when it is the delta connection), or that the absolute value of the temperature difference ΔT is less than or equal to the threshold ΔTr (i.e., when switching to the delta connection is unnecessary), the process proceeds to step S401.

Steps S401 through S404 are similar to those in the second embodiment (FIG. 40).

When the operation stop signal is received in step S105 described above, the controller 50 stops rotation of the motor 1 (step S109). When the operation stop signal is received in a state where the motor 1 stopped in step S404, the process proceeds to step S110 in a state where the motor 1 is stopped. Although not shown in FIG. 41, when the operation stop signal is received in the steps S105 through S108 or the steps S401 through S404, the process proceeds to step S109 and rotation of the motor 1 is stopped.

Thereafter, the controller 50 (specifically, the connection switching unit 60) switches the connection state of the coils 3 from the Y connection to the delta connection (step S110). When the connection state of the coils 3 is already the delta connection, the connection state is unchanged.

Step S111 is similar to that in the first embodiment (FIG. 10).

The modification of the second embodiment has the same advantages as those described in the first embodiment (including the modifications thereof) and the second embodiment.

Features of the embodiments and the modifications described above can be combined as appropriate.

Although the preferred embodiments of the present invention have been specifically described above, the present invention is not limited to the above described embodiments, and various modifications or variations can be made without departing from the gist of the present invention.

What is claimed is:

1. An air conditioner comprising:
a signal receiver to receive an operation instruction signal;
a compressor including a motor including coils;
an inverter connected to the coils;
a connection switching device to switch a connection state of the coils between a first connection state and a second connection state; and
a controller to control the inverter and the connection switching device, wherein
when the signal receiver receives an operation stop signal, the connection switching device switches the connection state of the coils from the first connection state to the second connection state.

2. The air conditioner according to claim 1, wherein the controller stops the motor when the signal receiver receives the operation stop signal for the air conditioner.

3. The air conditioner according to claim 1, wherein operation of the air conditioner stops after the connection state of the coils is switched from the first connection state to the second connection state.

4. The air conditioner according to claim 1, wherein the connection state of the coils is the second connection state after the motor stops.

5. The air conditioner according to claim 1, wherein the connection state of the coils is the second connection state at start-up of the air conditioner, and the connection switching device switches the connection state of the coils from the second connection state to the first connection state after the start-up of the air conditioner.

6. The air conditioner according to claim 5, wherein the connection switching device switches the connection state of the coils from the second connection state to the first connection state when rotation speed of the motor reaches a predetermined rotation speed.

7. The air conditioner according to claim 1, wherein a line voltage of the inverter in the second connection state is lower than a line voltage of the inverter in the first connection state.

8. The air conditioner according to claim 1, further comprising a converter to boost voltage to be applied to the motor in which the connection state of the coils is the second connection state at start-up of the air conditioner.

9. The air conditioner according to claim 1, wherein the coils are three-phase coils.

10. The air conditioner according to claim 9, wherein the first connection state is a state in which the three-phase coils are connected in Y connection.

11. The air conditioner according to claim 9, wherein the second connection state is a state in which the three-phase coils are connected in delta connection.

12. The air conditioner according to claim 1, wherein
the coils are three-phase coils connected in Y connection or delta connection,
the first connection state is a state in which the three-phase coils are connected in series in each phase, and
the second connection state is a state in which the three-phase coils are connected in parallel in each phase.

13. The air conditioner according to claim 10, wherein the three-phase coils are connected in parallel in each phase at start-up of the air conditioner.

14. The air conditioner according to claim 1, further comprising:
an indoor unit including the signal receiver; and
an outdoor unit including the compressor and the connection switching device.

15. A method for controlling an air conditioner including a motor including coils, the method comprising:
- receiving an operation stop signal for the air conditioner; and
- switching a connection state of the coils from a first connection state to a second connection state based on the operation stop signal.

* * * * *